(12) United States Patent
Zhang et al.

(10) Patent No.: US 12,451,586 B2
(45) Date of Patent: Oct. 21, 2025

(54) DISPLAY APPARATUS

(71) Applicants: Beijing BOE Technology Development Co., Ltd., Beijing (CN); BOE Technology Group Co., Ltd., Beijing (CN)

(72) Inventors: Yafei Zhang, Beijing (CN); Dongdong Zhang, Beijing (CN); Mengwen Jia, Beijing (CN); Xudong Zhang, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/689,810

(22) PCT Filed: Jun. 21, 2023

(86) PCT No.: PCT/CN2023/101566
§ 371 (c)(1),
(2) Date: Mar. 6, 2024

(87) PCT Pub. No.: WO2024/259610
PCT Pub. Date: Dec. 26, 2024

(65) Prior Publication Data
US 2025/0226567 A1    Jul. 10, 2025

(51) Int. Cl.
*H01Q 1/22* (2006.01)
*G06F 3/041* (2006.01)
(Continued)

(52) U.S. Cl.
CPC ............. *H01Q 1/22* (2013.01); *G06F 3/0412* (2013.01); *G09G 3/3225* (2013.01); *H01Q 1/48* (2013.01);
(Continued)

(58) Field of Classification Search
CPC .... H10K 59/40; H10K 59/8791; H10K 59/82; H10K 59/8794; G06F 3/0412;
(Continued)

(56) References Cited

U.S. PATENT DOCUMENTS

2010/0260460 A1    10/2010    Harrysson et al.
2017/0250460 A1    8/2017    Shin et al.
(Continued)

FOREIGN PATENT DOCUMENTS

CN    111509018 A    8/2020
CN    111812877 A    10/2020
(Continued)

OTHER PUBLICATIONS

International Search Report & Written Opinion mailed Feb. 18, 2024, regarding PCT/CN2023/101566.

*Primary Examiner* — Jimmy H Nguyen
(74) *Attorney, Agent, or Firm* — Intellectual Valley Law, P.C.

(57) ABSTRACT

A display apparatus is provided. The display apparatus includes a display area and a peripheral area. The display area includes a first display sub-area and a second display sub-area. The second display sub-area has a subpixel distribution density lower than a subpixel distribution density of the first display sub-area. The display apparatus further includes an antenna, a touch structure, and a display module. The antenna includes a radiating plate, a feed line, a ground plate, and a slot extending through at least the ground plate. The radiating plate, the feed line, the ground plate, and the slot are at least partially in the second display sub-area and outside the first display sub-area.

20 Claims, 52 Drawing Sheets

(51) Int. Cl.
  *G06F 3/044* (2006.01)
  *G09G 3/3225* (2016.01)
  *H01Q 1/48* (2006.01)
  *H01Q 9/04* (2006.01)
  *H10K 59/40* (2023.01)
  *H10K 59/80* (2023.01)
  *H10K 59/82* (2023.01)

(52) U.S. Cl.
  CPC .............. *H01Q 9/045* (2013.01); *H10K 59/40* (2023.02); *H10K 59/82* (2023.02); *H10K 59/8791* (2023.02); *H10K 59/8794* (2023.02); *G06F 3/0446* (2019.05); *G09G 2300/0413* (2013.01); *G09G 2300/0819* (2013.01); *G09G 2300/0842* (2013.01); *G09G 2300/0861* (2013.01); *G09G 2354/00* (2013.01)

(58) Field of Classification Search
  CPC ................ G06F 3/0446; G09G 3/3225; G09G 2300/0842; G09G 2300/0819; G09G 2300/0861; G09G 2300/0413; G09G 2354/00; H01Q 1/48; H01Q 9/045; H01Q 1/22
  USPC .................................................... 345/174, 76
  See application file for complete search history.

(56) References Cited

U.S. PATENT DOCUMENTS

| | | | |
|---|---|---|---|
| 2017/0285844 A1 | 10/2017 | Park et al. | |
| 2021/0111477 A1* | 4/2021 | Foo | ...................... H01Q 1/2266 |
| 2024/0258689 A1* | 8/2024 | Tian | ...................... H01Q 1/243 |

FOREIGN PATENT DOCUMENTS

| | | |
|---|---|---|
| CN | 113035924 A | 6/2021 |
| CN | 115441158 A | 12/2022 |

* cited by examiner

DISPLAY APPARATUS

CROSS-REFERENCE TO RELATED APPLICATION

This application is a national stage application under 35 U.S.C. § 371 of International Application No. PCT/CN2023/101566, filed Jun. 21, 2023, the contents of which are incorporated by reference in the entirety.

TECHNICAL FIELD

The present invention relates to display technology, more particularly, to a display apparatus.

BACKGROUND

Millimeter wave antenna has been developed for the fifth generation (5G) mobile communication. For example, small cell base station technology has been developed to provide a solution to 5G communication coverage issue. Similarly, customer premise equipment technology has been developed to receive signals via millimeter wave. In these technologies, antenna, particularly millimeter wave antenna, plays a critical role.

SUMMARY

In one aspect, the present disclosure provides a display apparatus, comprising a display area and a peripheral area; wherein the display area comprises a first display sub-area and a second display sub-area; the second display sub-area has a subpixel distribution density lower than a subpixel distribution density of the first display sub-area; the display apparatus further comprises an antenna, a touch structure, and a display module; the antenna comprises a radiating plate, a feed line, a ground plate, and a slot extending through at least the ground plate; and the radiating plate, the feed line, the ground plate, and the slot are at least partially in the second display sub-area and outside the first display sub-area.

Optionally, a ratio of the subpixel distribution density in the second display sub-area to the subpixel distribution density in the first display sub-area is less than 1:1.5.

Optionally, a minimum repeating unit in the second display sub-area includes one pixel and one or more dummy pixels; the one pixel comprises one or more subpixels; and a respective dummy pixel of the one or more dummy pixels comprises one or more dummy subpixels.

Optionally, subpixels in the one pixel in the minimum repeating unit have a different arrangement from subpixels in a pixel in the first display sub-area.

Optionally, dummy subpixels in the respective dummy pixel in the minimum repeating unit have a different arrangement from subpixels in a pixel in the first display sub-area.

Optionally, the touch structure comprises an effective touch area and a peripheral touch area; and the radiating plate, the feed line, and the slot are at least partially in the peripheral touch area.

Optionally, the touch structure comprises a plurality of touch electrodes in the effective touch area; and an orthographic projection of the radiating plate on a base substrate is substantially non-overlapping with an orthographic projection of the plurality of touch electrodes on the base substrate.

Optionally, the display apparatus further comprises a first power supply terminal and a second power supply terminal; wherein the first power supply terminal and the second power supply terminal are electrically isolated from each other; the first power supply terminal is configured to output a first power supply signal; the second power supply terminal is configured to output a second power supply signal; and the first power supply signal being different from the second power supply signal.

Optionally, the display apparatus further comprises a first power supply signal line and a second power supply signal line; wherein the first power supply signal line is connected to the first power supply terminal, and is configured to transmit the first power supply signal to pixel driving circuits in the first display sub-area; the second power supply signal line is connected to the second power supply terminal, and is configured to transmit the second power supply signal to pixel driving circuits in the second display sub-area; the pixel driving circuits in the first display sub-area are configured to drive light emission in light emitting elements in the first display sub-area at least partially based on the first power supply signal; and the pixel driving circuits in the second display sub-area are configured to drive light emission in light emitting elements in the second display sub-area at least partially based on the second power supply signal.

Optionally, the display apparatus comprises a heat dissipation structure; the ground plate on the heat dissipation structure; a base substrate on a side of the ground plate away from the heat dissipation structure; a display module on a side of the base substrate away from the ground plate; a touch structure on a side of the display module away from the base substrate; and the radiating plate of the antenna on a side of the touch structure away from the display module.

Optionally, the radiating plate is a metal mesh radiating plate.

Optionally, the display apparatus further comprises an auxiliary metal mesh substantially surrounding the radiating plate; wherein the radiating plate and the auxiliary metal mesh are spaced apart from each other by a transition area; and the auxiliary metal mesh comprises discontinuous line segments.

Optionally, the feed line comprises a main feed line and a metal plate at least partially in the second display sub-area and outside the first display sub-area.

Optionally, the main feed line comprises a horizontal-polarized feed line and a vertical-polarized feed line; the vertical-polarized feed line and the metal plate are in the same layer; and the horizontal-polarized feed line is in a layer on a side of the vertical-polarized feed line and the metal plate closer to the radiating plate.

Optionally, the main feed line comprises a horizontal-polarized feed line and a vertical-polarized feed line; the vertical-polarized feed line and the horizontal-polarized feed line are in a same layer; and the horizontal-polarized feed line comprises a bridge crossing over the vertical-polarized feed line.

Optionally, the slot has a double-H cross shape.

Optionally, the radiating plate has a rectangular shape with a butterfly tie-shaped slot, a rectangular shape with a Maltese cross-shaped slot, or a rectangular shape with a cross-shaped slot.

Optionally, the display apparatus further comprises an optically clear adhesive layer on a side of the radiating plate and the touch structure away from the display module; a second radiating plate on a side of the optically clear adhesive layer away from the touch structure; a polarizer on a side of the optically clear adhesive layer and the second radiating plate away from the touch structure; and a second optically clear adhesive layer on a side of the polarizer away from the optically clear adhesive layer.

Optionally, an orthographic projection of the radiating plate on abase substrate is non-overlapping with an orthographic projection of a subpixel in the second display sub-area on the base substrate.

Optionally, the orthographic projection of the radiating plate on the base substrate is at least partially overlapping with an orthographic projection of a dummy subpixel in the second display sub-area on the base substrate.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Human visual information comprises approximately 80% of the total information acquired, making vision one of the primary channels through which individuals perceive and gather information from the external world. In the digital era, display devices serve as the means to visually perceive the world, encompassing a plethora of devices such as phones, cameras, computers, televisions, and control panels that have become an integral part of everyday life.

As technology advances, the integration of display devices continuously evolves to meet diverse requirements. The integration of millimeter-wave antennas into these devices enables the wireless transmission and reception of communication signals. The shape and length of these antennas can be adjusted to accommodate the specific frequency bands of the electromagnetic waves being utilized. Thus, different types of antennas may be necessary to cater to various frequency bands. Consequently, recent research has focused on the investigation of display panels that incorporate conductive patterns to facilitate the implementation of antennas.

In the context of the millimeter-wave frequency bands used in 5G technology, the size of antennas is significantly reduced to the millimeter scale. By applying a quarter-wavelength calculation, the dimensions of terminal antennas typically range around 2.5 mm. Due to the limited diffraction ability of millimeter waves, they are commonly employed in an array configuration to enhance performance. Antenna-in-Package (AiP) technology aligns with the growing trend of increased integration in silicon-based semiconductor processes. AiP technology strikes a balance between antenna performance, cost, and physical dimensions, reflecting the prevailing development direction of millimeter-wave terminals. Other types of millimeter-wave antennas, such as antennas-in-antenna-in-package (AiAiP), antenna on display (AoD), and antenna in metal frame (AiME), are currently being explored as potential millimeter-wave solutions. Among these options, AoD stands out due to its notable advantages. It not only maximizes the utilization of available space compared to bezels, backend modules, and backshells but also benefits from a relatively simplified electromagnetic environment, minimizing susceptibility to interference from other signals.

Figure 1:
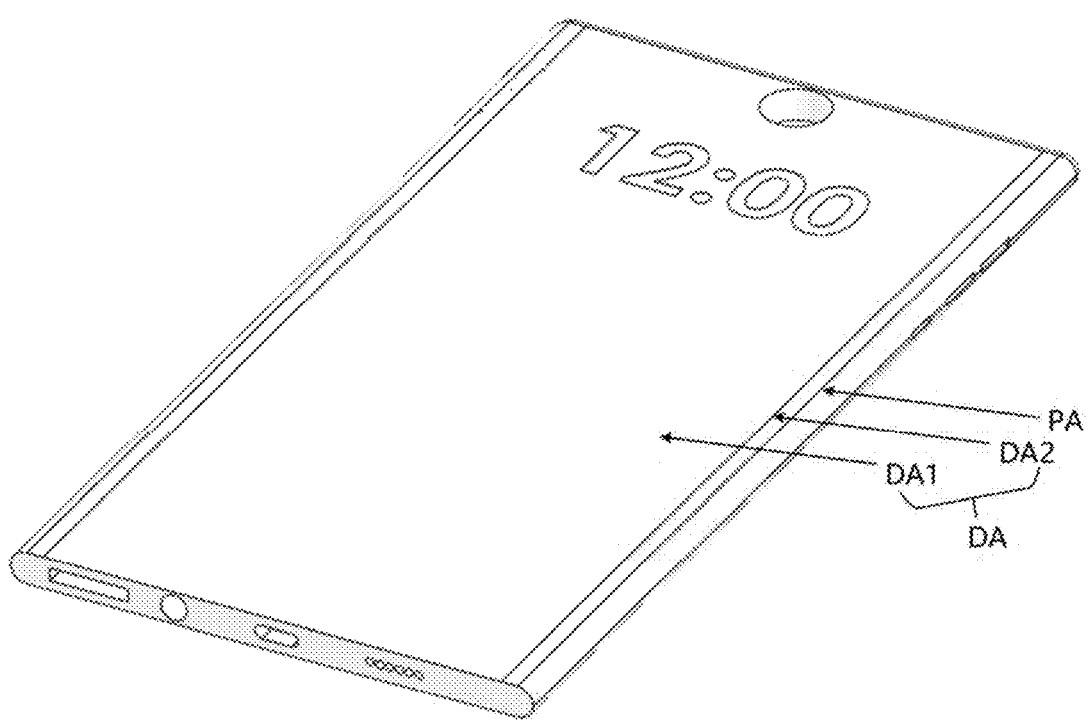
FIG. 1 is a perspective view of a display apparatus in some embodiments according to the present disclosure.
Figure 2:
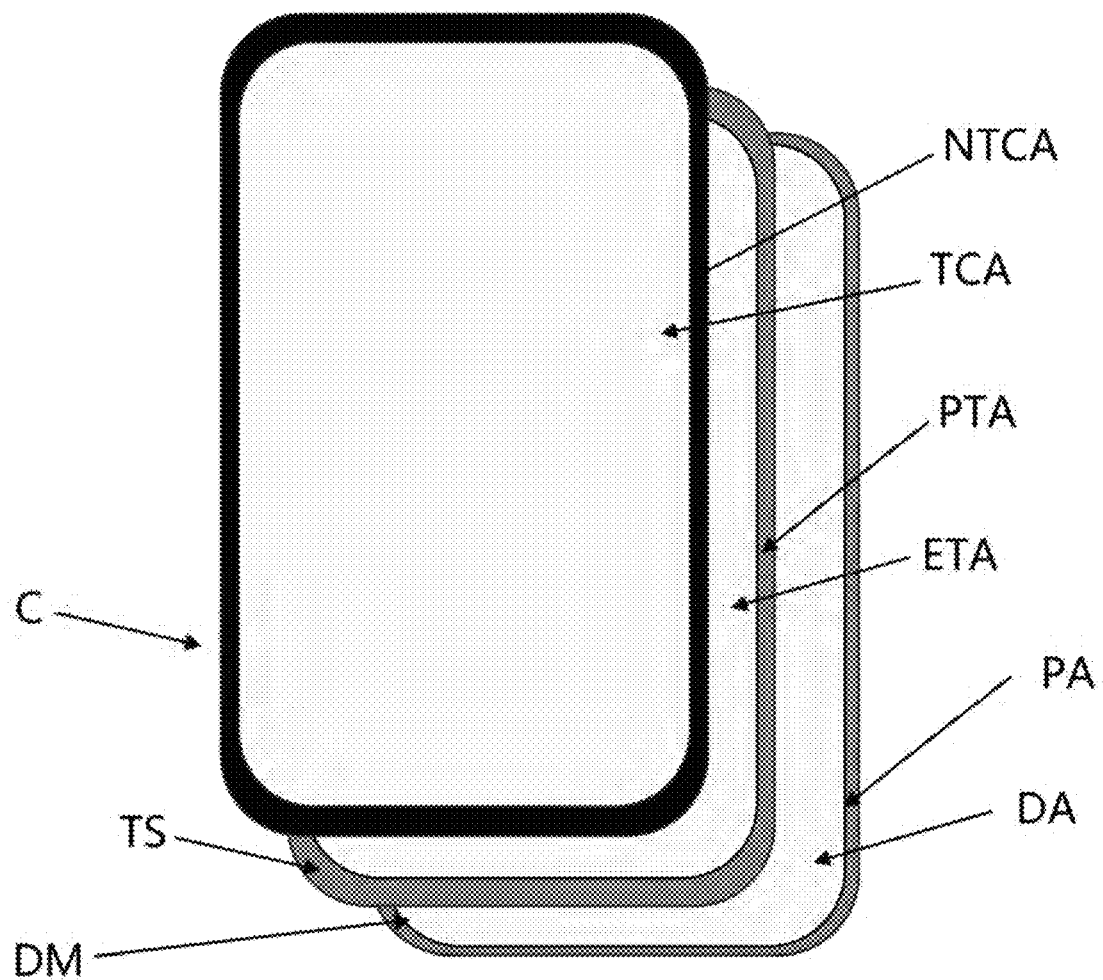
FIG. 2 is an exploded view of a display apparatus in some embodiments according to the present disclosure.

FIG. 1 is a perspective view of a display apparatus in some embodiments according to the present disclosure. FIG. 2 is an exploded view of a display apparatus in some embodiments according to the present disclosure. Referring to FIG. 1, the display apparatus in some embodiments includes a peripheral area PA and a display area DA. As used herein the term "peripheral area" refers to an area of a display apparatus where various circuits and wires are provided to transmit signals to a display panel. As used herein, the term "display area" refers to an area of a display apparatus where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels.

In some embodiments, the display area DA of the display apparatus includes a first display sub-area DA1 and a second display sub-area DA2. Optionally, the first display sub-area DA1 and the second display sub-area DA2 are non-overlapping with each other. Optionally, the first display sub-area DA1 and the second display sub-area DA2 are continuous display regions so that an image may be displayed throughout the first display sub-area DA1 and the second display sub-area DA2 without interruption. An integral image may be displayed in the display apparatus.

In some embodiments, the second display sub-area DA2 has a light transmittance rate lower than a light transmittance rate of the first display sub-area DA1. Optionally, the second display sub-area DA2 has a light transmittance rate lower than the light transmittance rate of the first display sub-area DA1 by at least 10%, for example, by at least 15%, by at least 20%, by at least 25%, by at least 30%, by at least 35%, by at least 40%, by at least 45%, by at least 50%, by at least 55%, by at least 60%, by at least 65%, by at least 70%, by at least 75%, by at least 80%.

In some embodiments, the second display sub-area DA2 has a subpixel distribution density lower than a subpixel distribution density of the first display sub-area DA1. Optionally, the second display sub-area DA2 has a subpixel distribution density lower than the subpixel distribution density of the first display sub-area DA1 by at least 10%, for example, by at least 15%, by at least 20%, by at least 25%, by at least 30%, by at least 35%, by at least 40%, by at least 45%, by at least 50%, by at least 55%, by at least 60%, by at least 65%, by at least 70%, by at least 75%, by at least 80%.

In some embodiments, the second display sub-area DA2 has an area occupied by non-transparent components lower than an area occupied by non-transparent components of the first display sub-area DA1. Optionally, the second display sub-area DA2 has an area occupied by non-transparent components lower than the area occupied by non-transparent components of the first display sub-area DA1 by at least 10%, for example, by at least 15%, by at least 20%, by at least 25%, by at least 30%, by at least 35%, by at least 40%, by at least 45%, by at least 50%, by at least 55%, by at least 60%, by at least 65%, by at least 70%, by at least 75%, by at least 80%.

Referring to FIG. 2, the display apparatus in some embodiments includes a display module DM, a touch structure TS on the display module DM, and a cover C on a side of the touch structure TS away from the display module DM. The display module DM in some embodiments includes a display area DA and a peripheral area PA, as discussed above. In one example, scan circuits such as gate-on-array are disposed in the peripheral area PA. The touch structure TS in some embodiments includes an effective touch area ETA and a peripheral touch area PTA. The effective touch area ETA includes a plurality of touch electrodes for sensing a touch. The peripheral touch area PTA includes touch control circuits and associated signal lines. The cover C includes a light transmissive cover area TCA and a light non-transmissive cover area NTCA. In one example, the light non-transmissive cover area NTCA includes ink. In another example, the light transmissive cover area TCA includes a transparent cover glass.

Figure 3:
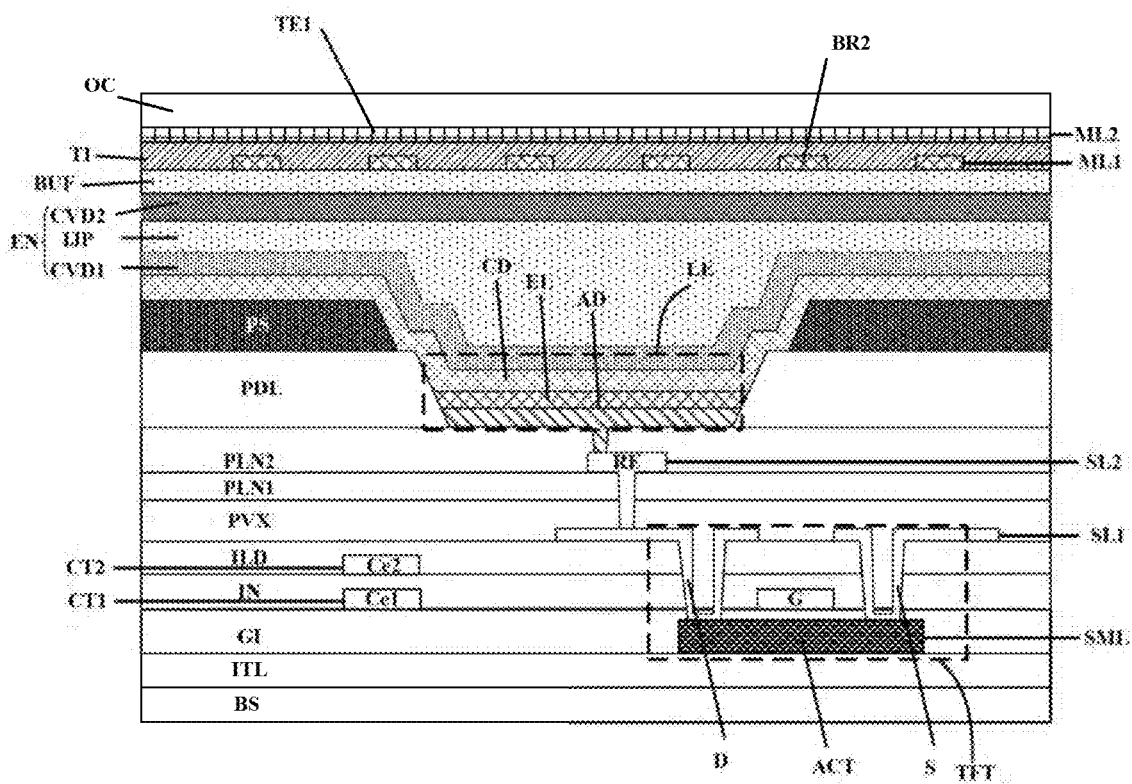
FIG. 3 illustrates a detailed structure in a display area in a display apparatus in some embodiments according to the present disclosure.

FIG. 3 illustrates a detailed structure in a display area in a display apparatus in some embodiments according to the present disclosure. Referring to FIG. 3, the display apparatus in the display area in some embodiments includes a base substrate BS (e.g., a flexible base substrate); an inter-layer ITL on the base substrate BS; an active layer ACT of a respective one of a plurality of thin film transistors TFT on a side of the inter-layer ITL away from the base substrate BS; a gate insulating layer GI on a side of the active layer ACT away from the base substrate BS; a gate electrode G and a first capacitor electrode Ce1 (both are parts of a first conductive layer) on a side of the gate insulating layer GI away from the base substrate BS; an insulating layer IN on a side of the gate electrode G and the first capacitor electrode Ce1 away from the gate insulating layer GI; a second capacitor electrode Ce2 (a part of a second conductive layer) on a side of the insulating layer IN away from the gate insulating layer GI; an inter-layer dielectric layer ILD on a side of the second capacitor electrode Ce2 away from the gate insulating layer GI; a source electrode S and a drain electrode D (parts of a first signal line layer) on a side of the inter-layer dielectric layer ILD away from the gate insulating layer GI; a passivation layer PVX on a side of the source electrode S and the drain electrode D away from the inter-layer dielectric layer ILD; a first planarization layer PLN1 on a side of the passivation layer PVX away from the inter-layer dielectric layer ILD; a relay electrode RE (part of a second signal line layer) on a side of the first planarization layer PLN1 away from the passivation layer PVX; a second planarization layer PLN2 on a side of the relay electrode RE away from the first planarization layer PLN1; a pixel definition layer PDL defining a subpixel aperture and on a side of the second planarization layer PLN2 away from the base substrate BS; and a light emitting element LE in the subpixel aperture. The light emitting element LE includes an anode AD on a side of the second planarization layer PLN2 away from the first planarization layer PLN1; a light emitting layer EL on a side of the anode AD away from the second planarization layer PLN2; and a cathode layer CD on a side of the light emitting layer EL away from the anode AD. The display apparatus in the display area further includes an encapsulating layer EN encapsulating the dummy light emitting element DLE, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer IJP on a side of the first inorganic encapsulating sub-layer CVD1 away from the base substrate BS, and a second inorganic encapsulating sub-layer CVD2 on a side of the organic encapsulating sub-layer IJP away from the first inorganic encapsulating sub-layer CVD1. The display apparatus in the display area further includes a buffer layer BUF on a side of the encapsulating layer EN away from the base substrate BS; a plurality of second electrode bridges BR2 on a side of the buffer layer BUF away from the encapsulating layer EN; a touch insulating layer TI on a side of the plurality of second electrode bridges BR2 away from the buffer layer BUF; a plurality of first touch electrodes TE1 on a side of the touch insulating layer TI away from the buffer layer BUF; and an overcoat layer OC on a side of the plurality of first touch electrodes TE1 away from the touch insulating layer TI. Optionally, the display apparatus in the display area does not include the passivation layer PVX, e.g., the inter-layer dielectric layer ILD is in direct contact with the first planarization layer PLN1.

Referring to FIG. 3, the display apparatus includes a semiconductor material layer SML, a first conductive layer CT1, a second conductive layer CT2, a first signal line layer SL1, and a second signal line layer SL2. The display apparatus further includes an insulating layer IN between the first conductive layer CT1 and the second conductive layer CT2; an inter-layer dielectric layer ILD between the second conductive layer CT2 and the first signal line layer SL1; and at least a passivation layer PVX or a first planarization layer PLN1 between the first signal line layer SL1 and the second signal line layer SL2.

Referring to FIG. 3, the plurality of second electrode bridges BR2 are in a first touch layer ML1, and the plurality of first touch electrodes TE1 are in a second touch layer ML2. In some embodiments, the plurality of first touch electrode lines TEL1 and the plurality of second touch electrode lines TEL2 are in the second touch layer ML2. In alternative embodiments, the plurality of first touch electrode lines TEL1 and the plurality of second touch electrode lines TEL2 are in the first touch layer ML1. In alternative embodiments, the plurality of first touch electrode lines TEL1 and the plurality of second touch electrode lines TEL2 are partially in the first touch layer ML and partially in the second touch layer ML2.

Figure 4:
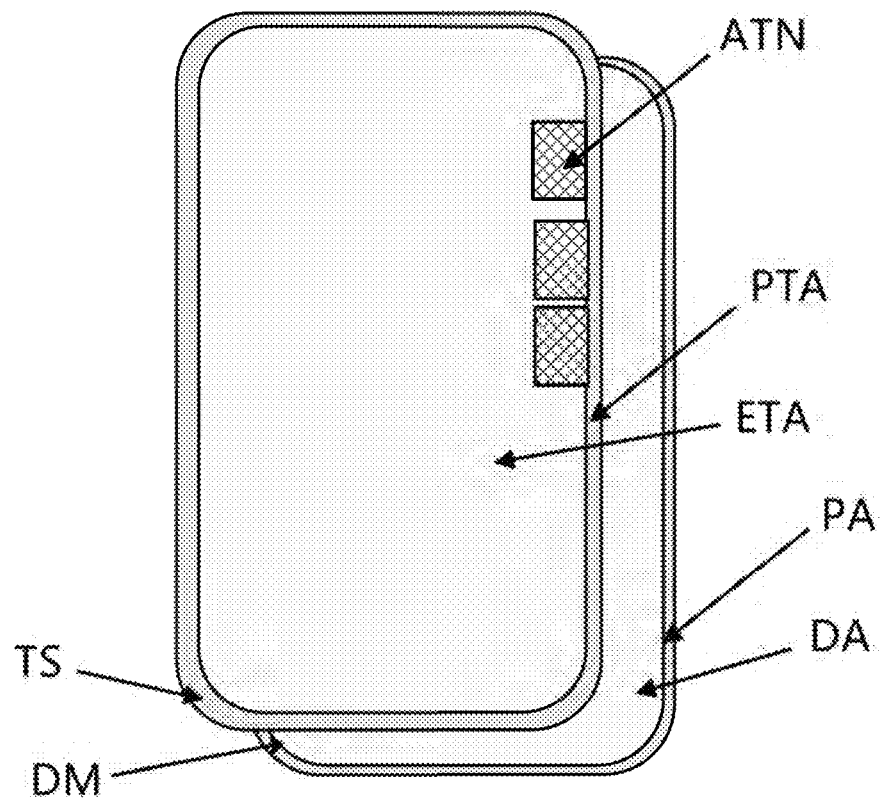
FIG. 4 is an exploded view of a display apparatus in some embodiments according to the present disclosure.
Figure 5:
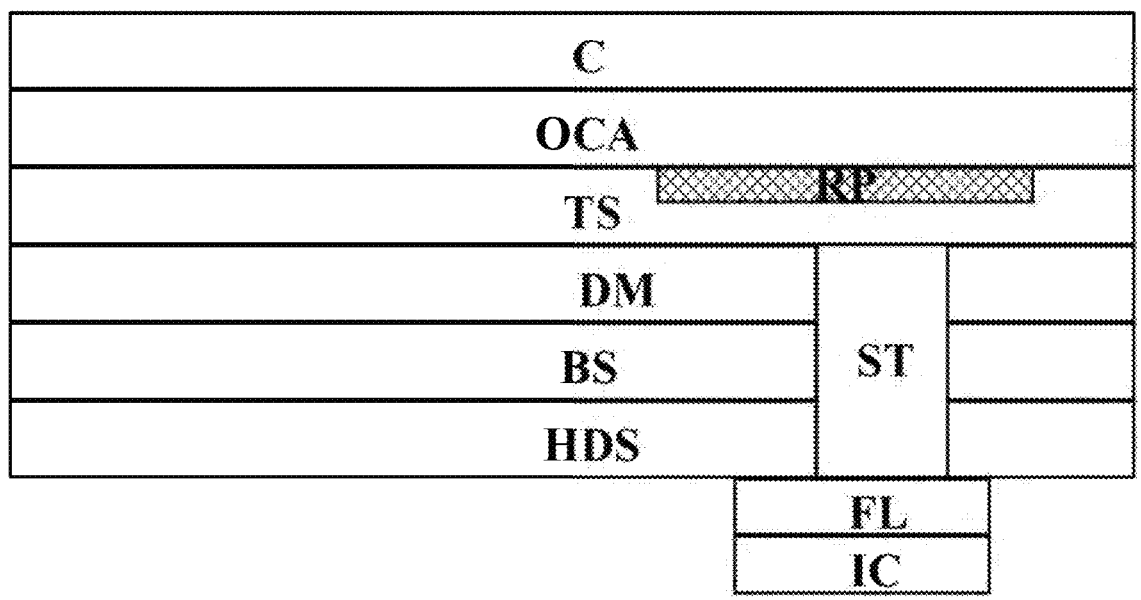
FIG. 5 is a cross-sectional view of a display apparatus in some embodiments according to the present disclosure.

FIG. 4 is an exploded view of a display apparatus in some embodiments according to the present disclosure. FIG. 5 is a cross-sectional view of a display apparatus in some embodiments according to the present disclosure. Referring to FIG. 5, the display apparatus in some embodiments further includes an antenna ATN on the touch structure TS. Referring to FIG. 4 and FIG. 5, the display apparatus in some embodiments includes a heat dissipation structure HDS, a base substrate BS on the heat dissipation structure HDS, a display module DM on a side of the base substrate BS away from the heat dissipation structure HDS, a touch structure TS on a side of the display module DM away from the base substrate BS, a radiating plate RP of the antenna ATN on a side of the touch structure TS away from the display module DM, an optically clear adhesive layer OCA on a side of the antenna ATN and the touch structure TS away from the display module DM, and a cover C on a side of the optically clear adhesive layer OCA away from the touch structure TS. Optionally, the display apparatus further includes a slot ST extending through at least one of the heat dissipation structure HDS, the base substrate BS, or the display module DM. Optionally, the display apparatus further includes a feed line FL on a side of the slot ST away from the antenna ATN. Optionally, the display apparatus further includes an integrated circuit IC on a side of the feed line FL away from the slot ST.

Figure 6:
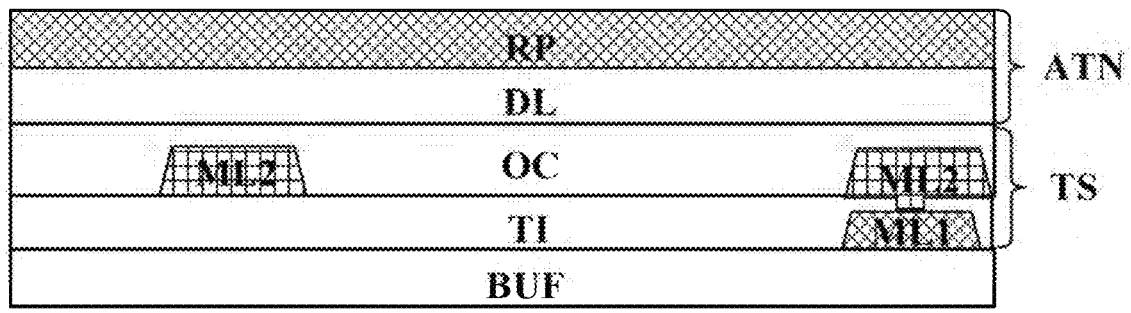
FIG. 6 is a cross-sectional view of a portion of a display apparatus in some embodiments according to the present disclosure.

FIG. 6 is a cross-sectional view of a portion of a display apparatus in some embodiments according to the present disclosure. Referring to FIG. 6, the display apparatus in some embodiments includes a touch structure TS and an antenna ATN. In some embodiments, the display apparatus includes a buffer layer BUF, a first touch layer ML1 on the buffer layer BUF, a touch insulating layer TI on a side of the first touch layer ML1 away from the buffer layer BUF, a second touch layer ML2 on a side of the touch insulating layer TI away from the buffer layer BUF, an overcoat layer OC on a side of the second touch layer ML2 away from the touch insulating layer TI, a dielectric layer DL on a side of the overcoat layer OC away from the touch insulating layer TI, and a radiating plate RP of the antenna on a side of the dielectric layer DL away from the overcoat layer. The radiating plate RP is configured to transmit or receive radio frequency signals. The dielectric layer DL is configured to provide electrical insulation and manage distribution of electric fields.

In some embodiments, the buffer layer BUF depicted in FIG. 6 is a buffer layer depicted in FIG. 3. For example, the display apparatus further includes a display module underneath the buffer layer BUF.

In some embodiments, referring to FIG. 4 to FIG. 6, the antenna ATN includes a feed line FL, a slot ST on the feed line FL, a dielectric layer DL on a side of the slot ST away from the feed line FL, and a radiating plate RP on a side of the dielectric layer DL away from the slot ST.

In some embodiments, the display module DM is a light emitting diode display module such as an organic light emitting diode display module. With the ongoing advancements in screen manufacturing techniques, the design of organic light emitting diode display module aims to achieve higher screen-to-body ratios and enhanced integration of electronic components. This drive towards improved integration has facilitated the emergence of innovative technologies like under-display fingerprint recognition and under-display camera systems. These technologies leverage the passage of ambient light through the screen layers to capture images at the underlying layer. Consequently, it necessitates the utilization of highly transparent film materials within the organic light emitting diode display module. When compared to traditional polarizing films, the application of Color Filter on Encapsulation (COE) demonstrates superior advantages in Full Display with Camera (FDC) setups, thereby enhancing overall performance and user experience. The non-polarizing film technology is employed in organic light emitting diode display module by applying an additional layer of color filter after the completion of traditional packaging. Each pixel is associated with a corresponding color filter, while the gaps between pixels are separated by a black matrix. This color filter layer effectively mitigates issues related to reflection and transparency. In the case of incident light from the external environment, undesired portions are absorbed by the black matrix region, while the transmitted portion passes through the color filter. The transmitted light either undergoes reflection at the pixel level and is subsequently intercepted by the black matrix region, or it gets absorbed by other color filter regions. The color filter layer exhibits a significantly higher transmittance, ranging from 70% to 90%, for the main RGB wavelengths. This level of transparency surpasses that of polarizing films by a substantial margin.

Figure 7:
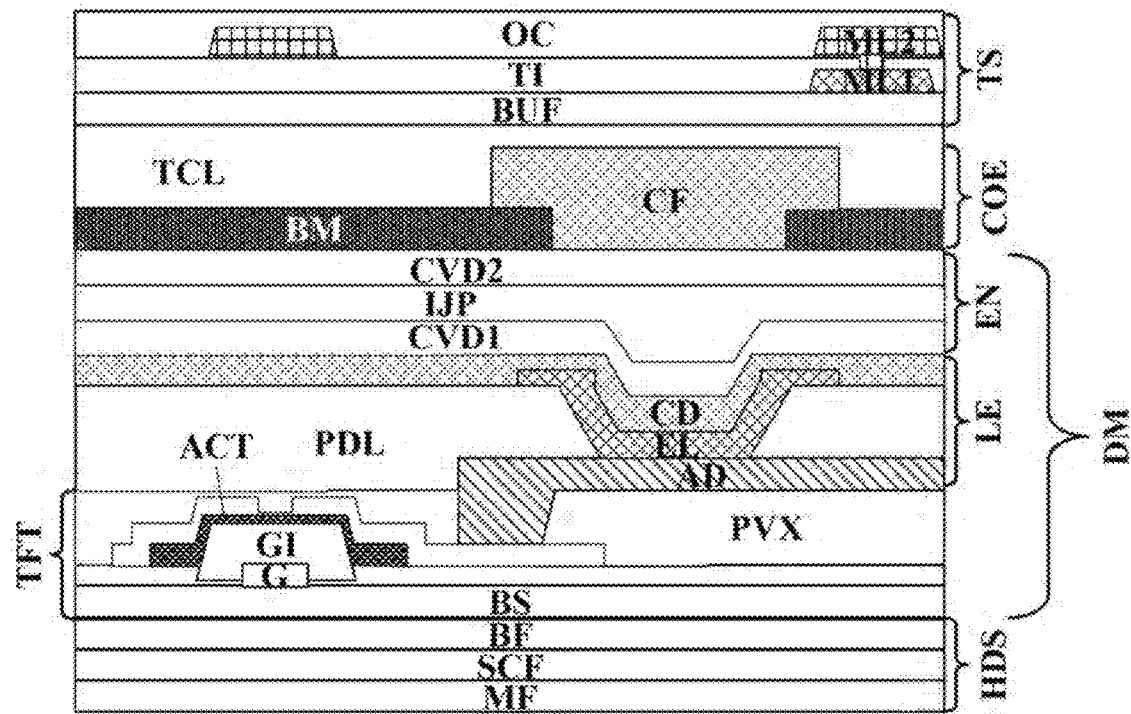
FIG. 7 is a cross-sectional view of a portion of a display apparatus in some embodiments according to the present disclosure.

FIG. 7 is a cross-sectional view of a portion of a display apparatus in some embodiments according to the present disclosure. FIG. 7 depicts a Color Filter on Encapsulation display apparatus in some embodiments according to the present disclosure. Referring to FIG. 7, the display apparatus in some embodiments includes a heat dissipation structure HDS, a display module DM on the heat dissipation structure HDS, a Color Filter on Encapsulation COE on a side of the display module DM away from the heat dissipation structure HDS, and a touch structure TS on a side of the Color Filter on Encapsulation COE away from the display module DM.

In some embodiments, the heat dissipation structure HDS includes a metal film MF, a self-closing form SCF on the metal film MF, and a back film BF on a side of the self-closing form SCF away from the metal film MF. The metal film MF is configured to dissipate heat away from the heat-generating components, facilitating effective thermal management. The self-closing form SCF conforms to the surface irregularities. The back film BF serves as a protective component, firmly adhering to the base substrate of the display panel, to provide structural support, shielding, and overall integrity to the heat dissipation structure HDS.

In some embodiments, the display module DM includes a base substrate BS, and a plurality of thin film transistors TFT and a plurality of light emitting elements LE connected to the plurality of thin film transistors TFT, respectively. A respective thin film transistor of the plurality of thin film transistors TFT includes a gate electrode G, a gate insulating layer GI on the gate electrode G, and an active layer ACT on a side of the gate insulating layer GI away from the gate electrode G. A respective light emitting element of the plurality of light emitting elements LE includes an anode AD, a light emitting layer EL on the anode AD, and a cathode CD on a side of the light emitting layer EL away from the anode AD. The display module DM in some embodiments further includes an encapsulating layer EN on a side of the plurality of light emitting elements LE away from the base substrate BS. Optionally, the encapsulating layer EN a first inorganic encapsulating sub-layer CVD1 on a side of the cathode layer CD away from the base substrate BS, an organic encapsulating sub-layer IJP on a side of the first inorganic encapsulating sub-layer CVD1 away from the base substrate BS, and a second inorganic encapsulating sub-layer CVD2 on a side of the organic encapsulating sub-layer IJP away from the first inorganic encapsulating sub-layer CVD1.

In some embodiments, the Color Filter on Encapsulation COE includes a black matrix BM and a color filter CF on the second inorganic encapsulating sub-layer CVD2, and a transparent cover layer TCL on a side of the black matrix BM and the color filter CF away from the second inorganic encapsulating sub-layer CVD2.

In some embodiments, the touch structure TS includes a buffer layer BUF on the transparent cover layer TCL, a first touch layer ML on a side of the buffer layer BUF away from the transparent cover layer TCL, a touch insulating layer TI on a side of the first touch layer ML1 away from the buffer layer BUF, a second touch layer ML2 on a side of the touch insulating layer TI away from the buffer layer BUF, and an overcoat layer OC on a side of the second touch layer ML2 away from the touch insulating layer TI.

In some embodiments, an antenna, e.g., a millimeter wave antenna, can be integrated into the display apparatus discussed in the present disclosure. The inventors of the present disclosure discover that, due to the presence of a significant amount of metal traces in the display module, the display module exhibits strong blocking effects on electromagnetic waves, effectively behaving as a metal layer. The present display apparatus overcomes this issue, surprisingly and unexpectedly enabling wave transmission through the display module.

In some embodiments, to facilitate millimeter wave communication, the antenna (e.g., the millimeter wave antenna) adopts a coupled feeding approach, with the radiating plate positioned above the display module and the feed line located beneath the display module. In some embodiments, the radiating plate is on a side of the touch structure away from the display module, as depicted in FIG. 4 to FIG. 6. The inventors of the present disclosure discover that, by having the radiating plate on a side of the touch structure away from the display module, the antennas need to possess the same or higher transparency as the touch layer in order to avoid affecting the display performance. Accordingly, in some embodiments, the antenna is made of a metal mesh material, which has good conductivity and relatively low radiation losses.

Figure 8:
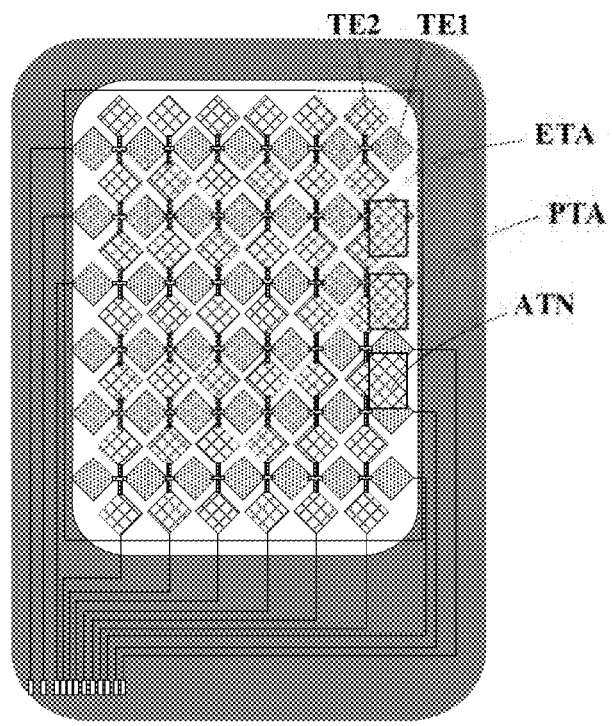
FIG. 8 is a planar view of a display apparatus in some embodiments according to the present disclosure.

FIG. 8 is a planar view of a display apparatus in some embodiments according to the present disclosure. Referring to FIG. 8, the touch structure in some embodiments includes a plurality of first touch electrodes TE1 and a plurality of second touch electrode TE2. In some embodiments, the plurality of first touch electrodes TE1 extend along a first direction, respectively; the plurality of second touch electrode TE2 extend along a second direction, respectively; the first direction being different from the second direction, the first direction intersecting the second direction. The plurality of first touch electrodes TE1 and the plurality of second touch electrode TE2 are configured to perform mutual capacitance sensing.

In some embodiments, the plurality of first touch electrodes TE1 are configured to provide driving signals, and the voltage accumulated through mutual capacitance can be sensed using the plurality of second touch electrode TE2.

In alternative embodiments, the plurality of second touch electrode TE2 are configured to provide driving signals, and the voltage accumulated through mutual capacitance can be sensed using the plurality of first touch electrodes TE1.

The touch structure TS in some embodiments includes an effective touch area ETA and a peripheral touch area PTA. The effective touch area ETA includes a plurality of touch electrodes (TE1 and TE2) for sensing a touch. The peripheral touch area PTA includes touch control circuits and associated signal lines. In one example, the effective touch area ETA is substantially the same as the display area; and the peripheral touch area PTA is substantially the same as the peripheral area.

Figure 9:
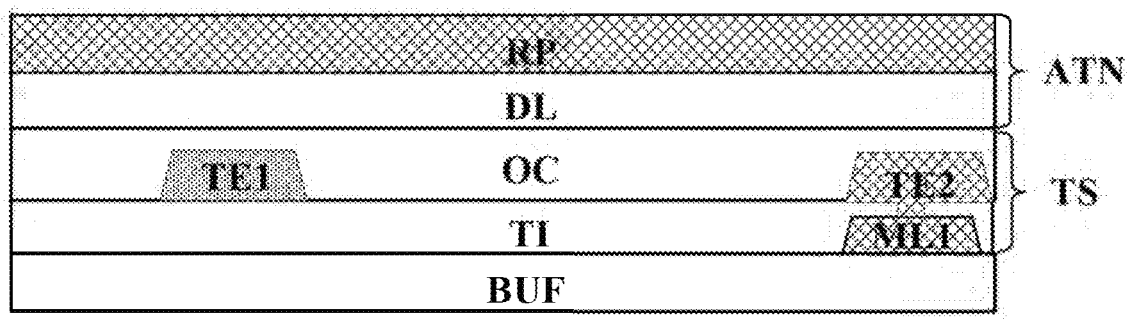
FIG. 9 is a cross-sectional view of a portion of a display apparatus in some embodiments according to the present disclosure.

FIG. 9 is a cross-sectional view of a portion of a display apparatus in some embodiments according to the present disclosure. Referring to FIG. 9, the display apparatus in some embodiments includes a touch structure TS and an antenna ATN. In some embodiments, the display apparatus includes a buffer layer BUF, a first touch layer ML1 on the buffer layer BUF, a touch insulating layer TI on a side of the first touch layer ML1 away from the buffer layer BUF, a plurality of first touch electrodes TE1 and a plurality of second touch electrodes TE2 (in a second touch layer) on a side of the touch insulating layer TI away from the buffer layer BUF, an overcoat layer OC on a side of the plurality of first touch electrodes TE1 and the plurality of second touch electrodes TE2 away from the touch insulating layer TI, a dielectric layer DL on a side of the overcoat layer OC away from the touch insulating layer TI, and a radiating plate RP of the antenna on a side of the dielectric layer DL away from the overcoat layer. The radiating plate RP is configured to transmit or receive radio frequency signals. The dielectric layer DL is configured to provide electrical insulation and manage distribution of electric fields.

In some embodiments, the buffer layer BUF depicted in FIG. 9 is a buffer layer depicted in FIG. 3. For example, the display apparatus further includes a display module underneath the buffer layer BUF.

Referring to FIG. 8 and FIG. 9, in some embodiments, the radiating plate RP of the antenna ANT is at least partially in the effective touch area ETA. Optionally, the antenna ANT is completely in the effective touch area ETA. In some embodiments, an orthographic projection of the radiating plate RP on the base substrate BS at least partially overlaps with an orthographic projection of the plurality of first touch electrodes TE1 on the base substrate BS. In some embodiments, an orthographic projection of the radiating plate RP on the base substrate BS at least partially overlaps with an orthographic projection of the plurality of second touch electrode TE2 on the base substrate BS. Optionally, the orthographic projection of the radiating plate RP on the base substrate BS at least partially overlaps with an orthographic projection of a respective first touch electrode of the plurality of first touch electrodes TE1 on the base substrate BS, and at least partially overlaps with an orthographic projection of a respective second touch electrode of the plurality of second touch electrode TE2 on the base substrate BS.

In some embodiments, the radiating plate RP is a metal mesh radiating plate.

Figure 10:
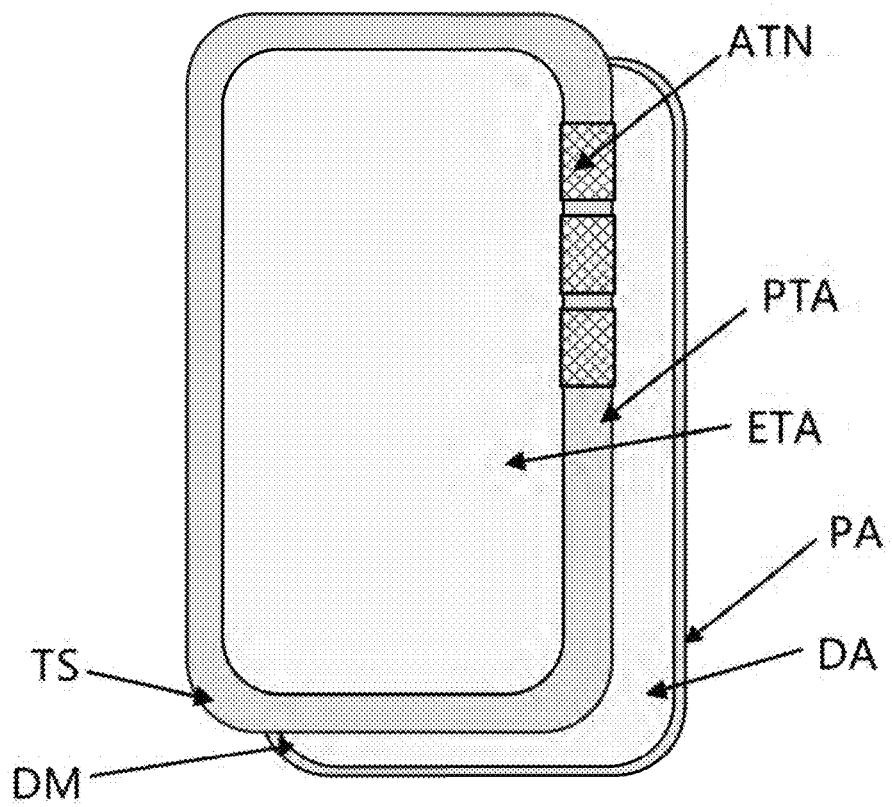
FIG. 10 is a cross-sectional view of a display apparatus in some embodiments according to the present disclosure.
Figure 11:
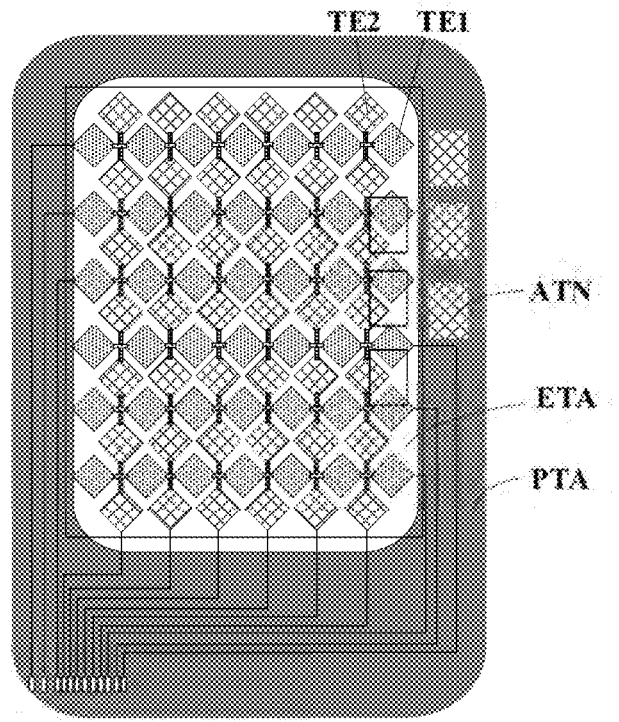
FIG. 11 is a plan view of a display apparatus in some embodiments according to the present disclosure.

FIG. 10 is across-sectional view of a display apparatus in some embodiments according to the present disclosure. FIG. 11 is a plan view of a display apparatus in some embodiments according to the present disclosure. Referring to FIG. 10 and FIG. 11, in some embodiments, the antenna ATN is at least partially outside the effective touch area ETA. Optionally, the antenna ATN is completely outside the effective touch area ETA.

Figure 12:
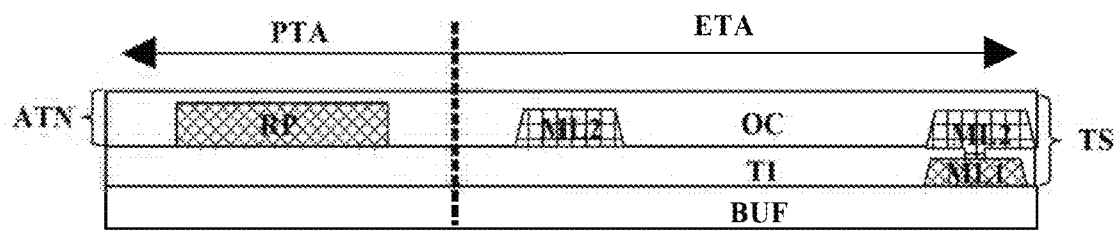
FIG. 12 is a cross-sectional view of a portion of a display apparatus in some embodiments according to the present disclosure.

FIG. 12 is a cross-sectional view of a portion of a display apparatus in some embodiments according to the present disclosure. Referring to FIG. 10 to FIG. 12, the display apparatus in some embodiments includes a touch structure TS and an antenna ATN. In some embodiments, the display apparatus includes a buffer layer BUF, a first touch layer ML1 on the buffer layer BUF, a touch insulating layer TI on a side of the first touch layer ML1 away from the buffer layer BUF, a second touch layer ML2 and a radiating plate RP of the antenna ATN on a side of the touch insulating layer TI away from the buffer layer BUF, an overcoat layer OC on a side of the radiating plate RP and the second touch layer ML2 away from the touch insulating layer TI. The radiating plate RP is configured to transmit or receive radio frequency signals. As shown in FIG. 12, the radiating plate RP in some embodiments is in a same layer as the second touch layer ML2.

In some embodiments, the buffer layer BUF depicted in FIG. 12 is a buffer layer depicted in FIG. 3. For example, the display apparatus further includes a display module underneath the buffer layer BUF.

The touch structure TS in some embodiments includes an effective touch area ETA and a peripheral touch area PTA. The effective touch area ETA includes a plurality of touch electrodes (TE1 and TE2) for sensing a touch. The peripheral touch area PTA includes touch control circuits and associated signal lines. In one example, the effective touch area ETA is substantially the same as the display area; and the peripheral touch area PTA is substantially the same as the peripheral area.

Figure 13:
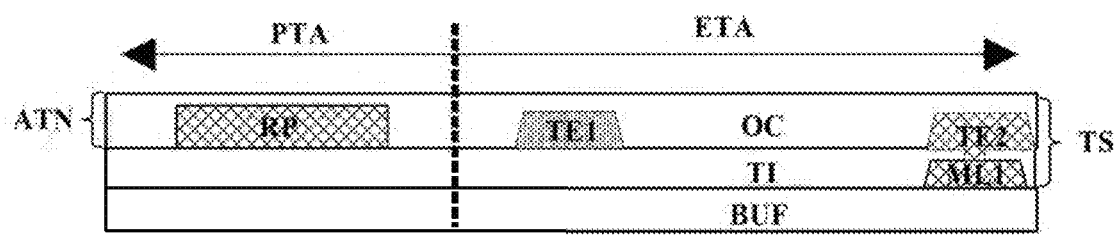
FIG. 13 is a cross-sectional view of a portion of a display apparatus in some embodiments according to the present disclosure.

FIG. 13 is a cross-sectional view of a portion of a display apparatus in some embodiments according to the present disclosure. Referring to FIG. 13. In some embodiments, an orthographic projection of the radiating plate RP on the base substrate BS is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of the plurality of first touch electrodes TE1 on the base substrate BS. In some embodiments, an orthographic projection of the radiating plate RP on the base substrate BS is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of the plurality of second touch electrode TE2 on the base substrate BS. Optionally, the orthographic projection of the radiating plate RP on the base substrate BS is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of a respective first touch electrode of the plurality of first touch electrodes TE1 on the base substrate BS, and is substantially non-overlapping with (e.g., at least 80% non-overlapping with, at least 85% non-overlapping with, at least 90% non-overlapping with, at least 95% non-overlapping with, at least 99% non-overlapping with, or completely non-overlapping with) an orthographic projection of a respective second touch electrode of the plurality of second touch electrode TE2 on the base substrate BS.

In some embodiments, the radiating plate RP is a metal mesh radiating plate.

The inventors of the present disclosure discover that the display module, including various substrates, the light emitting layer, and the encapsulation layer, contains a significant amount of metal traces. This results in a strong electromagnetic wave blocking effect, effectively rendering the display module equivalent to a metallic layer.

Accordingly, the present disclosure provides, inter alia, a display apparatus that substantially obviate one or more of the problems due to limitations and disadvantages of the related art. In one aspect, the present disclosure provides a display apparatus. In some embodiments, the display apparatus includes a display area and a peripheral area. Optionally, the display area comprises a first display sub-area and a second display sub-area. Optionally, the second display sub-area has a subpixel distribution density lower than a subpixel distribution density of the first display sub-area. Optionally, the display apparatus further comprises an antenna, a touch structure, and a display module. Optionally, the antenna comprises a radiating plate, a feed line, a ground plate, and a slot extending through at least the ground plate. Optionally, the radiating plate, the feed line, and the slot are at least partially in the second display sub-area and outside the first display sub-area.

Figure 14:
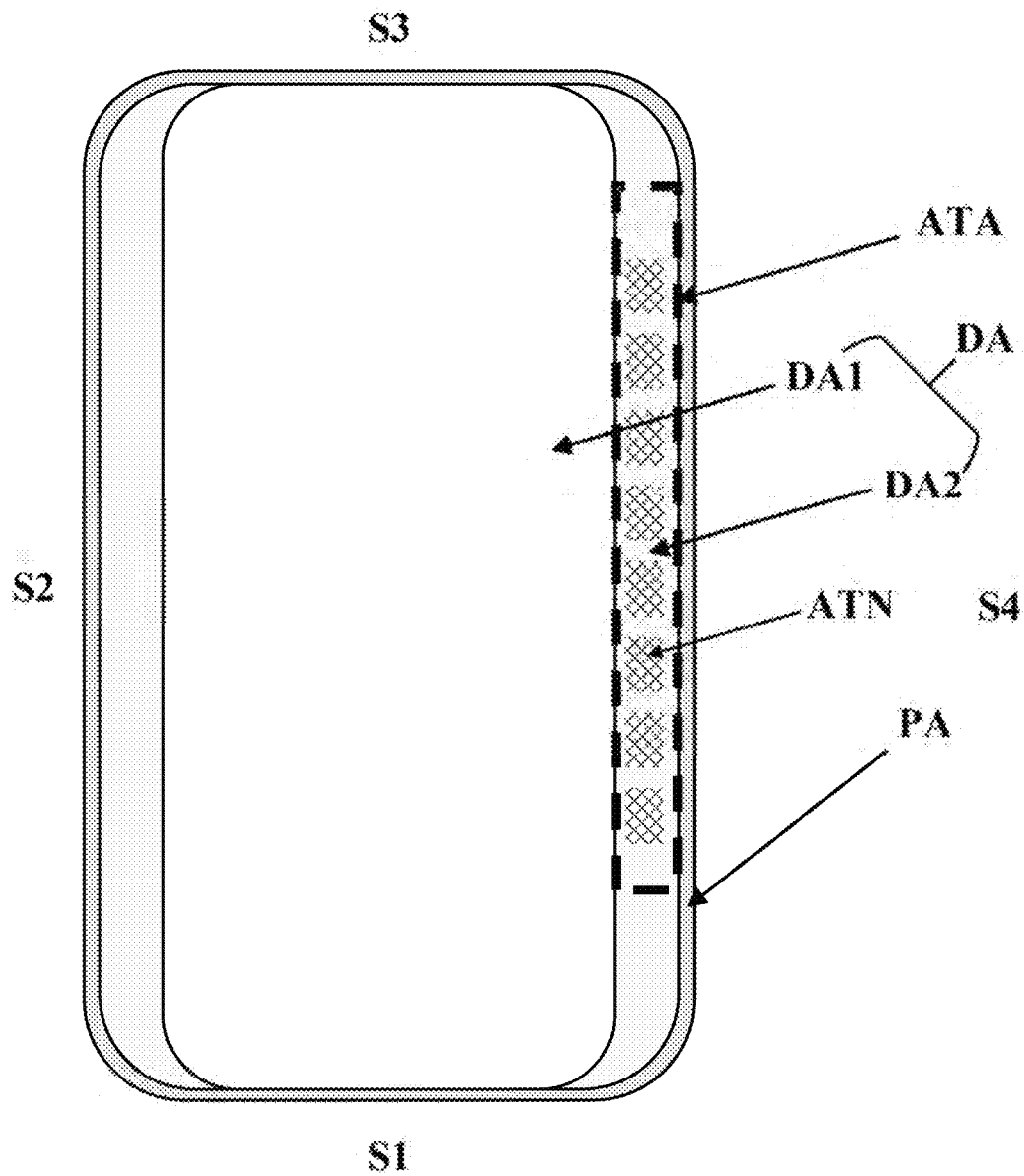
FIG. 14 is a plan view of a display apparatus in some embodiments according to the present disclosure.
Figure 15:
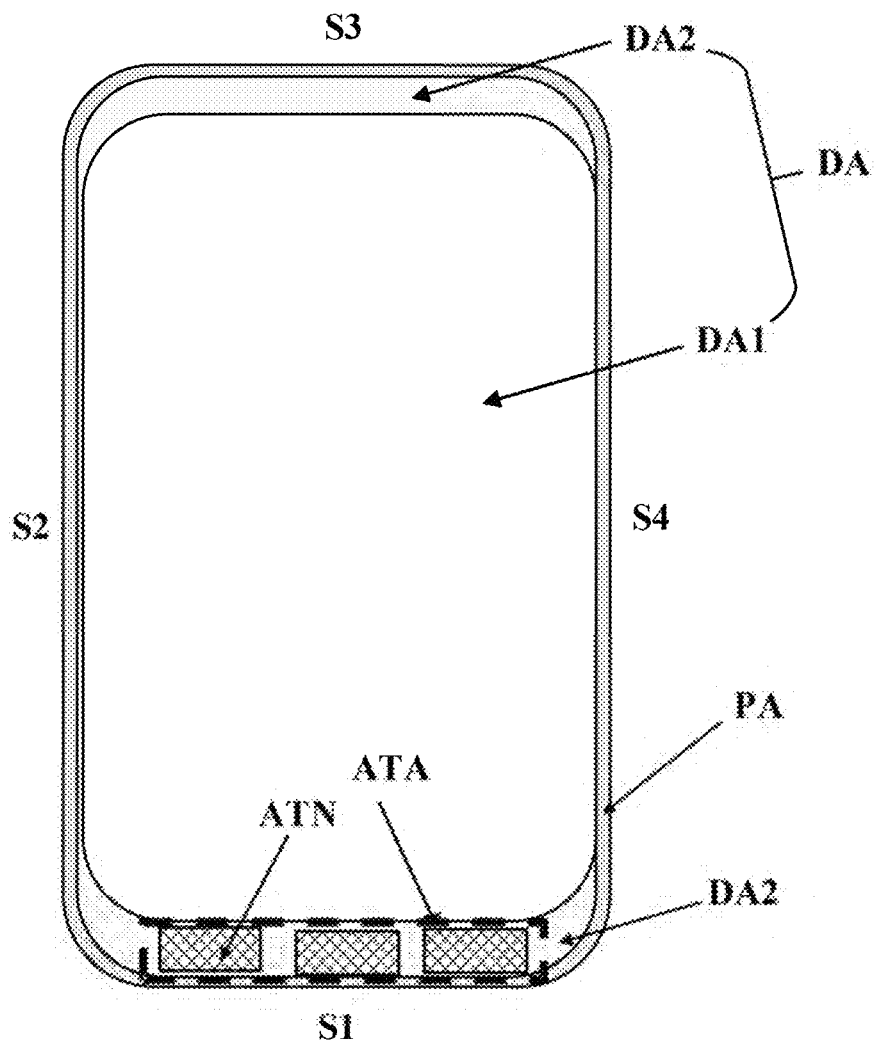
FIG. 15 is a plan view of a display apparatus in some embodiments according to the present disclosure.
Figure 16A:
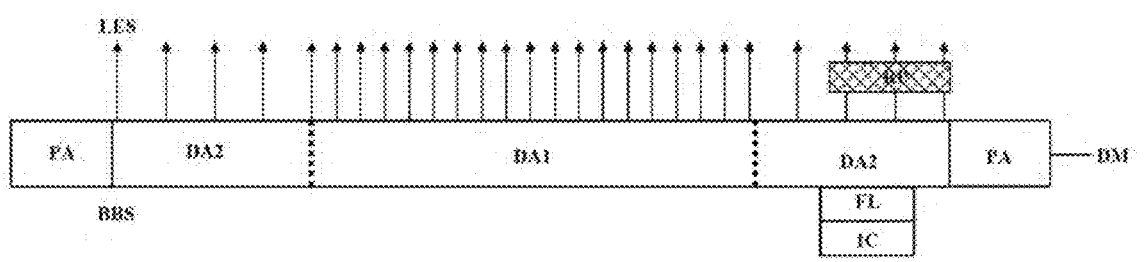
FIG. 16A is a cross-sectional view of a portion of a display apparatus in some embodiments according to the present disclosure.

FIG. 14 is a plan view of a display apparatus in some embodiments according to the present disclosure. FIG. 15 is a plan view of a display apparatus in some embodiments according to the present disclosure. FIG. 16A is a cross-sectional view of a portion of a display apparatus in some embodiments according to the present disclosure. Referring to FIG. 14 to FIG. 16A, the display apparatus in some embodiments includes a peripheral area PA and a display area DA. In some embodiments, the display area DA of the display apparatus includes a first display sub-area DA1 and a second display sub-area DA2. Optionally, the first display sub-area DA1 and the second display sub-area DA2 are non-overlapping with each other. Optionally, the first display sub-area DA1 and the second display sub-area DA2 are continuous display regions so that an image may be displayed throughout the first display sub-area DA1 and the second display sub-area DA2 without interruption. An integral image may be displayed in the display apparatus. In some embodiments, a radiating plate RP of the antenna ATN is on a light emitting side LES of the display module DM, while a feed line FL and/or an integrated circuit IC may be placed on a back side BBS of the display module DM.

In some embodiments, the second display sub-area DA2 has a light transmittance rate lower than a light transmittance rate of the first display sub-area DA1. In some embodiments, the second display sub-area DA2 has an area occupied by non-transparent components lower than an area occupied by non-transparent components of the first display sub-area DA1.

In some embodiments, the second display sub-area DA2 has a subpixel distribution density lower than a subpixel distribution density of the first display sub-area DA1. As used herein, the term "subpixel distribution density" refers to a number of subpixels contained within a given area of a display apparatus. As used herein, the subpixel refers to minimum light emitting unit in the display apparatus.

In some embodiments, the display apparatus further includes an antenna area ATA having an antenna ATN. In some embodiments, the antenna area ATA is at least partially in the second display area DA2. Optionally, the antenna area ATA is completely in the second display area DA2.

Referring to FIG. 14, in some embodiments, the second display sub-area DA2 is on at least one of a second side S2 or a fourth side S4 of the first display sub-area DA1. Optionally, the second display sub-area DA2 is absent on at least one of a first side S1 or a third side S3 of the first display sub-area DA1. Optionally, the first side S1 and the third side S3 are opposite to each other. Optionally, the second side S2 and the fourth side S4 are opposite to each other. In one example, the antenna ATN is in a portion of the second display sub-area DA2 on the second side S2 of the first display sub-area DA1. In another example, the antenna ATN is in a portion of the second display sub-area DA2 on the fourth side S4 of the first display sub-area DAL.

Referring to FIG. 15, in some embodiments, the second display sub-area DA2 is on at least one of a first side S1 or a third side S3 of the first display sub-area DA1. Optionally, the second display sub-area DA2 is absent on at least one of a second side S2 or a fourth side S4 of the first display sub-area DA1. Optionally, the first side S1 and the third side S3 are opposite to each other. Optionally, the second side S2 and the fourth side S4 are opposite to each other. In one example, the antenna ATN is in a portion of the second display sub-area DA2 on the first side S1 of the first display sub-area DA1. In another example, the antenna ATN is in a portion of the second display sub-area DA2 on the third side S3 of the first display sub-area DA1.

In the display module DM, the subpixel distribution density in the second display sub-area DA2 is determined based on the components and display requirements of the second display sub-area DA2. For example, the second display sub-area DA2 may include under-display cameras, under-display fingerprint sensors, antennas, and so on. When placing an under-display antenna in the second display sub-area DA2, an optimal display effect can be achieved when the subpixel distribution density is relatively lower, as it can affect antenna radiation. Conversely, when the subpixel distribution density is too low, it may impact the display quality though a better radiation performance can be achieved.

In some embodiments, a ratio of a subpixel distribution density in the second display sub-area DA2 to a subpixel distribution density in the first display sub-area DA1 is less than 1:1, e.g., less than 1:1.5, less than 1:2.0, less than 1:2.5, less than 1:3.0, less than 1:3.5, less than 1:4.0, less than 1:4.5, less than 1:5.0, less than 1:5.5, less than 1:6.0, less than 1:6.5, less than 1:7.0, less than 1:7.5, less than 1:8.0, less than 1:8.5, less than 1:9.0, less than 1:9.5, or less than 1:10.0. In some embodiments, the ratio of the subpixel distribution density in the second display sub-area DA2 to the subpixel distribution density in the first display sub-area DA1 is greater than 1:100, e.g., greater than 1:95, greater than 1:90, greater than 1:85, greater than 1:80, greater than 1:75, greater than 1:70, greater than 1:65, greater than 1:60, greater than 1:55, greater than 1:50, greater than 1:45, greater than 1:40, greater than 1:35, greater than 1:30, greater than 1:25, greater than 1:20, greater than 1:15, greater than 1:10, or greater than 1:5.

In one example, a ratio of a subpixel distribution density in the second display sub-area DA2 to a subpixel distribution density in the first display sub-area DA1 is no less than 1:4. In another example, in case the display module DM has a higher resolution, the ratio of a subpixel distribution density in the second display sub-area DA2 to a subpixel distribution density in the first display sub-area DA1 may be lower than 1:4. The second display sub-area DA2 serves as the low-density subpixel region and is primarily located around a periphery of the first display sub-area DA1, such as near the left and right borders or the top and bottom borders. This placement allows antennas to be closer to the edges to minimize path losses in the feed line FL. Additionally, reducing the display resolution in the peripheral regions has minimal visual impact on the overall display, thereby mitigating display variations caused by different pixel densities.

Figure 16B:
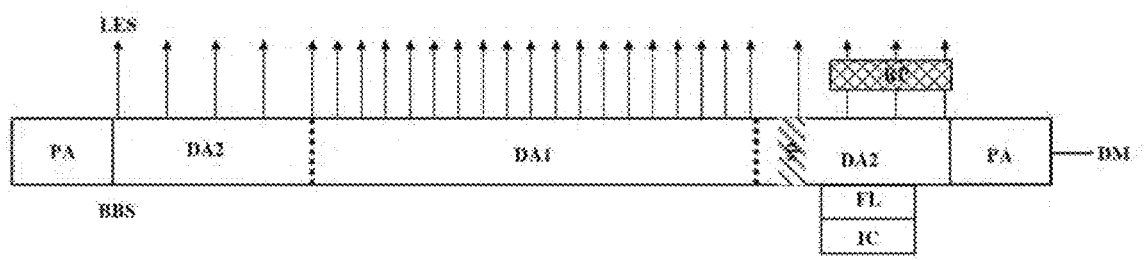
FIG. 16B is a cross-sectional view of a portion of a display apparatus in some embodiments according to the present disclosure.

FIG. 16B is a cross-sectional view of a portion of a display apparatus in some embodiments according to the present disclosure. Referring to FIG. 16B, in some embodiments, an orthographic projection of the radiating plate RP on a base substrate is non-overlapping with an orthographic projection of a subpixel sp in the second display sub-area DA2 on the base substrate.

Figure 16C:
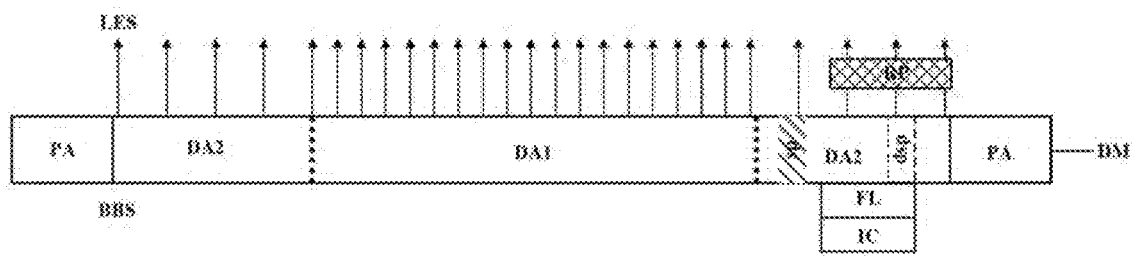
FIG. 16C is across-sectional view of a portion of a display apparatus in some embodiments according to the present disclosure.

FIG. 16C is a cross-sectional view of a portion of a display apparatus in some embodiments according to the present disclosure. Referring to FIG. 16C, in some embodiments, an orthographic projection of the radiating plate RP on a base substrate is non-overlapping with an orthographic projection of a subpixel sp in the second display sub-area DA2 on the base substrate. Optionally, the orthographic projection of the radiating plate RP on the base substrate is at least partially overlapping with an orthographic projection of a dummy subpixel dsp in the second display sub-area DA2 on the base substrate.

Figure 17:
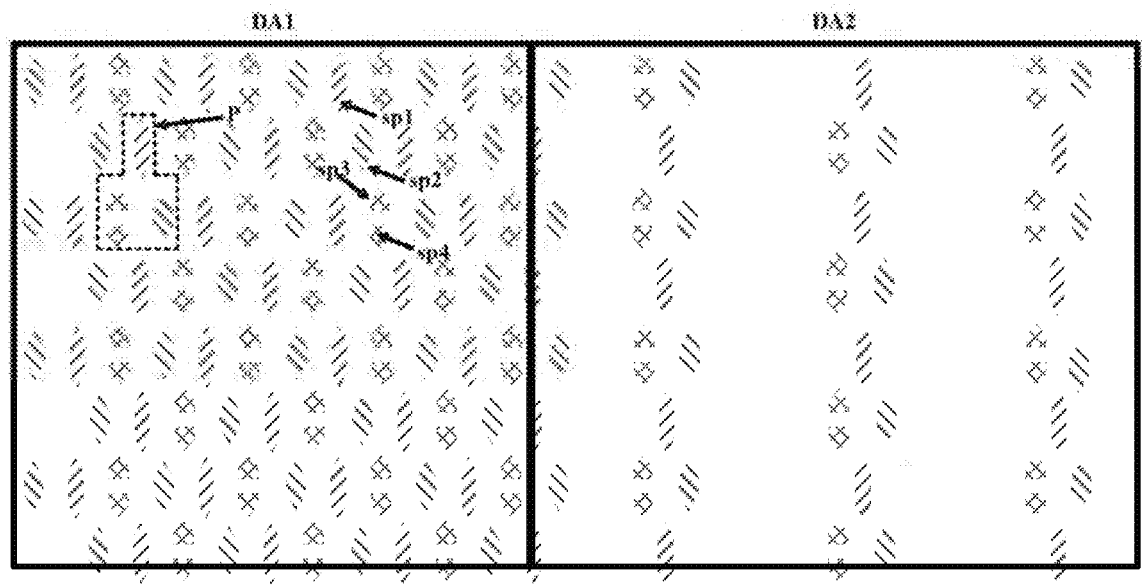
FIG. 17 illustrates subpixel distribution densities in a first display sub-area and a second display sub-area in a display apparatus in some embodiments according to the present disclosure.

FIG. 17 illustrates subpixel distribution densities in a first display sub-area and a second display sub-area in a display apparatus in some embodiments according to the present disclosure. Referring to FIG. 17, a subpixel distribution density in the second display sub-area DA2 is lower than a subpixel distribution density in the first display sub-area DA1. In one example depicted in FIG. 17, a ratio of a subpixel distribution density in the second display sub-area DA2 to a subpixel distribution density in the first display sub-area DA1 is in a range of 1:2.5 to 1:3.5. In one specific example, the ratio of the subpixel distribution density in the second display sub-area DA2 to the subpixel distribution density in the first display sub-area DA1 is 1:3.

Referring to FIG. 17, in one example, a pixel in the display module includes four subpixels, including a first subpixel sp1, a second subpixel sp2, a third subpixel sp3, and a fourth subpixel sp4. In one example, the first subpixel sp1 is a subpixel of a first color, the second subpixel sp2 is a subpixel of a second color, and the third subpixel sp3 and the fourth subpixel sp4 are subpixels of a third color. In another example, the first subpixel sp1 is a red subpixel, the second subpixel sp2 is a blue subpixel, and the third subpixel sp3 and the fourth subpixel sp4 are green subpixels.

In one example, the red subpixels and green subpixels are arranged in a staggered and offset manner, while the blue subpixels and green subpixels are arranged in the same row but not in the same column. Within a same pixel, the two green subpixels are positioned adjacent to each other along the column direction and are symmetric with respect to the row direction, and the two green subpixels within the same pixel are mirror images of each other. The individual emitting area of a green subpixel is smaller than that of a red subpixel, and the individual emitting area of a green subpixel is also smaller than that of a blue subpixel. This is because the green subpixel has a higher emission efficiency compared to the other color subpixels.

In some embodiments, the number of red subpixels is the same as the number of blue subpixels, while the number of green subpixels is twice the number of red subpixels, and twice the number of blue subpixels. A red subpixel has a substantially same area as a blue subpixel. The subpixels may adopt various appropriate shapes. The subpixels may have regular or irregular shapes.

Because the subpixel distribution density in the second display sub-area DA2 is lower than the subpixel distribution density in the first display sub-area DA1, it allows for wave transmission through the second display sub-area DA2, enabling electromagnetic waves to pass through the display module.

Figure 18:
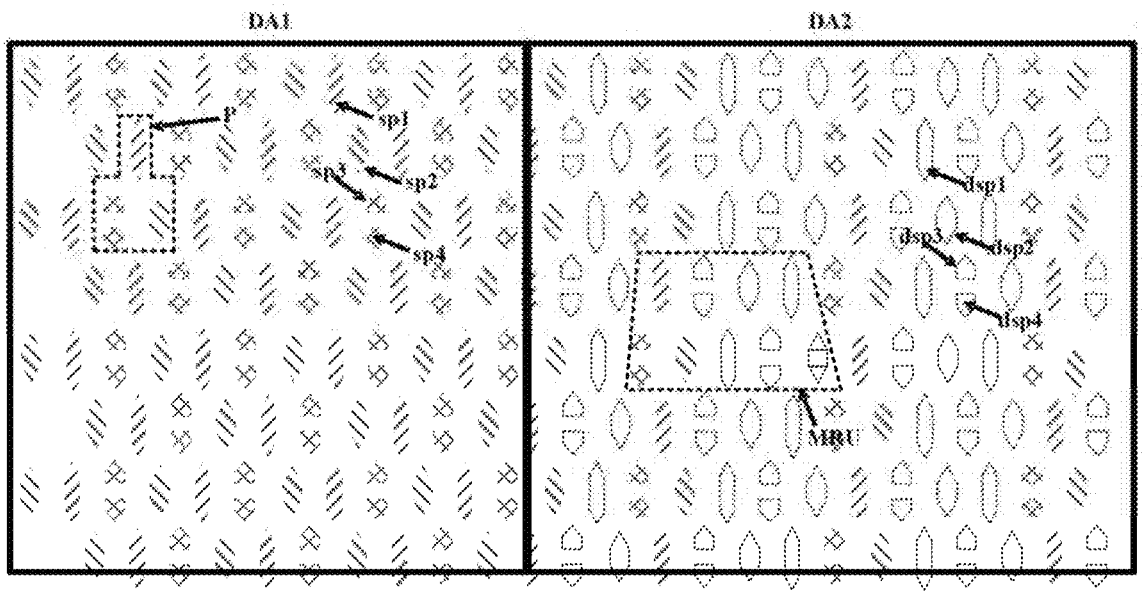
FIG. 18 illustrates subpixel distribution densities in a first display sub-area and a second display sub-area in a display apparatus in some embodiments according to the present disclosure.

FIG. 18 illustrates subpixel distribution densities in a first display sub-area and a second display sub-area in a display apparatus in some embodiments according to the present disclosure. Referring to FIG. 18, the second display sub-area DA2 in some embodiments further includes a plurality of dummy subpixels, including a first dummy subpixel dsp1, a second dummy subpixel dsp2, a third dummy subpixel dsp3, and a fourth dummy subpixel dsp4. The first dummy subpixel dsp1 corresponds to the first subpixel sp1 in the first display sub-area DA1, the second dummy subpixel dsp2 corresponds to the second subpixel sp2 in the first display sub-area DA1, the third dummy subpixel dsp3 corresponds to the third subpixel sp3 in the first display sub-area DA1, and the fourth dummy subpixel dsp4 corresponds to the fourth subpixel sp4 in the first display sub-area DA1.

As used herein, the term "dummy" refers to a subpixel that has a structure that is the same as or similar to an active subpixel, but the structure is only used for a configuration existing as a pattern, without actually performing a function in the display apparatus. Thus, an electrical signal may not be applied to a "dummy" subpixel or even in a case in which an electrical signal is applied thereto, the "dummy" subpixel may not perform an electrically equivalent function.

In some embodiments, as compared to a subpixel, a dummy subpixel is absent of a functional layer in the dummy subpixel. In one example, as compared to a subpixel, a dummy subpixel is absent of a light emitting layer in the dummy subpixel. In another example, as compared to a subpixel, a dummy subpixel is absent of an anode in the dummy subpixel. In another example, as compared to a subpixel, a dummy subpixel is absent of a transistor in a pixel driving circuit of the dummy subpixel. In another example, as compared to a subpixel, a dummy subpixel is absent of a capacitor in a pixel driving circuit of the dummy subpixel. The absence of the layer or component in the dummy subpixel is conducive to reduction of effective metal area and reduction of interference on electromagnetic waves. By having the dummy subpixels, wave transmission capabilities in the second display sub-area DA2 can be enhanced.

A minimum repeating unit MRU in the second display sub-area DA2 is shown in FIG. 18. In one example, the minimum repeating unit MRU includes one pixel and two dummy pixels. The one pixel in the minimum repeating unit MRU includes a first subpixel sp1, a second subpixel sp2, a third subpixel sp3, and a fourth subpixel sp4. Each of the two dummy pixels includes a first dummy subpixel dsp1, a second dummy subpixel dsp2, a third dummy subpixel dsp3, and a fourth dummy subpixel dsp4.

Figure 19:
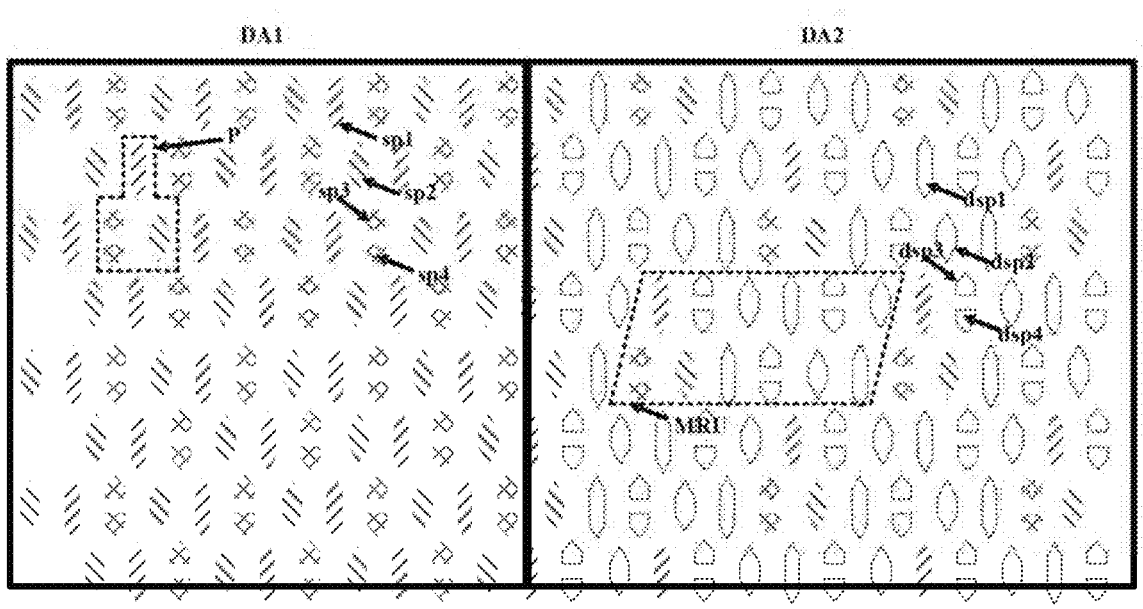
FIG. 19 illustrates subpixel distribution densities in a first display sub-area and a second display sub-area in a display apparatus in some embodiments according to the present disclosure.

FIG. 19 illustrates subpixel distribution densities in a first display sub-area and a second display sub-area in a display apparatus in some embodiments according to the present disclosure. Referring to FIG. 19, a subpixel distribution density in the second display sub-area DA2 is lower than a subpixel distribution density in the first display sub-area DA1. In one example depicted in FIG. 19, a ratio of a subpixel distribution density in the second display sub-area DA2 to a subpixel distribution density in the first display sub-area DA1 is in a range of 1:3.5 to 1:4.5. In one specific example, the ratio of the subpixel distribution density in the second display sub-area DA2 to the subpixel distribution density in the first display sub-area DA1 is 1:4.

A minimum repeating unit MRU in the second display sub-area DA2 is shown in FIG. 19. In one example, the minimum repeating unit MRU includes one pixel and three dummy pixels. The one pixel in the minimum repeating unit MRU includes a first subpixel sp1, a second subpixel sp2, a third subpixel sp3, and a fourth subpixel sp4. Each of the three dummy pixels includes a first dummy subpixel dsp1, a second dummy subpixel dsp2, a third dummy subpixel dsp3, and a fourth dummy subpixel dsp4.

Figure 20:
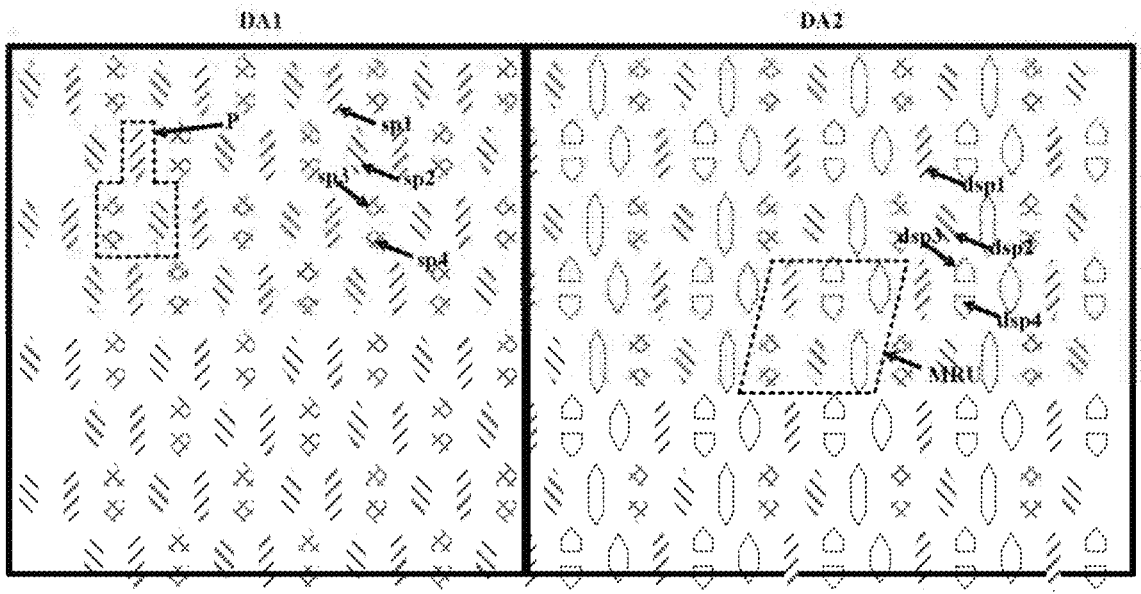
FIG. 20 illustrates subpixel distribution densities in a first display sub-area and a second display sub-area in a display apparatus in some embodiments according to the present disclosure.

FIG. 20 illustrates subpixel distribution densities in a first display sub-area and a second display sub-area in a display apparatus in some embodiments according to the present disclosure. Referring to FIG. 20, a subpixel distribution density in the second display sub-area DA2 is lower than a subpixel distribution density in the first display sub-area DA1. In one example depicted in FIG. 20, a ratio of a subpixel distribution density in the second display sub-area DA2 to a subpixel distribution density in the first display sub-area DA1 is in a range of 1:1.5 to 1:2.5. In one specific example, the ratio of the subpixel distribution density in the second display sub-area DA2 to the subpixel distribution density in the first display sub-area DA1 is 1:2.

A minimum repeating unit MRU in the second display sub-area DA2 is shown in FIG. 20. In one example, the minimum repeating unit MRU includes one pixel and one dummy pixel. The one pixel in the minimum repeating unit MRU includes a first subpixel sp1, a second subpixel sp2, a third subpixel sp3, and a fourth subpixel sp4. The one dummy pixels includes a first dummy subpixel dsp1, a second dummy subpixel dsp2, a third dummy subpixel dsp3, and a fourth dummy subpixel dsp4.

Figure 21:
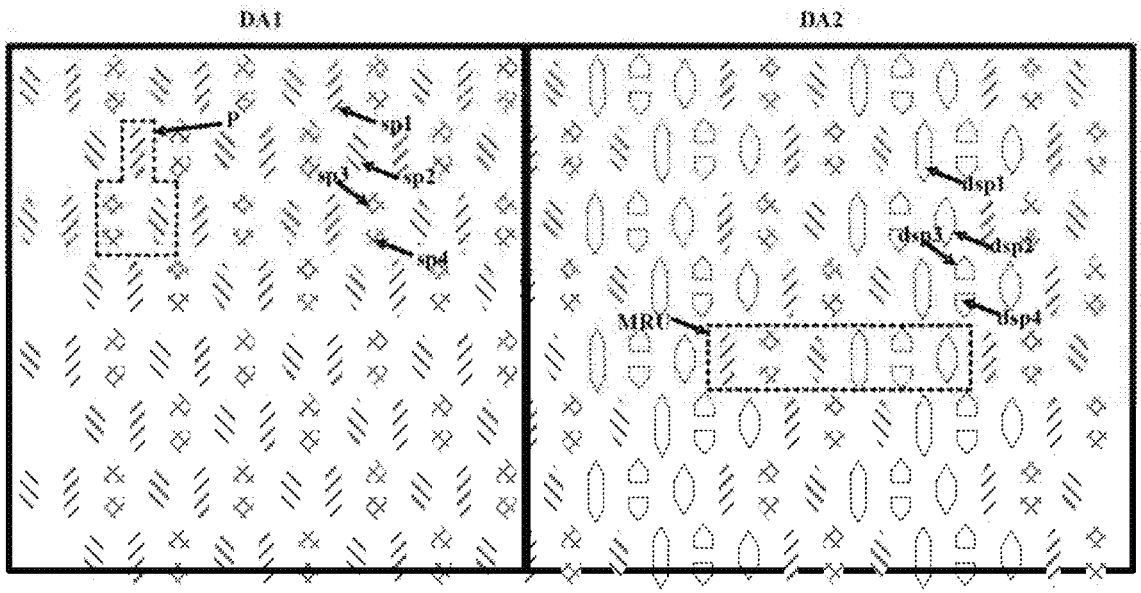
FIG. 21 illustrates subpixel distribution densities in a first display sub-area and a second display sub-area in a display apparatus in some embodiments according to the present disclosure.

FIG. 21 illustrates subpixel distribution densities in a first display sub-area and a second display sub-area in a display apparatus in some embodiments according to the present disclosure. Referring to FIG. 21, a subpixel distribution density in the second display sub-area DA2 is lower than a subpixel distribution density in the first display sub-area DA1. In one example depicted in FIG. 21, a ratio of a subpixel distribution density in the second display sub-area DA2 to a subpixel distribution density in the first display sub-area DA1 is in a range of 1:1.5 to 1:2.5. In one specific example, the ratio of the subpixel distribution density in the second display sub-area DA2 to the subpixel distribution density in the first display sub-area DA1 is 1:2.

A minimum repeating unit MRU in the second display sub-area DA2 is shown in FIG. 21. In one example, the minimum repeating unit MRU includes one pixel and one dummy pixel. The one pixel in the minimum repeating unit MRU includes a first subpixel sp1, a second subpixel sp2, a third subpixel sp3, and a fourth subpixel sp4. The one dummy pixels includes a first dummy subpixel dsp1, a second dummy subpixel dsp2, a third dummy subpixel dsp3, and a fourth dummy subpixel dsp4.

In the display apparatus depicted in FIG. 21, subpixels in a pixel in the second display sub-area DA2 have a different arrangement from subpixels in a pixel in the first display sub-area DA1; and that dummy subpixels in a dummy pixel in the second display sub-area DA2 have a different arrangement from the subpixels in the pixel in the first display sub-area DA1. In the display apparatus depicted in FIG. 20, subpixels in a pixel in the second display sub-area DA2 have a same arrangement as subpixels in a pixel in the first display sub-area DA1; and that dummy subpixels in a dummy pixel in the second display sub-area DA2 have a same arrangement as the subpixels in the pixel in the first display sub-area DA1.

In the pixel in the second display sub-area DA2 in the display apparatus depicted in FIG. 21, the first subpixel sp1 and the second subpixel sp2 are arranged in a same row. The third subpixel sp3 and the fourth subpixel sp4 are arranged in a same column, and are between the first subpixel sp1 and the second subpixel sp2.

In the dummy pixel in the second display sub-area DA2 in the display apparatus depicted in FIG. 21, the first dummy subpixel dsp1 and the second dummy subpixel dsp2 are arranged in a same row. The third dummy subpixel dsp3 and the fourth dummy subpixel dsp4 are arranged in a same column, and are between the first dummy subpixel dsp1 and the second dummy subpixel dsp2.

In the pixel in the first display sub-area DA1 in the display apparatus depicted in FIG. 21, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the pixel in the first display sub-area DA1 in the display apparatus depicted in FIG. 20, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the pixel in the second display sub-area DA2 in the display apparatus depicted in FIG. 20, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the dummy pixel in the second display sub-area DA2 in the display apparatus depicted in FIG. 20, the third dummy subpixel dsp3 and the fourth dummy subpixel dsp4 are arranged in a same column. The third dummy subpixel dsp3 and the fourth dummy subpixel dsp4 together are arranged in a same row as the second dummy subpixel dsp2. The first dummy subpixel dsp1 is not in a same row or in a same column as the other dummy subpixels.

Figure 22:
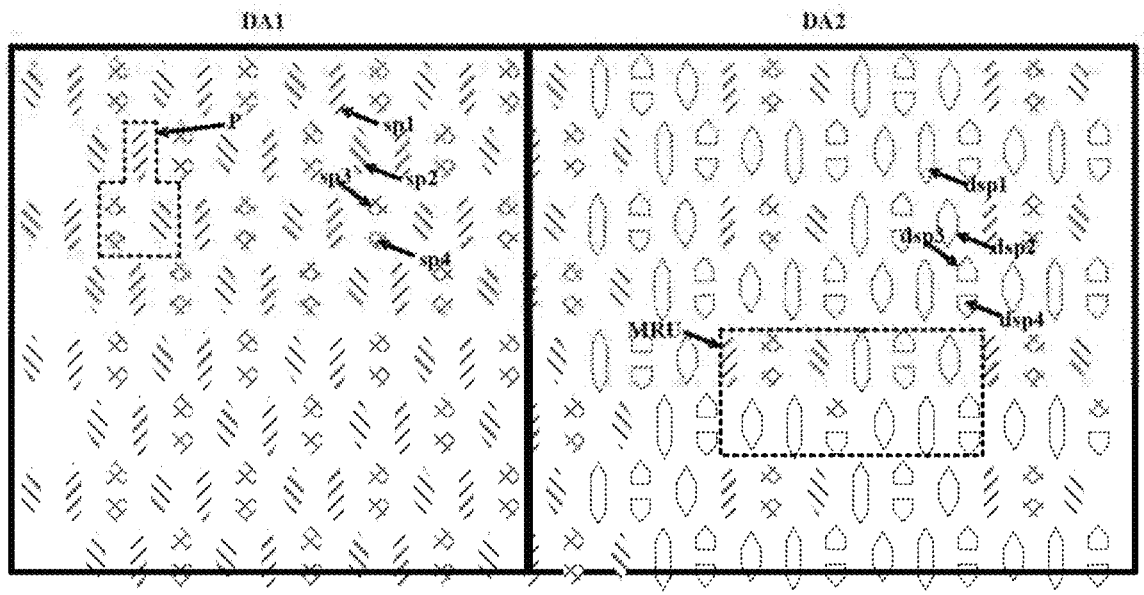
FIG. 22 illustrates subpixel distribution densities in a first display sub-area and a second display sub-area in a display apparatus in some embodiments according to the present disclosure.

FIG. 22 illustrates subpixel distribution densities in a first display sub-area and a second display sub-area in a display apparatus in some embodiments according to the present disclosure. Referring to FIG. 22, a subpixel distribution density in the second display sub-area DA2 is lower than a subpixel distribution density in the first display sub-area DA1. In one example depicted in FIG. 22, a ratio of a subpixel distribution density in the second display sub-area DA2 to a subpixel distribution density in the first display sub-area DA1 is in a range of 1:3.5 to 1:4.5. In one specific example, the ratio of the subpixel distribution density in the second display sub-area DA2 to the subpixel distribution density in the first display sub-area DA1 is 1:4.

A minimum repeating unit MRU in the second display sub-area DA2 is shown in FIG. 22. In one example, the minimum repeating unit MRU includes one pixel and three dummy pixels. The one pixel in the minimum repeating unit MRU includes a first subpixel sp1, a second subpixel sp2, a third subpixel sp3, and a fourth subpixel sp4. Each of the three dummy pixels includes a first dummy subpixel dsp1, a second dummy subpixel dsp2, a third dummy subpixel dsp3, and a fourth dummy subpixel dsp4.

In the display apparatus depicted in FIG. 22, subpixels in a pixel in the second display sub-area DA2 have a different arrangement from subpixels in a pixel in the first display sub-area DA1; and that dummy subpixels in a dummy pixel in the second display sub-area DA2 have a different arrangement from the subpixels in the pixel in the first display sub-area DA1. In the display apparatus depicted in FIG. 19, subpixels in a pixel in the second display sub-area DA2 have a same arrangement as subpixels in a pixel in the first display sub-area DA1; and that dummy subpixels in a dummy pixel in the second display sub-area DA2 have a same arrangement as the subpixels in the pixel in the first display sub-area DA1.

In the pixel in the second display sub-area DA2 in the display apparatus depicted in FIG. 22, the first subpixel sp1 and the second subpixel sp2 are arranged in a same row. The third subpixel sp3 and the fourth subpixel sp4 are arranged in a same column, and are between the first subpixel sp1 and the second subpixel sp2.

In the dummy pixel in the second display sub-area DA2 in the display apparatus depicted in FIG. 22, the first dummy subpixel dsp1 and the second dummy subpixel dsp2 are arranged in a same row. The third dummy subpixel dsp3 and the fourth dummy subpixel dsp4 are arranged in a same column, and are between the first dummy subpixel dsp1 and the second dummy subpixel dsp2.

In the pixel in the first display sub-area DA1 in the display apparatus depicted in FIG. 22, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the pixel in the first display sub-area DA1 in the display apparatus depicted in FIG. 19, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the pixel in the second display sub-area DA2 in the display apparatus depicted in FIG. 19, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the dummy pixel in the second display sub-area DA2 in the display apparatus depicted in FIG. 19, the third dummy subpixel dsp3 and the fourth dummy subpixel dsp4 are arranged in a same column. The third dummy subpixel dsp3 and the fourth dummy subpixel dsp4 together are arranged in a same row as the second dummy subpixel dsp2. The first dummy subpixel dsp1 is not in a same row or in a same column as the other dummy subpixels.

Figure 23:
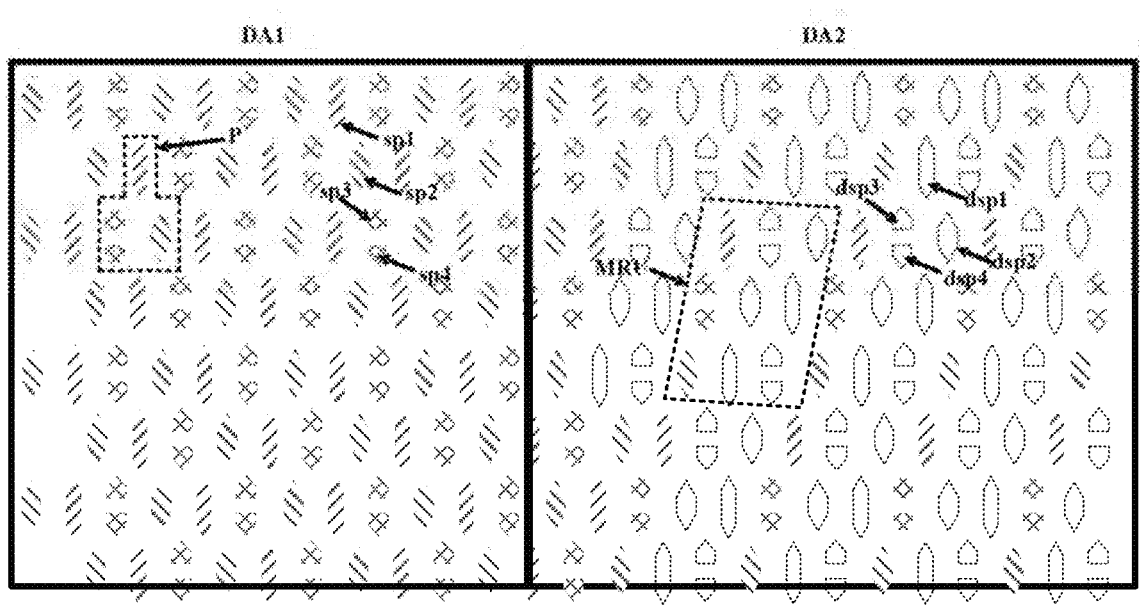
FIG. 23 illustrates subpixel distribution densities in a first display sub-area and a second display sub-area in a display apparatus in some embodiments according to the present disclosure.

FIG. 23 illustrates subpixel distribution densities in a first display sub-area and a second display sub-area in a display apparatus in some embodiments according to the present disclosure. Referring to FIG. 23, a subpixel distribution density in the second display sub-area DA2 is lower than a subpixel distribution density in the first display sub-area DA1. In one example depicted in FIG. 23, a ratio of a subpixel distribution density in the second display sub-area DA2 to a subpixel distribution density in the first display sub-area DA1 is in a range of 1:2.5 to 1:3.5. In one specific example, the ratio of the subpixel distribution density in the second display sub-area DA2 to the subpixel distribution density in the first display sub-area DA1 is 1:3.

A minimum repeating unit MRU in the second display sub-area DA2 is shown in FIG. 23. In one example, the minimum repeating unit MRU includes one pixel and two dummy pixels. The one pixel in the minimum repeating unit MRU includes a first subpixel sp1, a second subpixel sp2, a third subpixel sp3, and a fourth subpixel sp4. Each of the two dummy pixels includes a first dummy subpixel dsp1, a second dummy subpixel dsp2, a third dummy subpixel dsp3, and a fourth dummy subpixel dsp4.

In the display apparatus depicted in FIG. 23, subpixels in a pixel in the second display sub-area DA2 have a different arrangement from subpixels in a pixel in the first display sub-area DA1; and that dummy subpixels in a dummy pixel in the second display sub-area DA2 have a different arrangement from the subpixels in the pixel in the first display sub-area DA1. In the display apparatus depicted in FIG. 18, subpixels in a pixel in the second display sub-area DA2 have a same arrangement as subpixels in a pixel in the first display sub-area DA1; and that dummy subpixels in a dummy pixel in the second display sub-area DA2 have a same arrangement as the subpixels in the pixel in the first display sub-area DA1.

In the pixel in the second display sub-area DA2 in the display apparatus depicted in FIG. 23, the third subpixel sp3 and the fourth subpixel sp4 are arranged in a same column. The third subpixel sp3 and the fourth subpixel sp4 are in a different column from the first subpixel sp1, and are in a different column from the second subpixel sp2. The first subpixel sp1 and the second subpixel sp2 are arranged in different columns. The first subpixel sp1 is in a different row from the second subpixel sp2. The first subpixel sp1 is in a different row from the third subpixel sp3 and the fourth subpixel sp4. The second subpixel sp2 in a different row from the third subpixel sp3 and the fourth subpixel sp4.

In the dummy pixel in the second display sub-area DA2 in the display apparatus depicted in FIG. 23, the third dummy subpixel dsp3 and the fourth dummy subpixel dsp4 are arranged in a same column. The third dummy subpixel dsp3 and the fourth dummy subpixel dsp4 are in a different column from the first dummy subpixel dsp1, and are in a different column from the second dummy subpixel dsp2. The first dummy subpixel dsp1 and the second dummy subpixel dsp2 are arranged in different columns. The first dummy subpixel dsp1 is in a different row from the second dummy subpixel dsp2. The first dummy subpixel dsp1 is in a different row from the third dummy subpixel dsp3 and the fourth dummy subpixel dsp4. The second dummy subpixel dsp2 in a different row from the third dummy subpixel dsp3 and the fourth dummy subpixel dsp4.

In the pixel in the first display sub-area DA1 in the display apparatus depicted in FIG. 23, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the pixel in the first display sub-area DA1 in the display apparatus depicted in FIG. 18, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the pixel in the second display sub-area DA2 in the display apparatus depicted in FIG. 18, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the dummy pixel in the second display sub-area DA2 in the display apparatus depicted in FIG. 18, the third dummy subpixel dsp3 and the fourth dummy subpixel dsp4 are arranged in a same column. The third dummy subpixel dsp3 and the fourth dummy subpixel dsp4 together are arranged in a same row as the second dummy subpixel dsp2. The first dummy subpixel dsp1 is not in a same row or in a same column as the other dummy subpixels.

Figure 24:
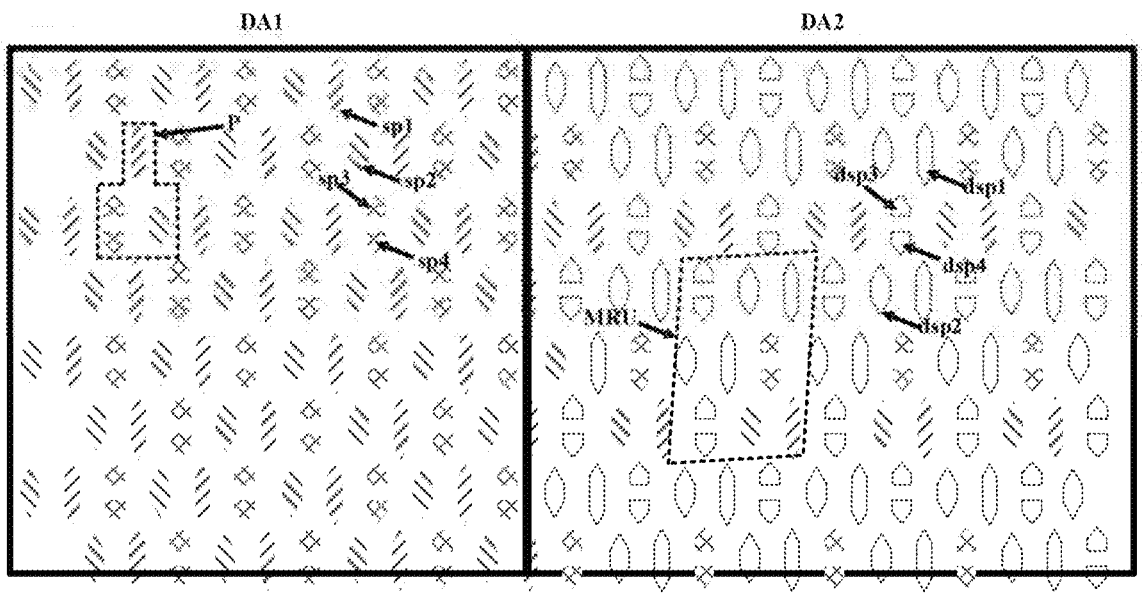
FIG. 24 illustrates subpixel distribution densities in a first display sub-area and a second display sub-area in a display apparatus in some embodiments according to the present disclosure.

FIG. 24 illustrates subpixel distribution densities in a first display sub-area and a second display sub-area in a display apparatus in some embodiments according to the present disclosure. Referring to FIG. 24, a subpixel distribution density in the second display sub-area DA2 is lower than a subpixel distribution density in the first display sub-area DA1. In one example depicted in FIG. 24, a ratio of a subpixel distribution density in the second display sub-area DA2 to a subpixel distribution density in the first display sub-area DA1 is in a range of 1:2.5 to 1:3.5. In one specific example, the ratio of the subpixel distribution density in the second display sub-area DA2 to the subpixel distribution density in the first display sub-area DA1 is 1:3.

A minimum repeating unit MRU in the second display sub-area DA2 is shown in FIG. 24. In one example, the minimum repeating unit MRU includes one pixel and two dummy pixels. The one pixel in the minimum repeating unit MRU includes a first subpixel sp1, a second subpixel sp2, a third subpixel sp3, and a fourth subpixel sp4. Each of the two dummy pixels includes a first dummy subpixel dsp1, a second dummy subpixel dsp2, a third dummy subpixel dsp3, and a fourth dummy subpixel dsp4.

In the display apparatus depicted in FIG. 24, subpixels in a pixel in the second display sub-area DA2 have a different arrangement from subpixels in a pixel in the first display sub-area DA1; and that dummy subpixels in a dummy pixel in the second display sub-area DA2 have a different arrangement from the subpixels in the pixel in the first display sub-area DA1. In the display apparatus depicted in FIG. 18, subpixels in a pixel in the second display sub-area DA2 have a same arrangement as subpixels in a pixel in the first display sub-area DA1; and that dummy subpixels in a dummy pixel in the second display sub-area DA2 have a same arrangement as the subpixels in the pixel in the first display sub-area DA1.

In the pixel in the second display sub-area DA2 in the display apparatus depicted in FIG. 24, the third subpixel sp3 and the fourth subpixel sp4 are arranged in a same column. The third subpixel sp3 and the fourth subpixel sp4 are in a different column from the first subpixel sp1, and are in a different column from the second subpixel sp2. The first subpixel sp1 and the second subpixel sp2 are arranged in different columns. The first subpixel sp1 and the second subpixel sp2 are in a same row. The first subpixel sp1 is in a different row from the third subpixel sp3 and the fourth subpixel sp4. The second subpixel sp2 in a different row from the third subpixel sp3 and the fourth subpixel sp4.

In a first of the two dummy pixels in the second display sub-area DA2 in the display apparatus depicted in FIG. 24, the third dummy subpixel dsp3 and the fourth dummy subpixel dsp4 are arranged in a same column. The third dummy subpixel dsp3 and the fourth dummy subpixel dsp4 are in a different column from the first dummy subpixel dsp1, and are in a different column from the second dummy subpixel dsp2. The first dummy subpixel dsp1 and the second dummy subpixel dsp2 are arranged in different columns. The first dummy subpixel dsp1 and the second dummy subpixel dsp2 are in a same row. The first dummy subpixel dsp1 is in a different row from the third dummy subpixel dsp3 and the fourth dummy subpixel dsp4. The second dummy subpixel dsp2 in a different row from the third dummy subpixel dsp3 and the fourth dummy subpixel dsp4.

In a second of the two dummy pixels in the second display sub-area DA2 in the display apparatus depicted in FIG. 24, the first dummy subpixel dsp1 and the second dummy subpixel dsp2 are arranged in a same row. The third dummy subpixel dsp3 and the fourth dummy subpixel dsp4 are arranged in a same column, and are between the first dummy subpixel dsp1 and the second dummy subpixel dsp2.

In the pixel in the first display sub-area DA1 in the display apparatus depicted in FIG. 24, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the pixel in the first display sub-area DA1 in the display apparatus depicted in FIG. 18, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the pixel in the second display sub-area DA2 in the display apparatus depicted in FIG. 18, the third subpixel sp3 and the fourth subpixel sp4 are arranged in a same column. The third subpixel sp3 and the fourth subpixel sp4 together are arranged in a same row as the second subpixel sp2. The first subpixel sp1 is not in a same row or in a same column as the other subpixels.

In the dummy pixel in the second display sub-area DA2 in the display apparatus depicted in FIG. 18, the third dummy subpixel dsp3 and the fourth dummy subpixel dsp4 are arranged in a same column. The third dummy subpixel dsp3 and the fourth dummy subpixel dsp4 together are arranged in a same row as the second dummy subpixel dsp2. The first dummy subpixel dsp1 is not in a same row or in a same column as the other dummy subpixels.

Figure 25:
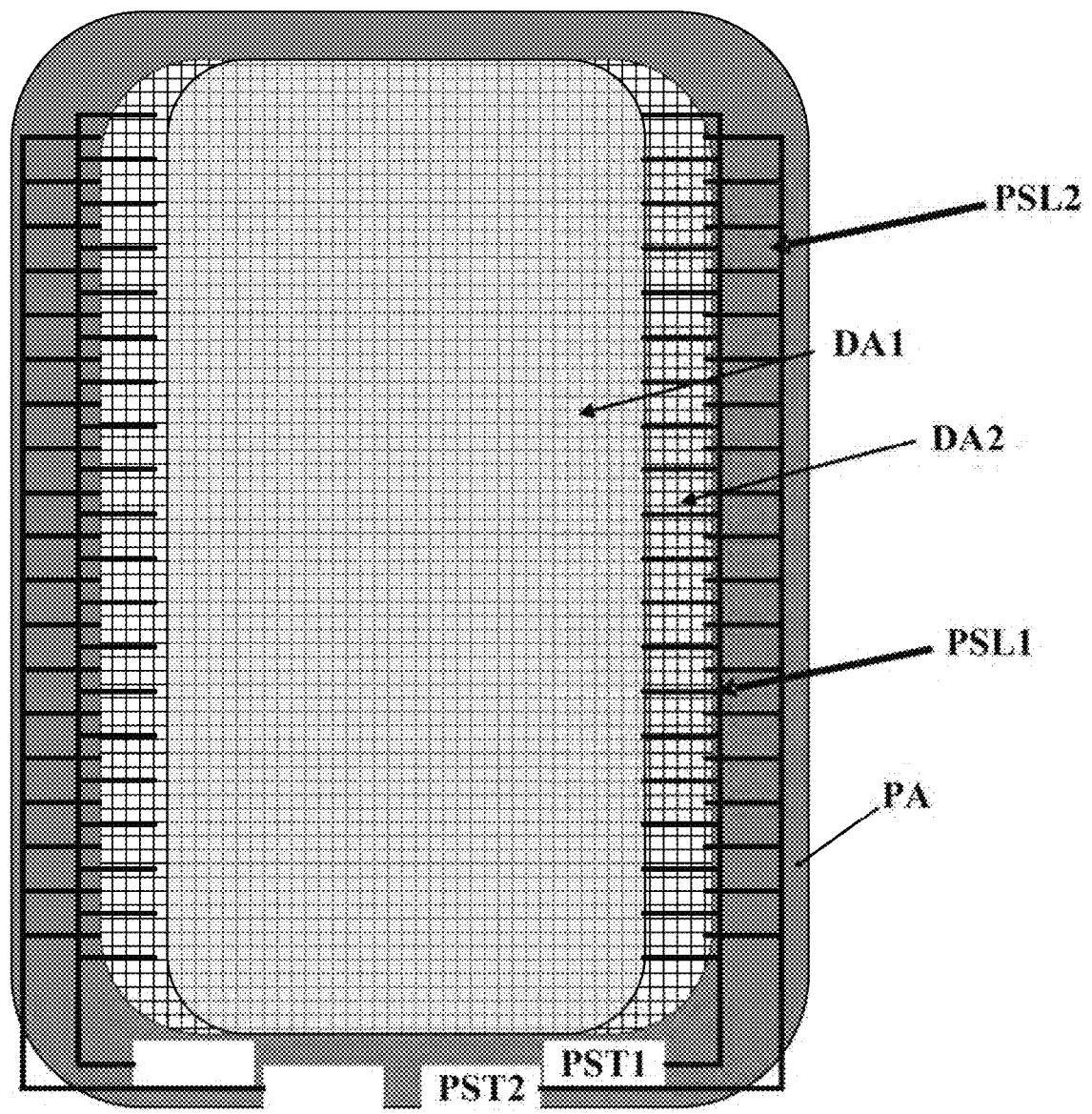
FIG. 25 illustrates a layout of signal lines in a display apparatus in some embodiments according to the present disclosure.

FIG. 25 illustrates a layout of signal lines in a display apparatus in some embodiments according to the present disclosure. Referring to FIG. 25, the display apparatus in some embodiments includes a first power supply terminal PST1 and a second power supply terminal PST2. Optionally, the first power supply terminal PST1 and the second power supply terminal PST2 are electrically isolated from each other. Optionally, the first power supply terminal PST1 and the second power supply terminal PST2 are configured to provide power supply signals of different voltage levels. Optionally, the first power supply terminal PST1 is configured to output a first power supply signal, and the second power supply terminal PST2 is configured to output a second power supply signal, the first power supply signal being different from the second power supply signal.

In some embodiments, the display apparatus further includes a first power supply signal line PSL1 and a second power supply signal line PSL2. The first power supply signal line PSL1 is connected to the first power supply terminal PST1, and is configured to transmit the first power supply signal to pixel driving circuits in the first display sub-area DA1. The second power supply signal line PSL2 is connected to the second power supply terminal PST2, and is configured to transmit the second power supply signal to pixel driving circuits in the second display sub-area DA2.

In some embodiments, the pixel driving circuits in the first display sub-area DA1 are configured to drive light emission in light emitting elements in the first display sub-area DA1 at least partially based on the first power supply signal; and the pixel driving circuits in the second display sub-area DA2 are configured to drive light emission in light emitting elements in the second display sub-area DA2 at least partially based on the second power supply signal. Due to the different subpixel distribution densities in between the first display sub-area DA1 and the second display sub-area DA2, different power supply signals are provided to pixel driving circuits in the first display sub-area DA1 and the second display sub-area DA2, respectively, to maintain consistent luminous effects, ensuring that there is no color deviation in the boundary regions.

Figure 26:
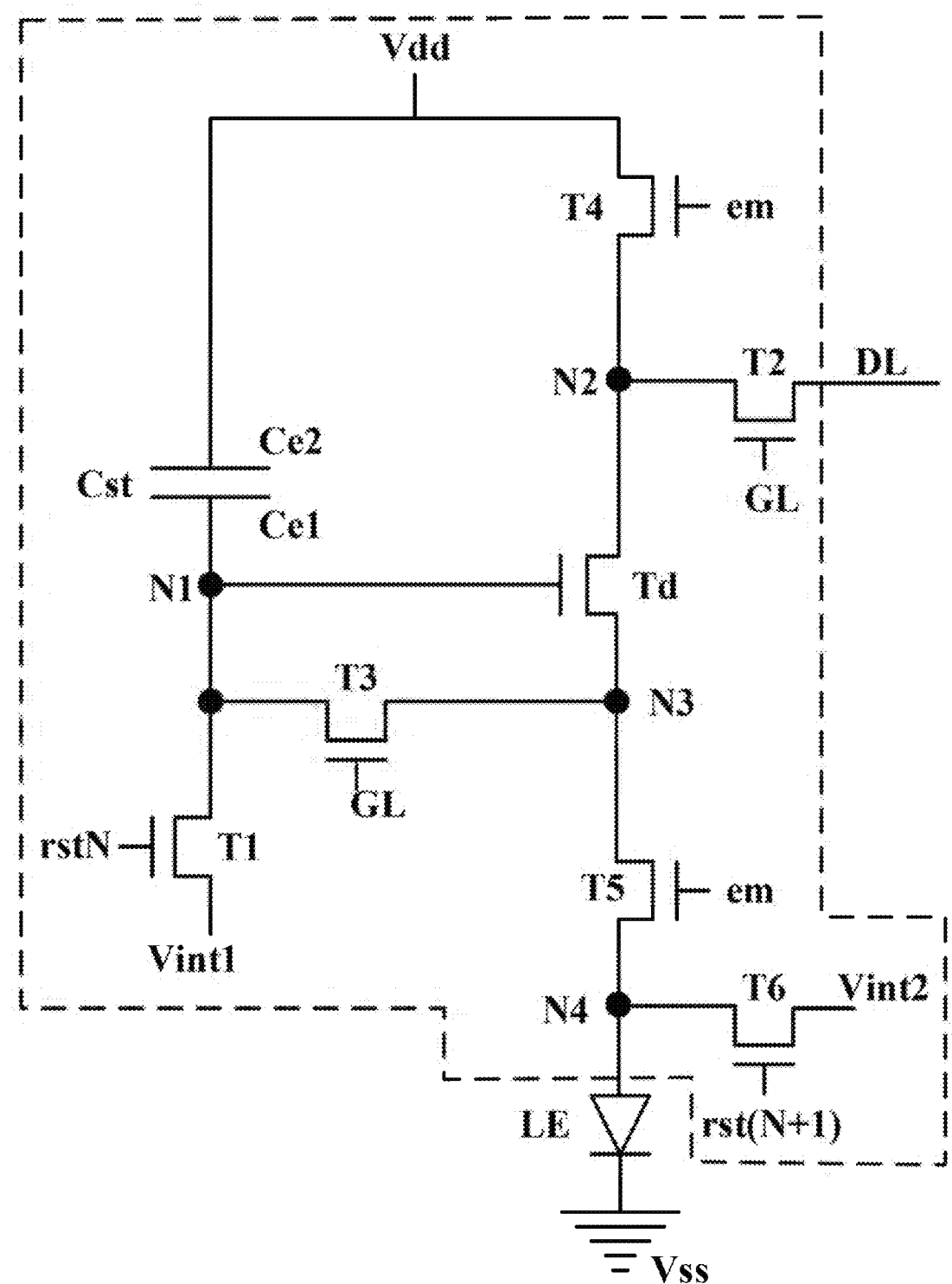
FIG. 26 is a circuit diagram illustrating the structure of a pixel driving circuit in some embodiments according to the present disclosure.

FIG. 26 is a circuit diagram illustrating the structure of a pixel driving circuit in some embodiments according to the present disclosure. Referring to FIG. 26, in some embodiments, the pixel driving circuit includes a driving transistor Td; a storage capacitor Cst having a first capacitor electrode Ce1 and a second capacitor electrode Ce2; a first transistor T1 having a gate electrode connected to a respective reset control signal line rstN in a present stage, a first electrode connected to a respective first reset signal line of a plurality of first reset signal lines Vint1, and a second electrode connected to a first capacitor electrode Ce1 of the storage capacitor Cst and a gate electrode of the driving transistor Td; a second transistor T2 having a gate electrode connected to a respective gate line of a plurality of gate lines GL, a first electrode connected to a respective data line of a plurality of data lines DL, and a second electrode connected to a first electrode of the driving transistor Td; a third transistor T3 having a gate electrode connected to the respective gate line, a first electrode connected to the first capacitor electrode Ce1 of the storage capacitor Cst and the gate electrode of the driving transistor Td, and a second electrode connected to a second electrode of the driving transistor Td; a fourth transistor T4 having a gate electrode connected to a respective light emitting control signal line of a plurality of light emitting control signal lines em, a first electrode connected to a respective voltage supply line of a plurality of voltage supply lines Vdd, and a second electrode connected to the first electrode of the driving transistor Td and the second electrode of the second transistor T2; a fifth transistor T5 having a gate electrode connected to the respective light emitting control signal line, a first electrode connected to second electrodes of the driving transistor Td and the third transistor T3, and a second electrode connected to an anode of a light emitting element LE; and a sixth transistor T6 having a gate electrode connected to a reset control signal line rst(N+1) in a next stage, a first electrode connected to a second reset signal line of a plurality of second reset signal lines Vint2, and a second electrode connected to the second electrode of the fifth transistor and the anode of the light emitting element LE. The second capacitor electrode Ce2 is connected to the respective voltage supply line and the first electrode of the fourth transistor T4.

In some embodiments, the pixel driving circuit includes a driving transistor Td, a data write transistor (e.g., the second transistor T2), a compensating transistor (e.g., the third transistor T3), two light emitting control transistors (e.g., the fourth transistor T4 and the fifth transistor T5), and two reset transistors (e.g., the first transistor T1 and the sixth transistor T6).

In some embodiments, referring to FIG. 25 and FIG. 26, the first power supply signal line PSL1 is connected to the first power supply terminal PST1, and is configured to transmit the first power supply signal to the plurality of voltage supply lines Vdd in the first display sub-area DA1. The second power supply signal line PSL2 is connected to the second power supply terminal PST2, and is configured to transmit the second power supply signal to the plurality of voltage supply lines Vdd in the second display sub-area DA2.

Microstrip antennas can be fed using various methods such as gap-coupled feeding, coaxial feeding, microstrip line feeding, and coplanar waveguide feeding. Among these methods, gap-coupled feeding offers distinct characteristics. For example, gap-coupled feeding provides a significant increase in antenna impedance bandwidth compared to conventional feeding techniques. The ground plate effectively isolates the radiating plate from the feed line, minimizing the impact of the feed line on radiation performance. By placing the dielectric substrates of the radiating plate and the feed line on opposite sides of the grounded plate, different substrates with varying dielectric constants can be selected based on specific requirements. Gap-coupled feeding offers more adjustable parameters during the design process than conventional feeding methods, facilitating precise port impedance matching. The feed line can be conveniently integrated into the same plane as the antenna, enabling seamless integration with active components. On the other hand, gap-coupled feeding involves a multi-layer structure, introducing complexity and increasing the manufacturing cost of the antenna. The presence of coupling gaps on the grounded plate results in increased back radiation. This can be mitigated by incorporating a metal reflector at a quarter wavelength distance from the grounded plane, albeit at the expense of added complexity to the antenna structure.

The coupling effectiveness between the microstrip feed line and the radiating plate primarily depends on the shape of the coupling gap and its relative position to the radiating plate. Comparative studies have explored different gap shapes, including "H," "U," and "L" types, where the longitudinal gap governs the coupling strength, while the transverse gap exerts a comparatively smaller influence. The midpoint of the transverse gap exhibits the strongest coupling, with decreasing coupling effectiveness observed as the distance from the midpoint increases. Rectangular gaps exhibit a more pronounced decline in coupling effectiveness due to their inherent discontinuities. The inventors of the present disclosure have compared various wide gap shapes, such as rectangular, "H," butterfly, and hourglass forms. Among these, the hourglass-shaped gap demonstrates the highest coupling efficiency by mitigating the discontinuities present in the "H" and butterfly gap configurations.

Figure 27:
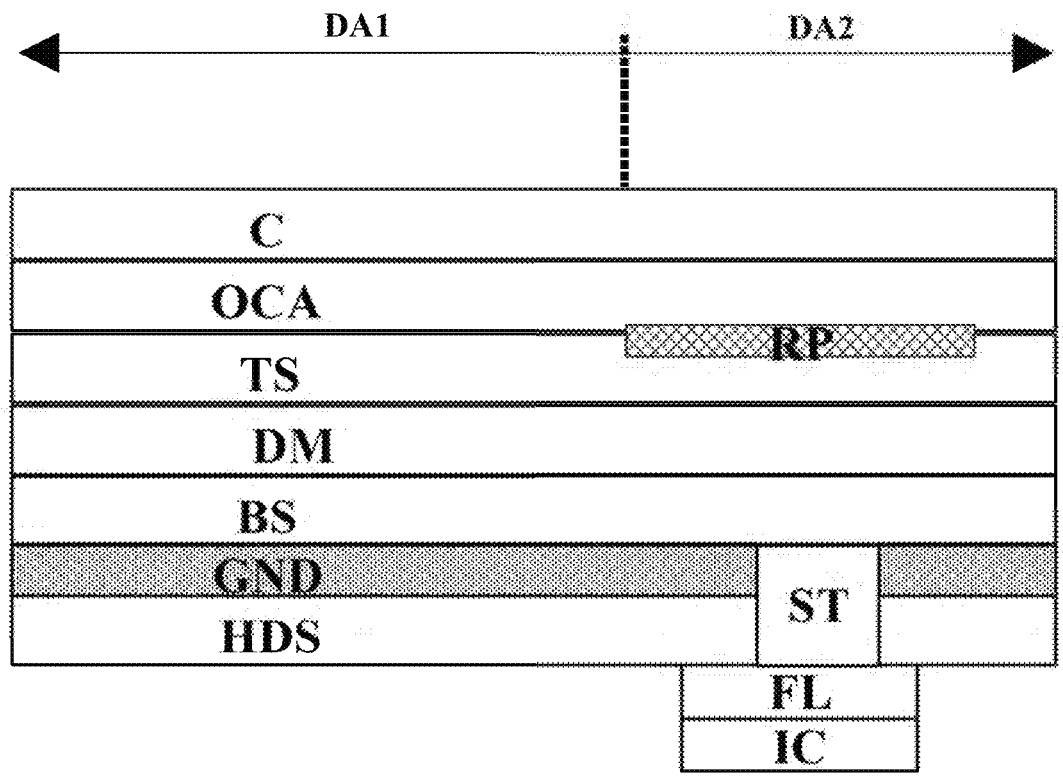
FIG. 27 is a cross-sectional view of a display apparatus in some embodiments according to the present disclosure.

FIG. 27 is a cross-sectional view of a display apparatus in some embodiments according to the present disclosure. Referring to FIG. 27, because the antenna is in the second display sub-area DA2, and the second display sub-area DA2 has less amount of metal traces, the display module DM in the second display sub-area DA2 does not exhibit strong blocking effects on electromagnetic waves. The present display apparatus allows for wave transmission through the second display sub-area DA2, enabling electromagnetic waves to pass through the display module DM.

In some embodiments, referring to FIG. 27, the display apparatus includes a heat dissipation structure HDS, a ground plate GND on the heat dissipation structure HDS, a base substrate BS on a side of the ground plate GND away from the heat dissipation structure HDS, a display module DM on a side of the base substrate BS away from the ground plate GND, a touch structure TS on a side of the display module DM away from the base substrate BS, a radiating plate RP of the antenna on a side of the touch structure TS away from the display module DM, an optically clear adhesive layer OCA on a side of the radiating plate RP and the touch structure TS away from the display module DM, and a cover C on a side of the optically clear adhesive layer OCA away from the touch structure TS. Optionally, the display apparatus further includes a slot ST extending through at least one of the heat dissipation structure HDS and the ground plate GND. Optionally, the display apparatus further includes a feed line FL on a side of the slot ST away from the radiating plate RP. Optionally, the display apparatus further includes an integrated circuit IC on a side of the feed line FL away from the slot ST. Optionally, the ground plate GND is made of a metallic material.

Figure 28:
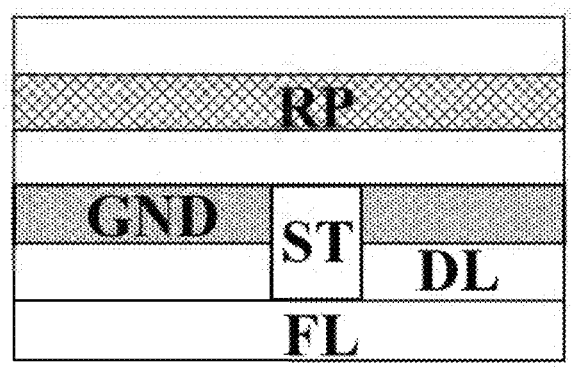
FIG. 28 is a schematic diagram illustrating an equivalent antenna in a display apparatus in some embodiments according to the present disclosure.
Figure 29A:
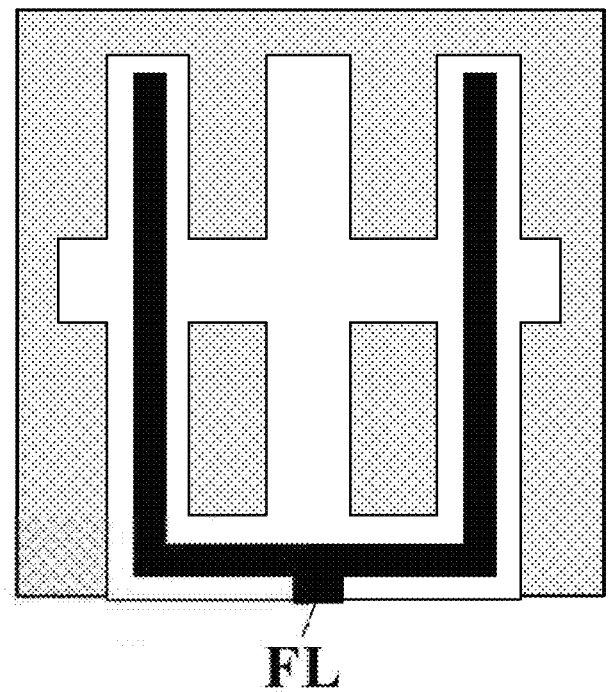
FIG. 29A is a schematic diagram illustrating a feed line in an equivalent antenna in a display apparatus in some embodiments according to the present disclosure.
Figure 29B:
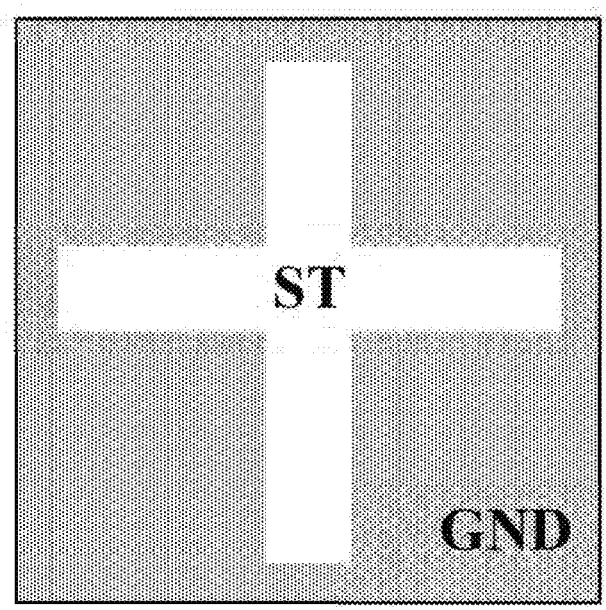
FIG. 29B is a schematic diagram illustrating a ground plate in an equivalent antenna in a display apparatus in some embodiments according to the present disclosure.
Figure 29C:
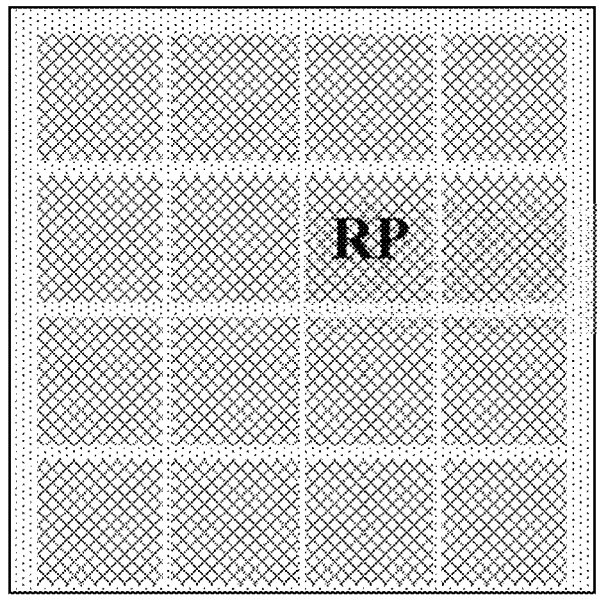
FIG. 29C is a schematic diagram illustrating a radiating plate in an equivalent antenna in a display apparatus in some embodiments according to the present disclosure.

FIG. 28 is a schematic diagram illustrating an equivalent antenna in a display apparatus in some embodiments according to the present disclosure. FIG. 29A is a schematic diagram illustrating a feed line in an equivalent antenna in a display apparatus in some embodiments according to the present disclosure. FIG. 29B is a schematic diagram illustrating a ground plate in an equivalent antenna in a display apparatus in some embodiments according to the present disclosure. FIG. 29C is a schematic diagram illustrating a radiating plate in an equivalent antenna in a display apparatus in some embodiments according to the present disclosure. Referring to FIG. 28, FIG. 29A to FIG. 29C, a portion of the display module is equivalent to a dielectric layer DL. In some embodiments, as shown in FIG. 29C, the radiating plate RP is made of a metal mesh material, and the radiating plate RP is a metal mesh radiating plate.

Figure 30:
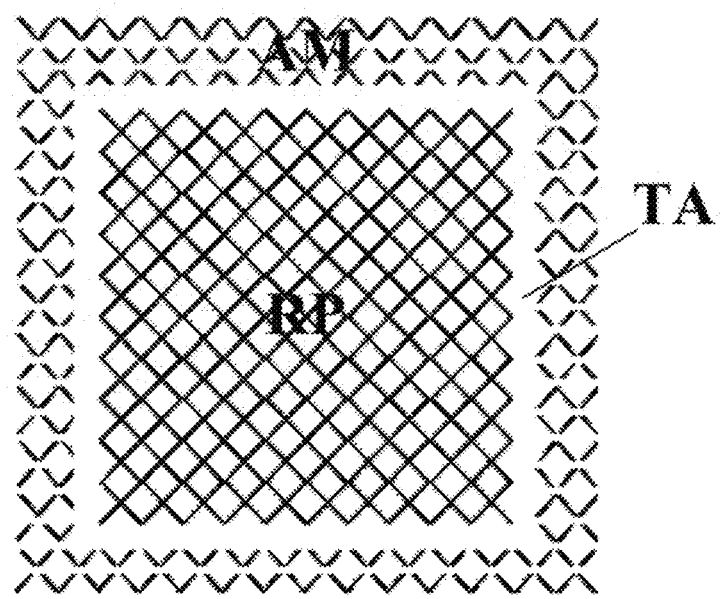
FIG. 30 is a schematic diagram illustrating the structure of a radiating plate in some embodiments according to the present disclosure.
Figure 31:
FIG. 31 is a cross-sectional view of a radiating plate in some embodiments according to the present disclosure.

FIG. 30 is a schematic diagram illustrating the structure of a radiating plate in some embodiments according to the present disclosure. FIG. 31 is a cross-sectional view of a radiating plate in some embodiments according to the present disclosure. Referring to FIG. 30 and FIG. 31, the display apparatus in some embodiments further includes an auxiliary metal mesh AM substantially surrounding (e.g., at least 50% surrounding, at least 60% surrounding, at least 70% surrounding, at least 80% surrounding, at least 90% surrounding, at least 95% surrounding, at least 99% surrounding, or completely surrounding) the radiating plate RP. Optionally, the radiating plate RP is a metal mesh radiating plate. Optionally, the radiating plate RP and the auxiliary metal mesh AM are spaced apart from each other by a transition area TA. The inventors of the present disclosure discover that, by having the auxiliary metal mesh AM, any visual effects caused by the presence or absence of mesh can be prevented. This structure serves the purpose of mitigating the conspicuousness of the radiating plate RP. Without the auxiliary metal mesh AM, the isolated presence of the radiating plate RP would result in a visually abrupt and noticeable area. The inventors of the present disclosure discover that, by having the transition area TA to have an appropriate spacing between the continuous mesh area of the radiating plate RP and the auxiliary metal mesh AM, visual effects can be further improved. Excessive spacing within the transition area TA would also lead to perceptible visual inconsistencies.

In some embodiments, the radiating plate RP includes a continuous metal mesh network. In some embodiments, as shown in FIG. 30, the auxiliary metal mesh AM consists of discontinuous line segments. The presence of the discontinuous line segments of the auxiliary metal mesh AM has minimal impact on electromagnetic radiation.

Figure 32A:
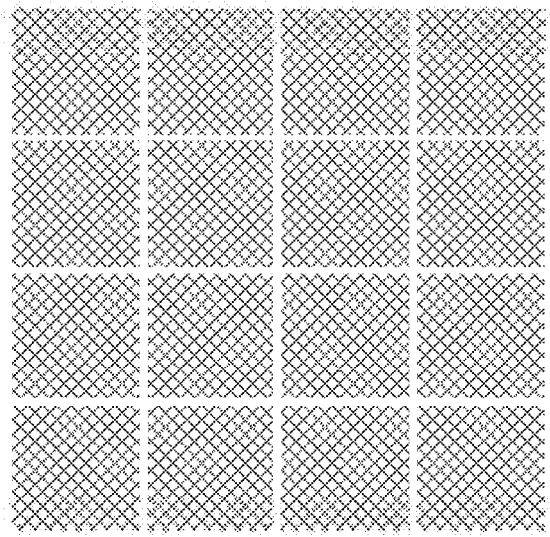
FIG. 32A is a schematic diagram illustrating the structure of a radiating plate in some embodiments according to the present disclosure.
Figure 32B:
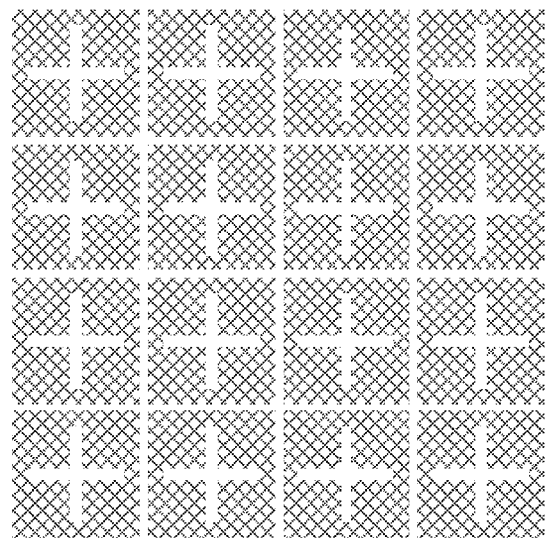
FIG. 32B is a schematic diagram illustrating the structure of a radiating plate in some embodiments according to the present disclosure.
Figure 32C:
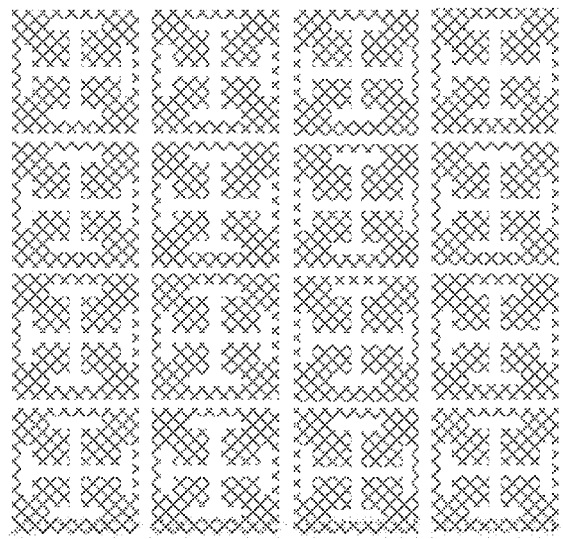
FIG. 32C is a schematic diagram illustrating the structure of a radiating plate in some embodiments according to the present disclosure.
Figure 32D:
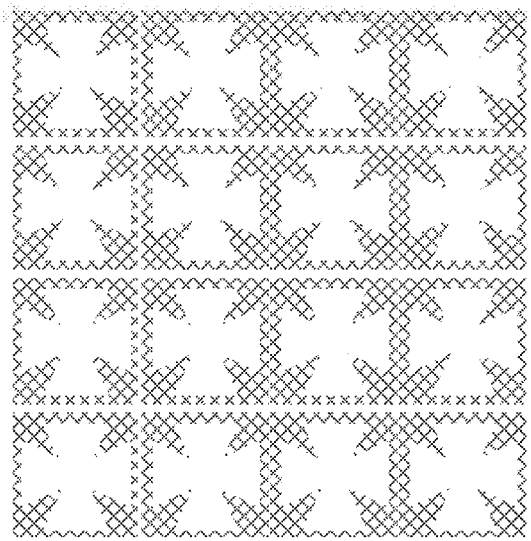
FIG. 32D is a schematic diagram illustrating the structure of a radiating plate in some embodiments according to the present disclosure.

The radiating plate may have various appropriate shapes. FIG. 32A is a schematic diagram illustrating the structure of a radiating plate in some embodiments according to the present disclosure. FIG. 32B is a schematic diagram illustrating the structure of a radiating plate in some embodiments according to the present disclosure. FIG. 32C is a schematic diagram illustrating the structure of a radiating plate in some embodiments according to the present disclosure. FIG. 32D is a schematic diagram illustrating the structure of a radiating plate in some embodiments according to the present disclosure. FIG. 32A to FIG. 32D illustrate various appropriate shapes of the radiating plate.

Figure 33A:
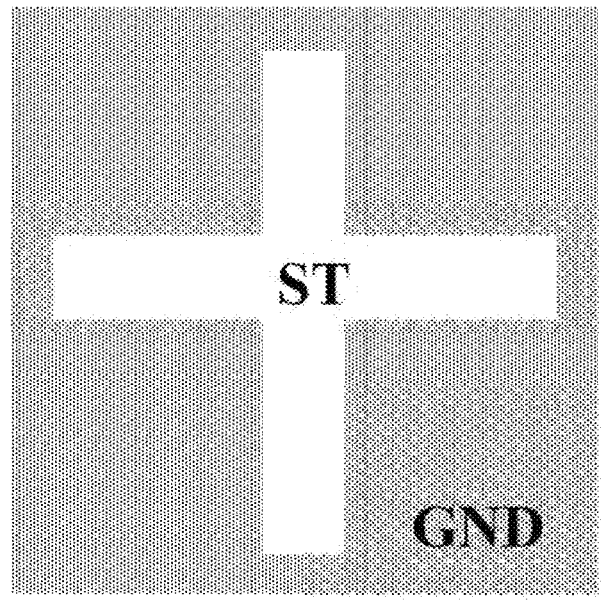
FIG. 33A is a schematic diagram illustrating the structure of a ground plate and a slot in some embodiments according to the present disclosure.
Figure 33B:
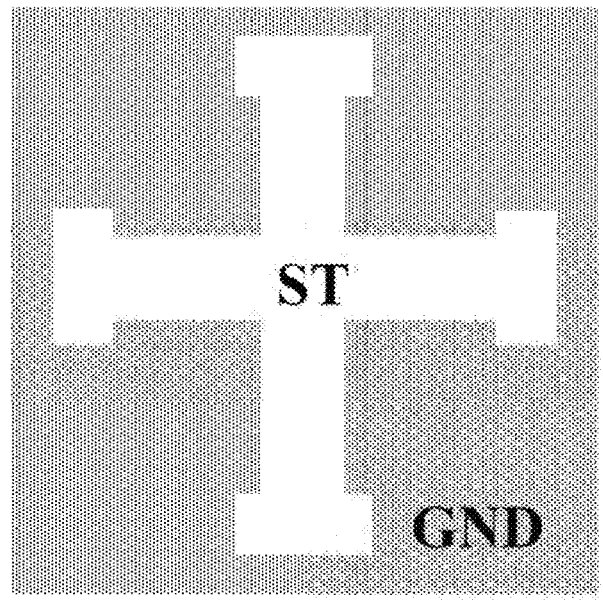
FIG. 33B is a schematic diagram illustrating the structure of a ground plate and a slot in some embodiments according to the present disclosure.
Figure 33C:
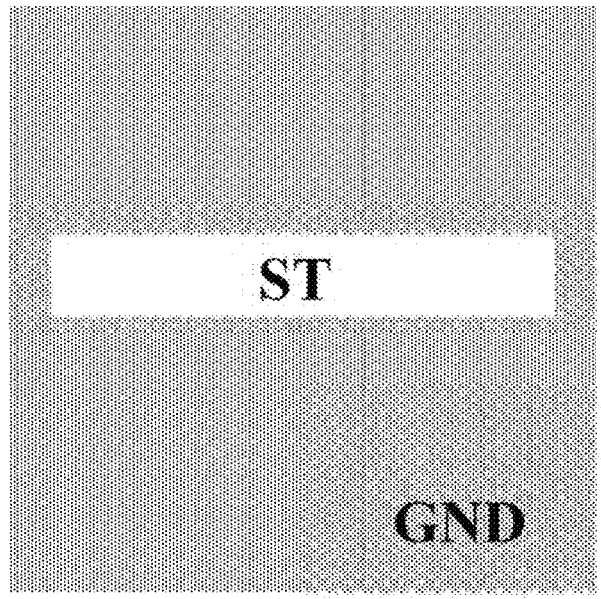
FIG. 33C is a schematic diagram illustrating the structure of a ground plate and a slot in some embodiments according to the present disclosure.
Figure 33D:
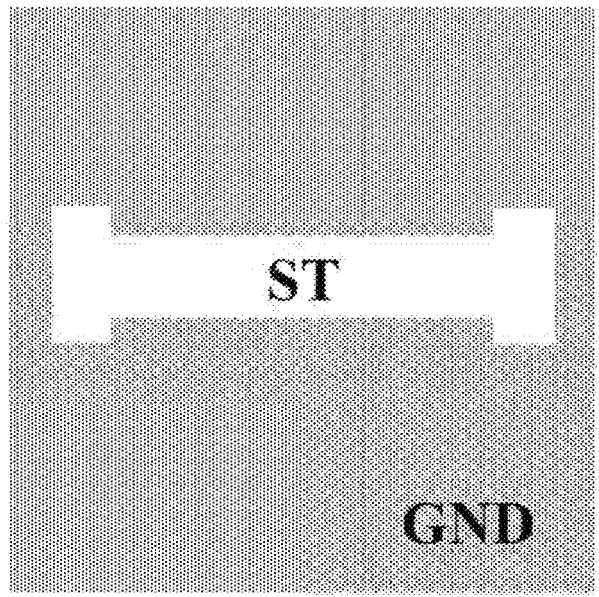
FIG. 33D is a schematic diagram illustrating the structure of a ground plate and a slot in some embodiments according to the present disclosure.

The slot ST may have various appropriate shapes. FIG. 33A is a schematic diagram illustrating the structure of a ground plate and a slot in some embodiments according to the present disclosure. FIG. 33B is a schematic diagram illustrating the structure of a ground plate and a slot in some embodiments according to the present disclosure. FIG. 33C is a schematic diagram illustrating the structure of a ground plate and a slot in some embodiments according to the present disclosure. FIG. 33D is a schematic diagram illustrating the structure of a ground plate and a slot in some embodiments according to the present disclosure. FIG. 33A to FIG. 33D illustrate various appropriate shapes of the slot ST.

Various appropriate feed line structures may be implemented in the present disclosure. For example, the feed line may be implemented using either microstrip lines or coplanar waveguide (CPW).

Figure 34:
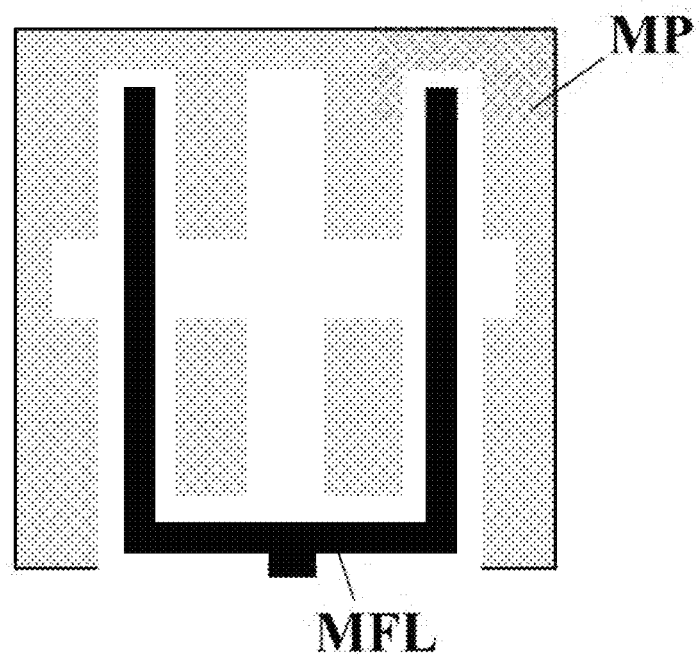
FIG. 34 is a schematic diagram illustrating the structure of a radiating plate in some embodiments according to the present disclosure.

FIG. 34 is a schematic diagram illustrating the structure of a radiating plate in some embodiments according to the present disclosure. Referring to FIG. 34, the feed line in some embodiments includes a main feed line MFL and a metal plate MP. Optionally, the metal plate MP is a grounded. The main feed line MFL can be utilized individually as a microstrip structure or in conjunction with the metal plate MP as coplanar waveguide. Coplanar waveguides offer superior performance by effectively confining the energy between the slot and the feed line, thereby minimizing energy losses during transmission. Additionally, it is advantageous to incorporate metal-plated vias between the slot and the feed line within the coplanar waveguide structure to further localize the energy near the feed line.

The feed line can be configured for single-polarized or dual-polarized operation. In the case of single-polarized feeding, the main feed line MFL and the metal plate MP are in a same layer, as shown in FIG. 34.

Figure 35:
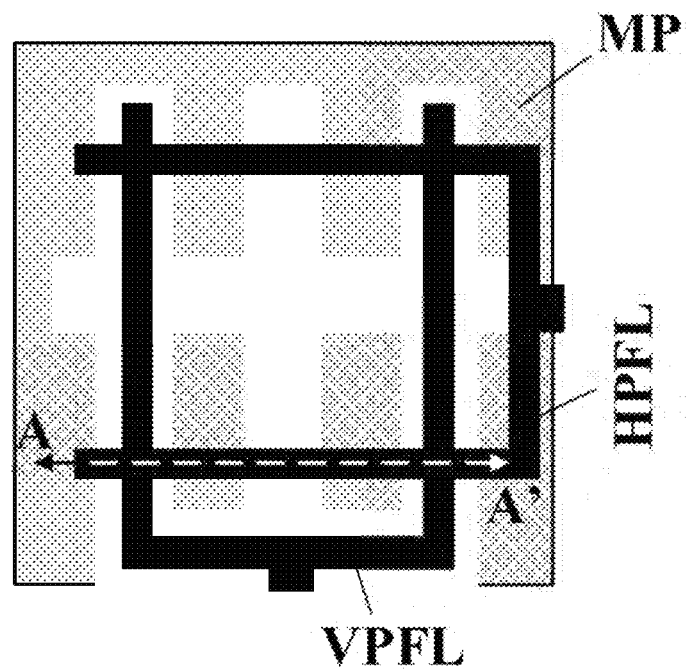
FIG. 35 is a schematic diagram illustrating the structure of a radiating plate in some embodiments according to the present disclosure.
Figure 36:
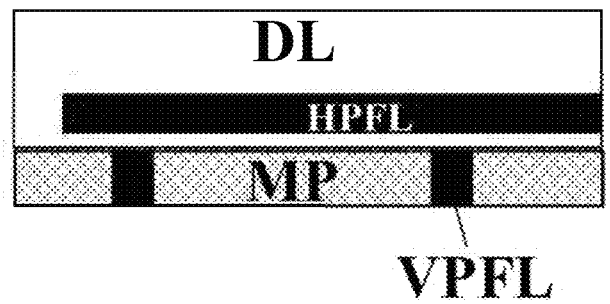
FIG. 36 is a cross-sectional view along an A-A' line in FIG. 35.

FIG. 35 is a schematic diagram illustrating the structure of a radiating plate in some embodiments according to the present disclosure. FIG. 36 is a cross-sectional view along an A-A' line in FIG. 35. Referring to FIG. 35 and FIG. 36, in some embodiments, the feed line can be configured for dual-polarized operation. In some embodiments, the main feed line includes a horizontal-polarized feed line HPFL and a vertical-polarized feed line VPFL. In some embodiments, referring to FIG. 35 and FIG. 36, the vertical-polarized feed line VPFL and the metal plate MP are in the same layer, while the horizontal-polarized feed line HPFL is in a layer on the vertical-polarized feed line VPFL and the metal plate MP, e.g., closer to the radiating plate.

Figure 37:
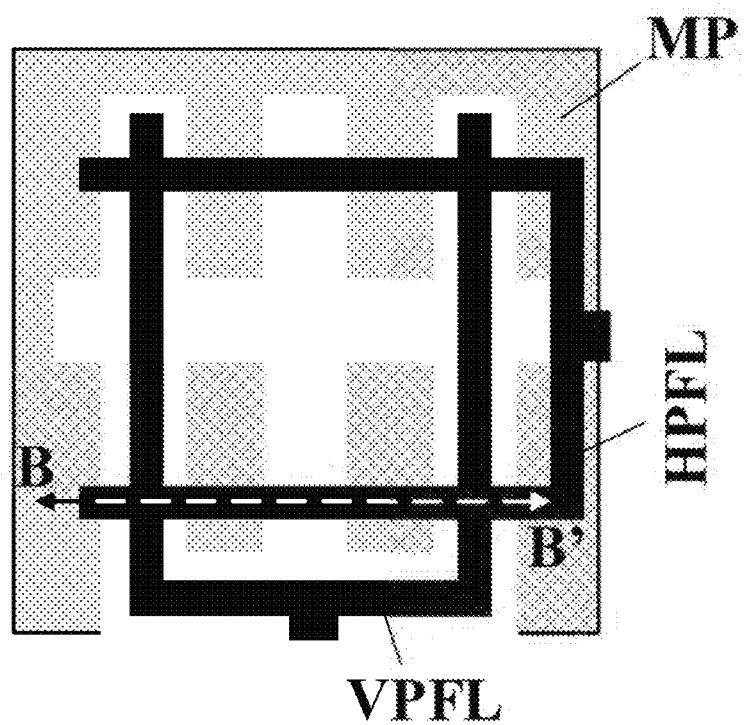
FIG. 37 is a schematic diagram illustrating the structure of a radiating plate in some embodiments according to the present disclosure.
Figure 38:
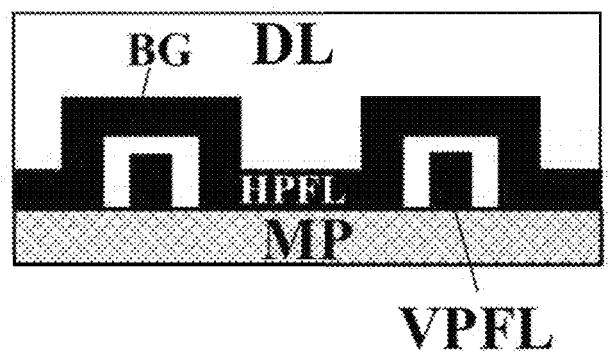
FIG. 38 is a cross-sectional view along a B-B' line in FIG. 37.

FIG. 37 is a schematic diagram illustrating the structure of a radiating plate in some embodiments according to the present disclosure. FIG. 38 is a cross-sectional view along a B-B' line in FIG. 37. Referring to FIG. 37 and FIG. 38, in some embodiments, the feed line can be configured for dual-polarized operation. In some embodiments, the main feed line includes a horizontal-polarized feed line HPFL and a vertical-polarized feed line VPFL. In some embodiments, referring to FIG. 37 and FIG. 38, the vertical-polarized feed line VPFL and the horizontal-polarized feed line HPFL are in a same layer. In some embodiments, the horizontal-polarized feed line HPFL includes a bridge BG crossing over the vertical-polarized feed line VPFL.

Figure 39:
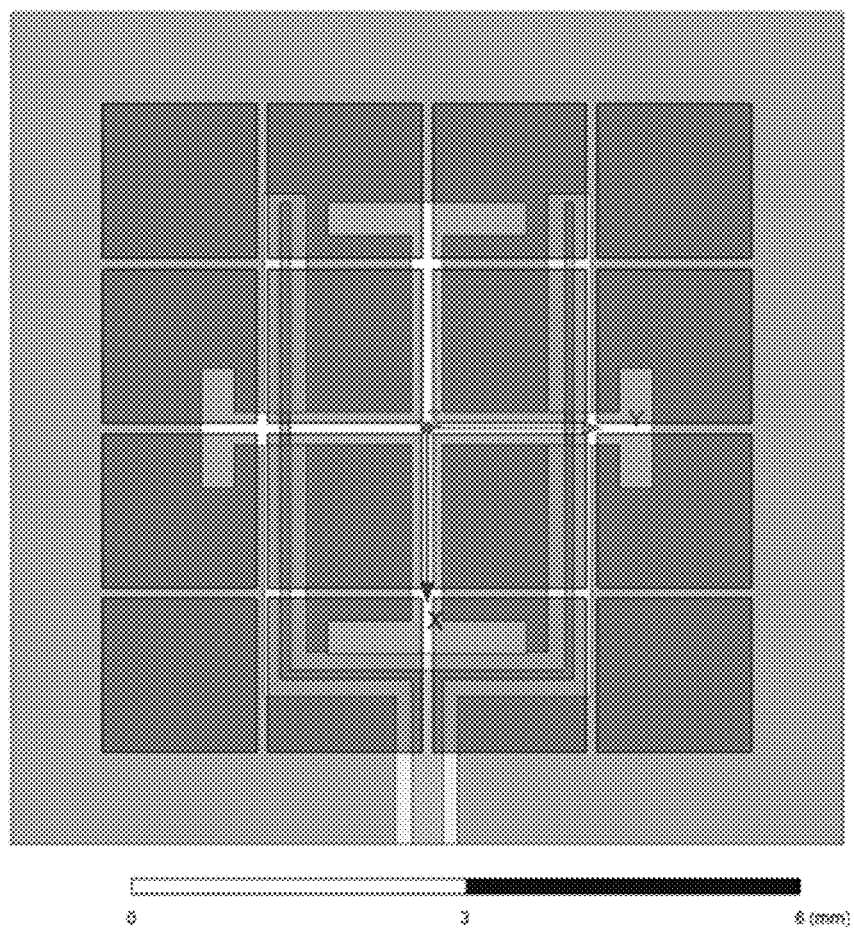
FIG. 39 is a superimposed view of a radiating plate, a ground plate, and a feed line in an antenna in some embodiments according to the present disclosure.
Figure 40:
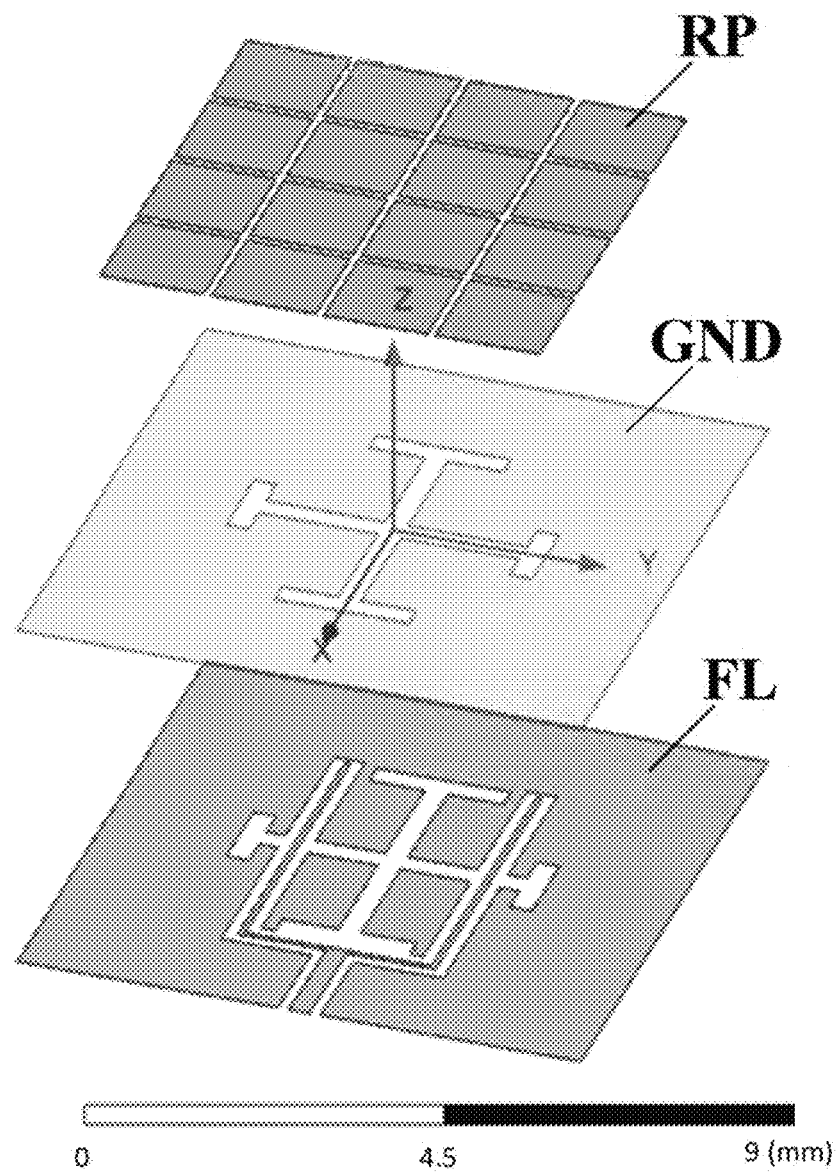
FIG. 40 is a perspective view of a radiating plate, a ground plate, and a feed line in the antenna depicted in FIG. 39.

FIG. 39 is a superimposed view of a radiating plate, a ground plate, and a feed line in an antenna in some embodiments according to the present disclosure. FIG. 40 is a perspective view of a radiating plate, a ground plate, and a feed line in the antenna depicted in FIG. 39. Referring to FIG. 39 and FIG. 40, the antenna in some embodiments includes a radiation patch RP having a rectangular shape, a ground plate GP with a double-H cross-shaped slot, and a single-polarized feed line configuration. As used herein, the term "double-H cross-shaped" refers to a shape consisting of four T shapes intersecting and joining together at a common center point.

Figure 41:
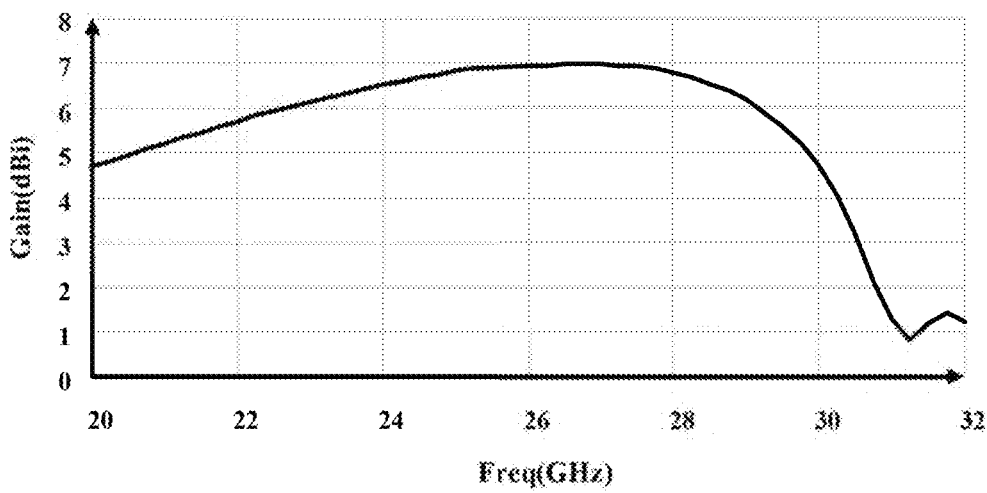
FIG. 41 shows a realized gain as a function of radiation frequency for the antenna depicted in FIG. 39.
Figure 42:
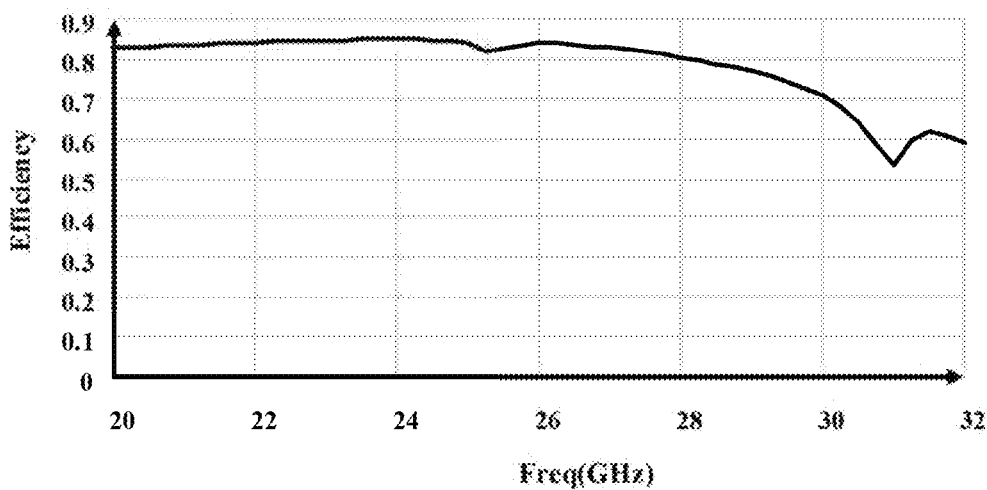
FIG. 42 shows a realized gain as a function of radiation frequency for the antenna depicted in FIG. 39.
Figure 43:
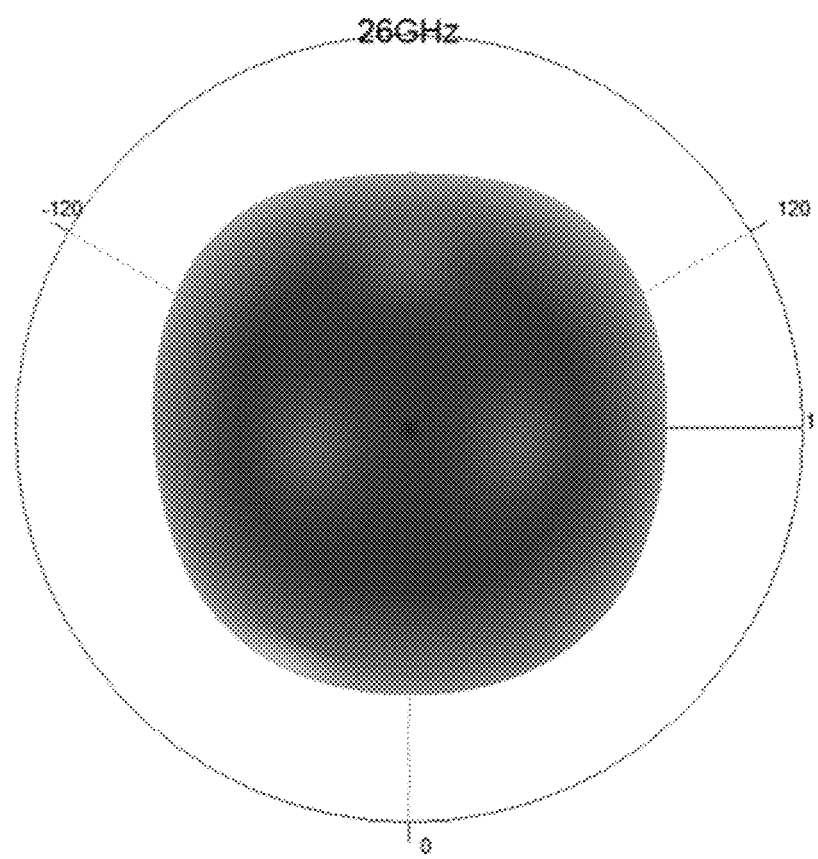
FIG. 43 illustrates a front view of an antenna radiation three-dimensional pattern of the antenna depicted in FIG. 39 at a resonant frequency point.
Figure 44:
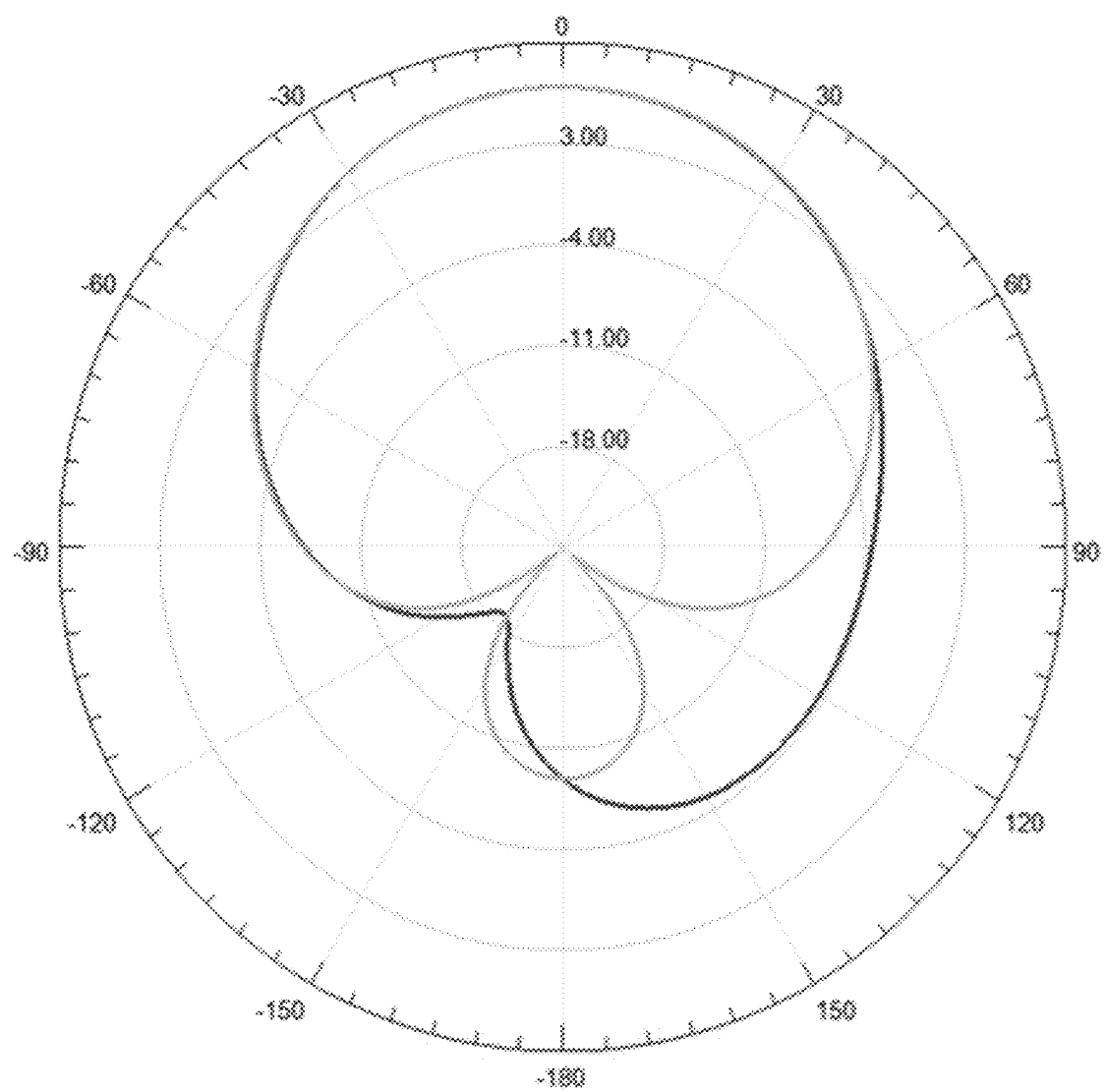
FIG. 44 illustrates an antenna radiation pattern in a E-plane and an H-plane of the antenna depicted in FIG. 39 at a resonant frequency point.

FIG. 41 shows a realized gain as a function of radiation frequency for the antenna depicted in FIG. 39. FIG. 42 shows a realized gain as a function of radiation frequency for the antenna depicted in FIG. 39. FIG. 43 illustrates a front view of an antenna radiation three-dimensional pattern of the antenna depicted in FIG. 39 at a resonant frequency point. FIG. 44 illustrates an antenna radiation pattern in a E-plane and an H-plane of the antenna depicted in FIG. 39 at a resonant frequency point.

Specifically, at a frequency of 26 GHz, a gain of 6.9 dBi is achieved when a solid metal radiating plate is used. When a metal mesh radiating plate is used, a reduction of 3 to 4 dBi is expected. Moreover, within the frequency range of 24.25 GHz to 29.5 GHz, the gain remains consistently above 5.5 dBi. The three-dimensional radiation pattern, as illustrated in FIG. 44, exhibits a hemisphere-like radiation distribution, with the display module effectively functioning as a metallic reflector.

Figure 45:
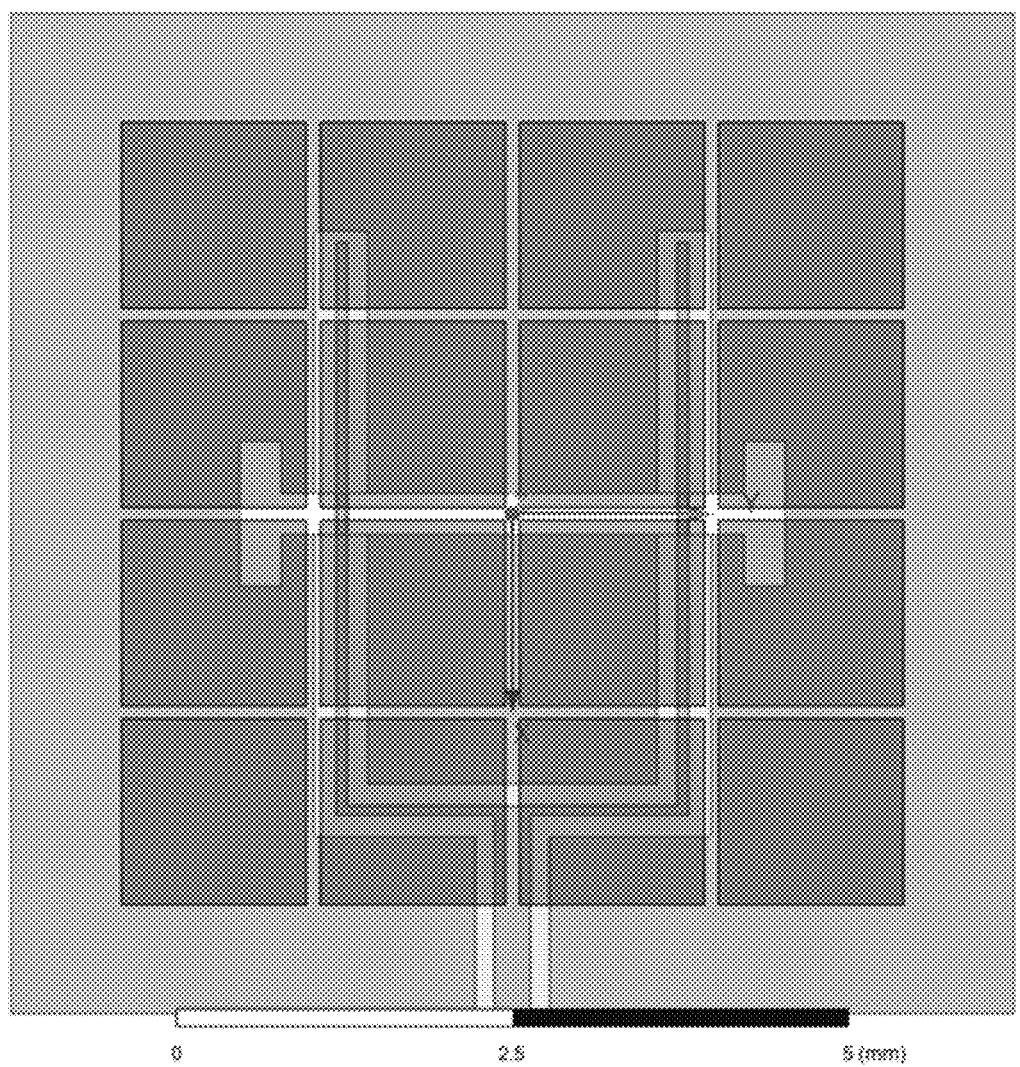
FIG. 45 is a superimposed view of a radiating plate, a ground plate, and a feed line in an antenna in some embodiments according to the present disclosure.
Figure 46:
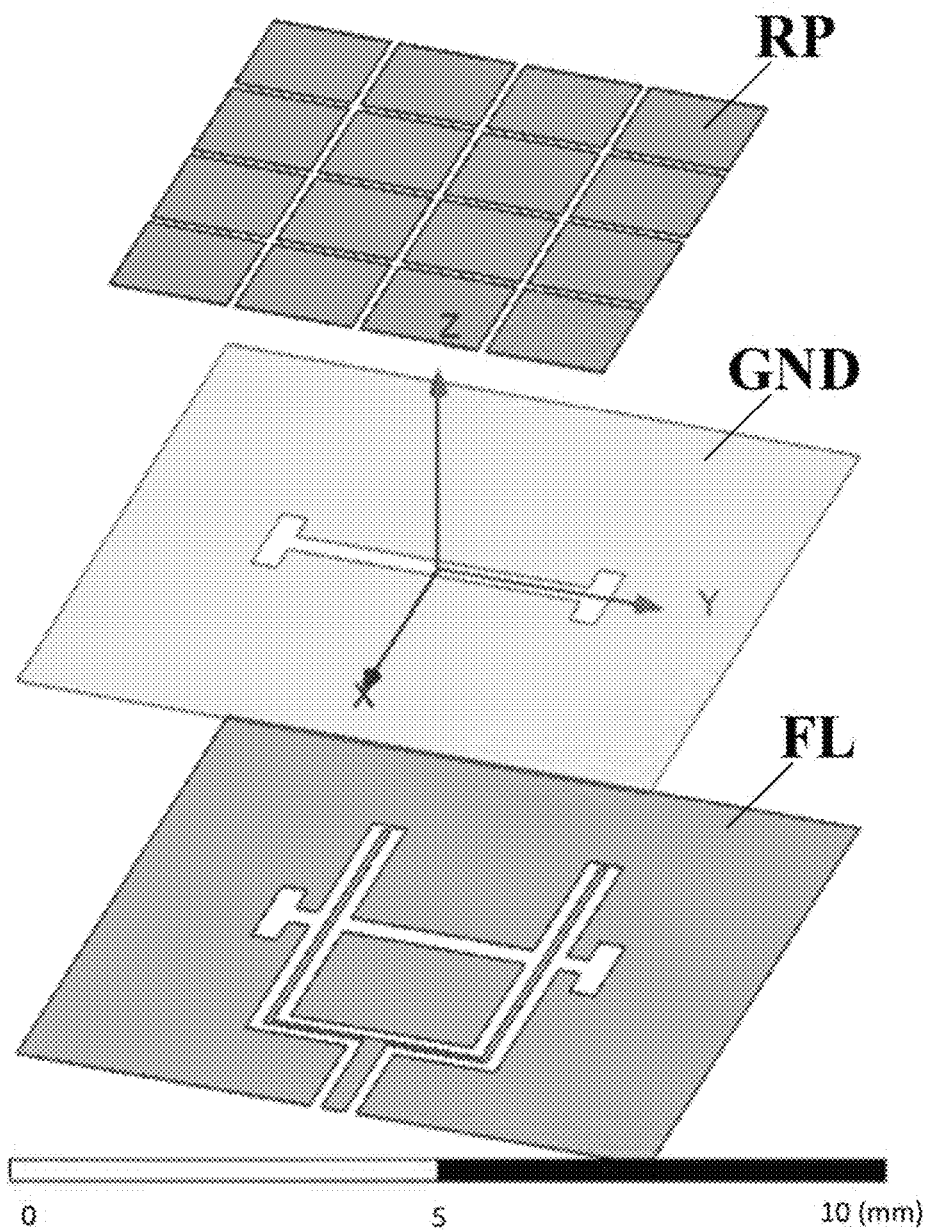
FIG. 46 is a perspective view of a radiating plate, a ground plate, and a feed line in the antenna depicted in FIG. 45.

FIG. 45 is a superimposed view of a radiating plate, a ground plate, and a feed line in an antenna in some embodiments according to the present disclosure. FIG. 46 is a perspective view of a radiating plate, a ground plate, and a feed line in the antenna depicted in FIG. 45. Referring to FIG. 45 and FIG. 46, the antenna in some embodiments includes a radiation patch RP having a rectangular shape, a ground plate GP with an H-shaped slot, and a single-polarized feed line configuration.

Figure 47:
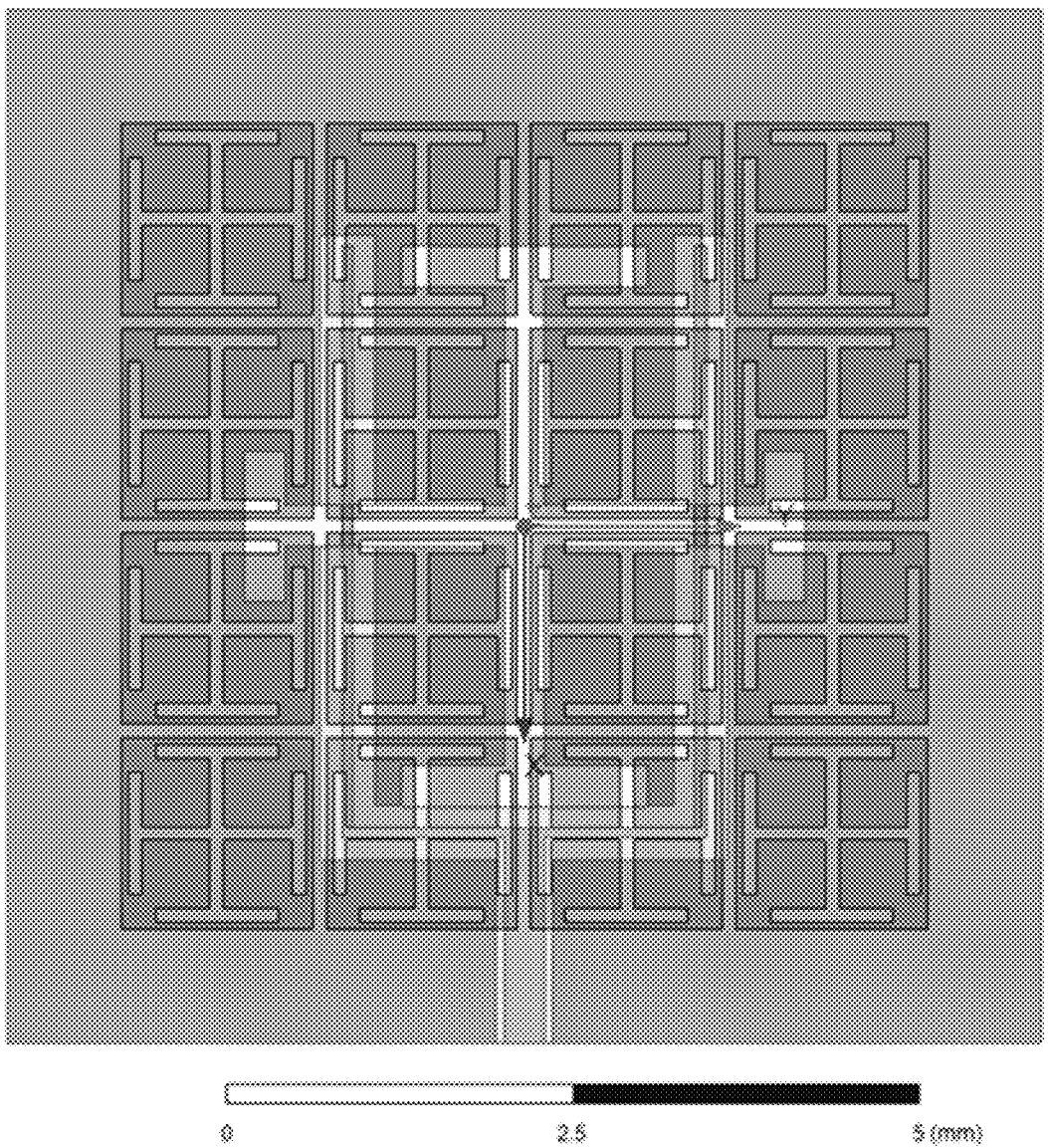
FIG. 47 is a superimposed view of a radiating plate, a ground plate, and a feed line in an antenna in some embodiments according to the present disclosure.
Figure 48:
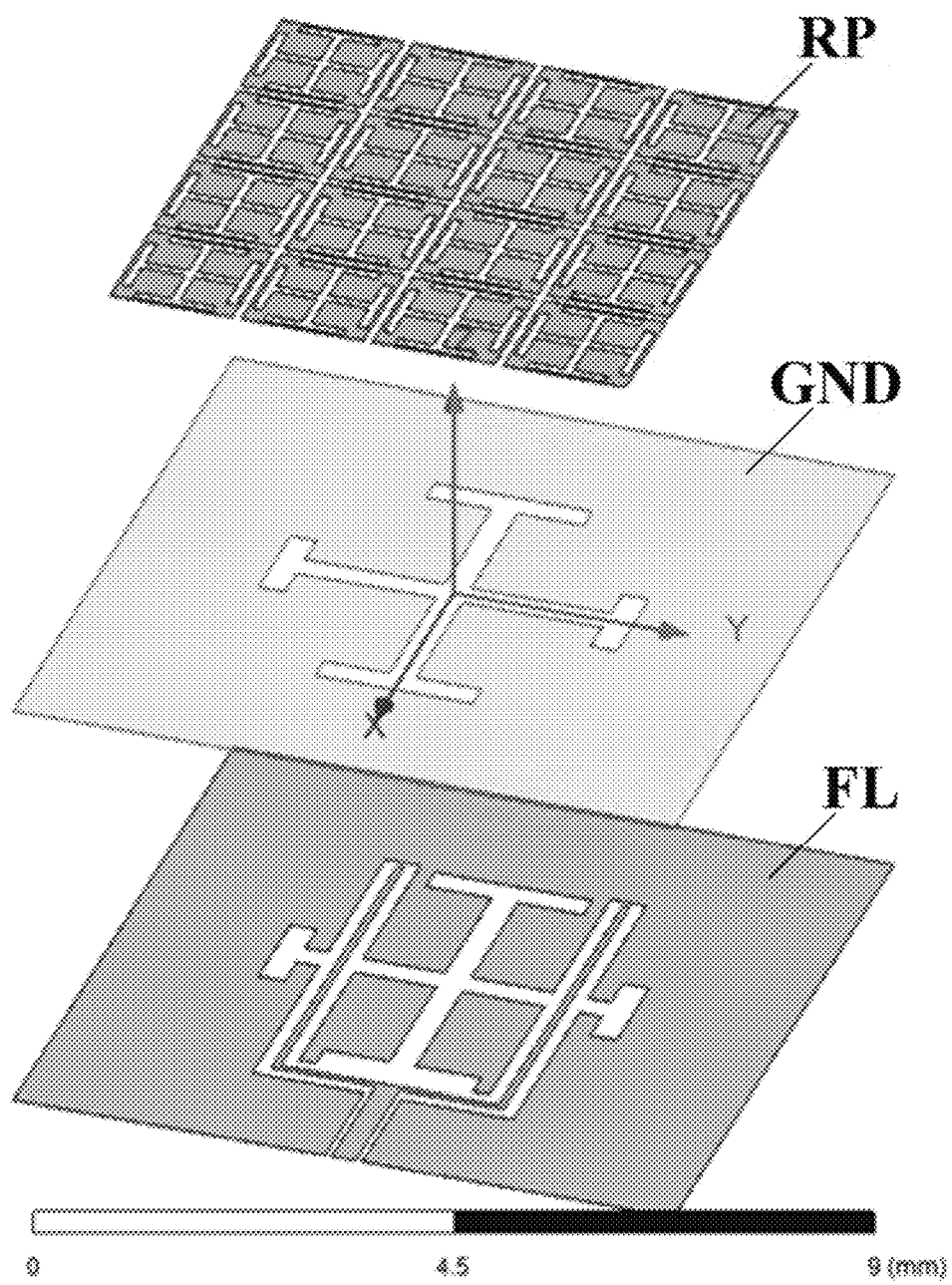
FIG. 48 is a perspective view of a radiating plate, a ground plate, and a feed line in the antenna depicted in FIG. 47.

FIG. 47 is a superimposed view of a radiating plate, a ground plate, and a feed line in an antenna in some embodiments according to the present disclosure. FIG. 48 is a perspective view of a radiating plate, a ground plate, and a feed line in the antenna depicted in FIG. 47. Referring to FIG. 47 and FIG. 48, the antenna in some embodiments includes a radiation patch RP having a rectangular shape with a double-H cross-shaped slot, a ground plate GP with a double-H cross-shaped slot, and a single-polarized feed line configuration.

Figure 49:
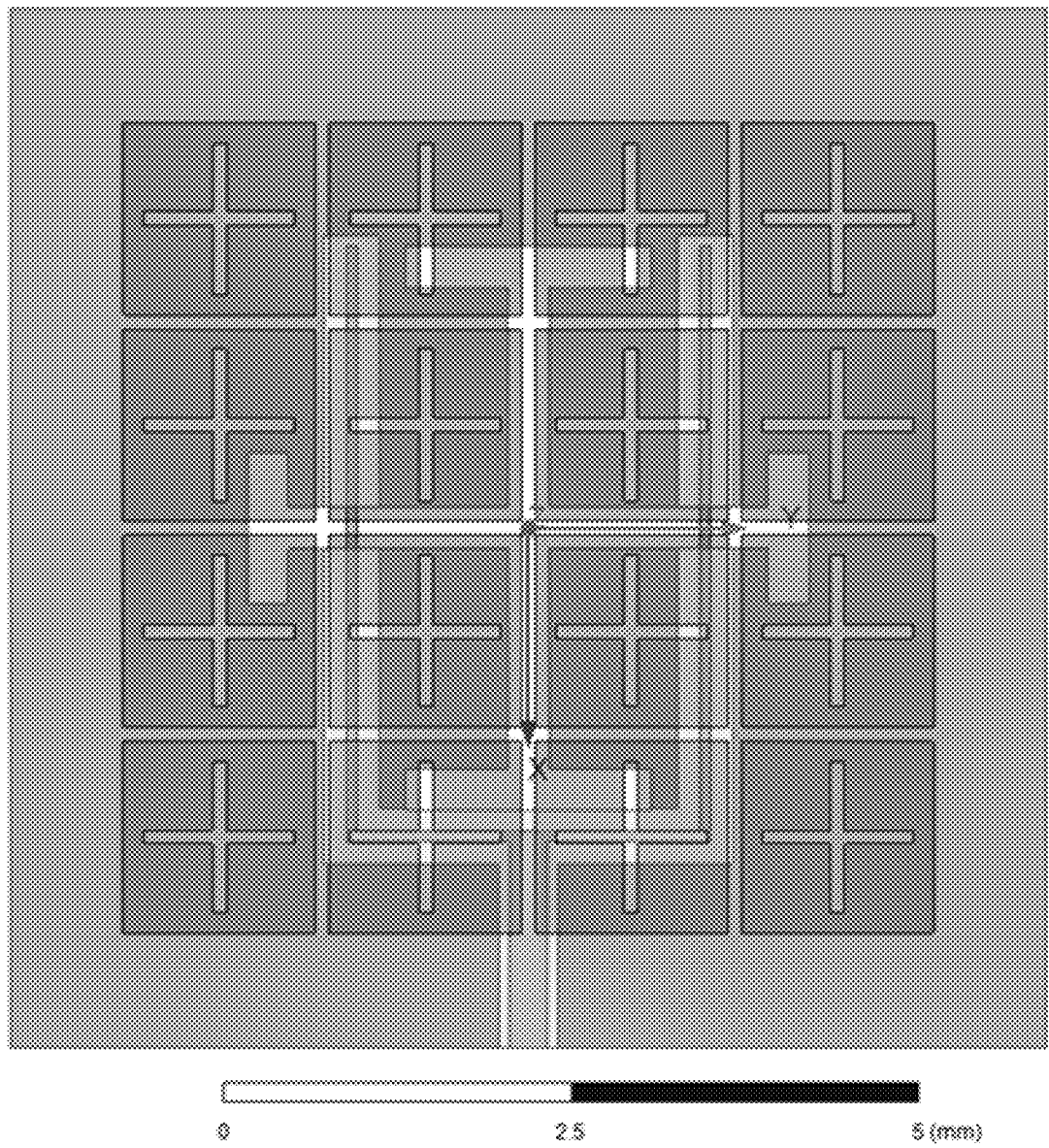
FIG. 49 is a superimposed view of a radiating plate, a ground plate, and a feed line in an antenna in some embodiments according to the present disclosure.
Figure 50:
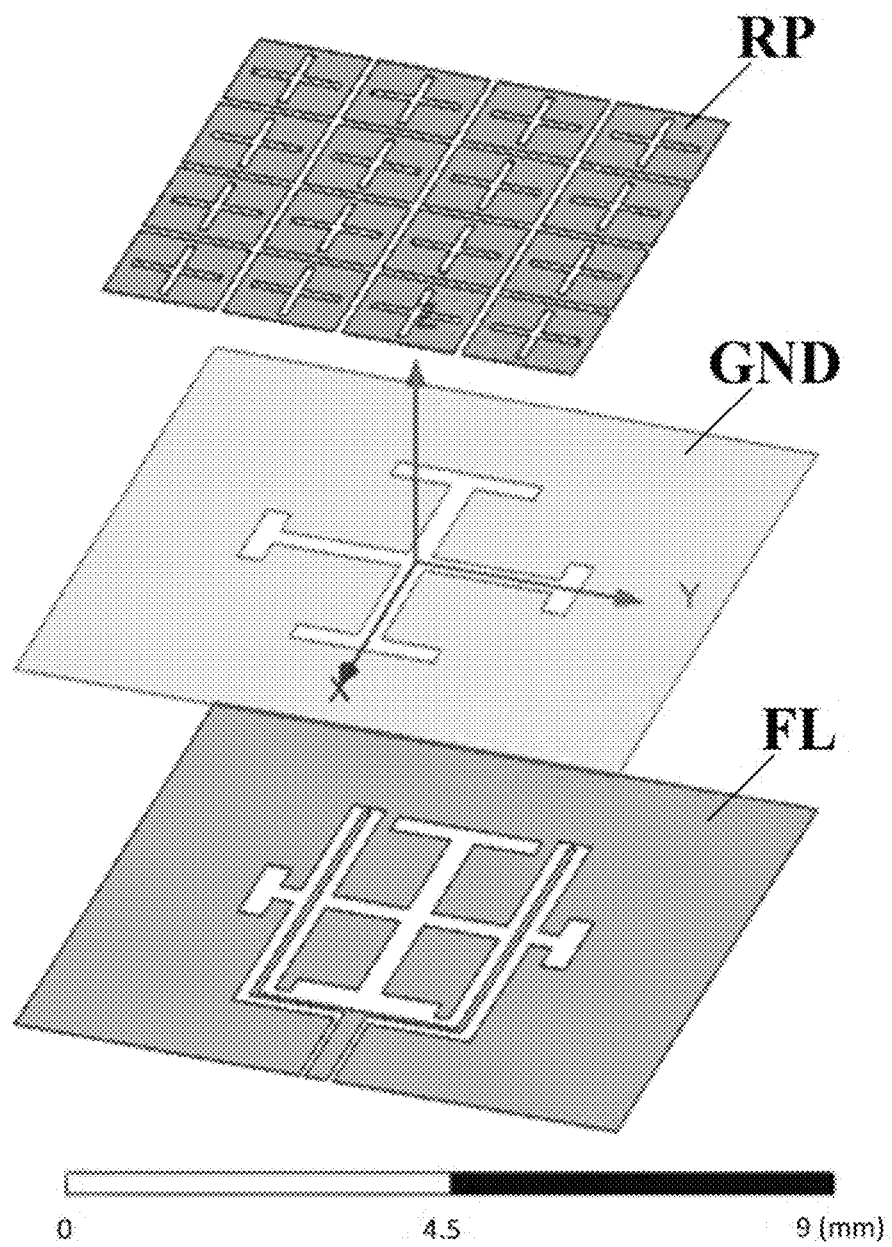
FIG. 50 is a perspective view of a radiating plate, a ground plate, and a feed line in the antenna depicted in FIG. 49.

FIG. 49 is a superimposed view of a radiating plate, a ground plate, and a feed line in an antenna in some embodiments according to the present disclosure. FIG. 50 is a perspective view of a radiating plate, a ground plate, and a feed line in the antenna depicted in FIG. 49. Referring to FIG. 49 and FIG. 50, the antenna in some embodiments includes a radiation patch RP having a rectangular shape with a cross-shaped slot, a ground plate GP with a double-H cross-shaped slot, and a single-polarized feed line configuration.

Figure 51:
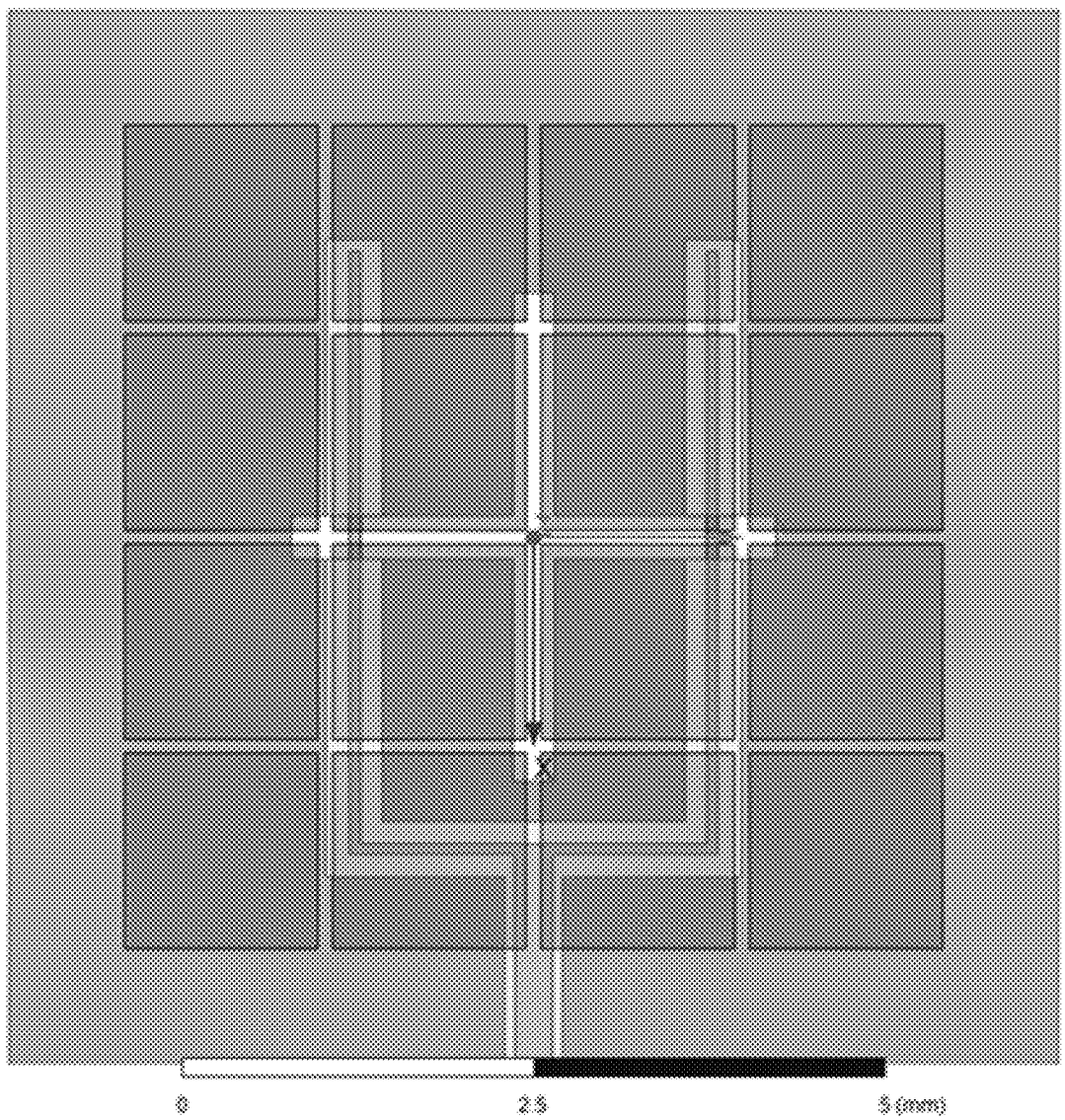
FIG. 51 is a superimposed view of a radiating plate, a ground plate, and a feed line in an antenna in some embodiments according to the present disclosure.
Figure 52:
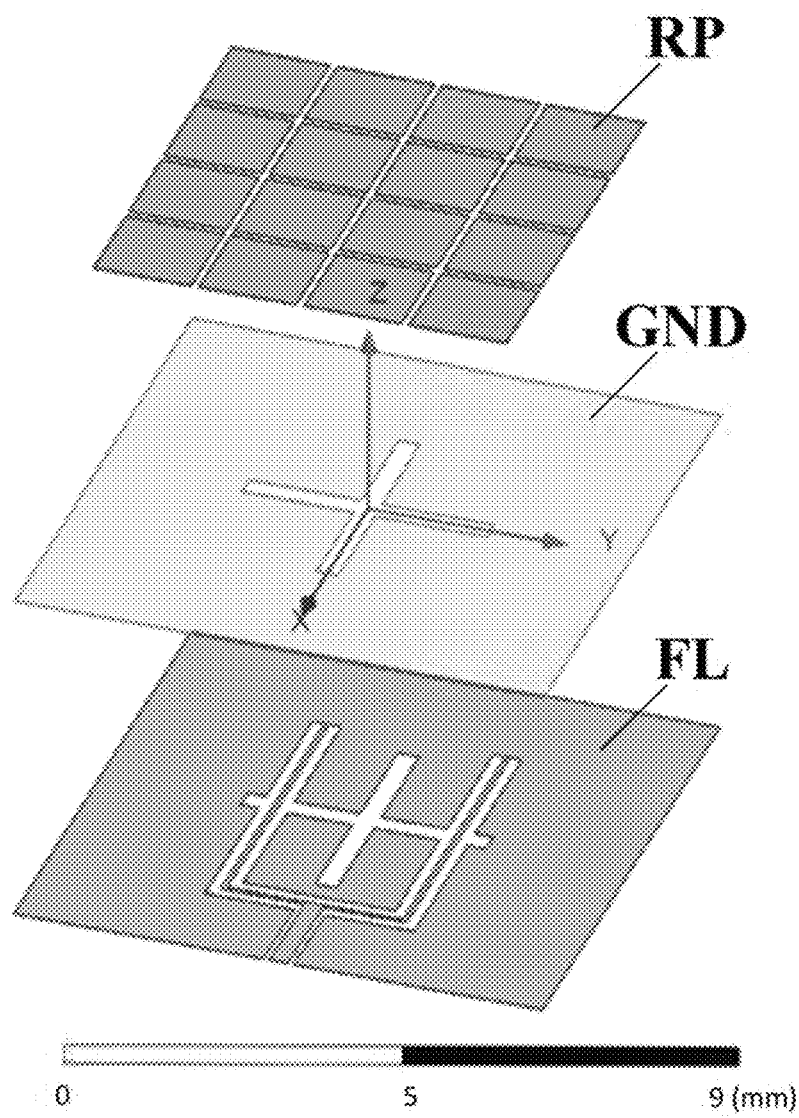
FIG. 52 is a perspective view of a radiating plate, aground plate, and a feed line in the antenna depicted in FIG. 51.

FIG. 51 is a superimposed view of a radiating plate, a ground plate, and a feed line in an antenna in some embodiments according to the present disclosure. FIG. 52 is a perspective view of a radiating plate, a ground plate, and a feed line in the antenna depicted in FIG. 51. Referring to FIG. 51 and FIG. 52, the antenna in some embodiments includes a radiation patch RP having a rectangular shape, a ground plate GP with a cross-shaped slot, and a single-polarized feed line configuration.

Figure 53:
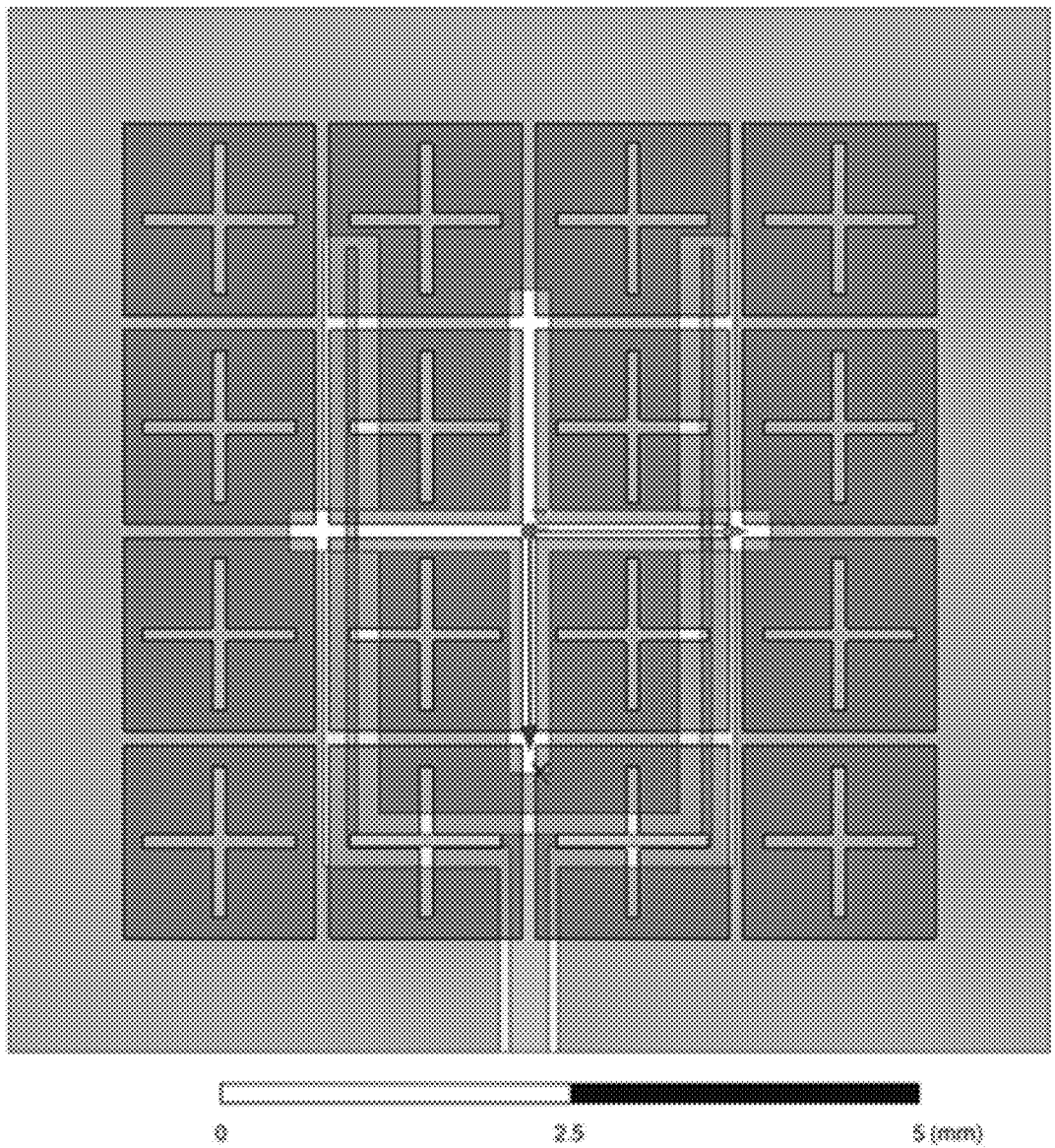
FIG. 53 is a superimposed view of a radiating plate, a ground plate, and a feed line in an antenna in some embodiments according to the present disclosure.
Figure 54:
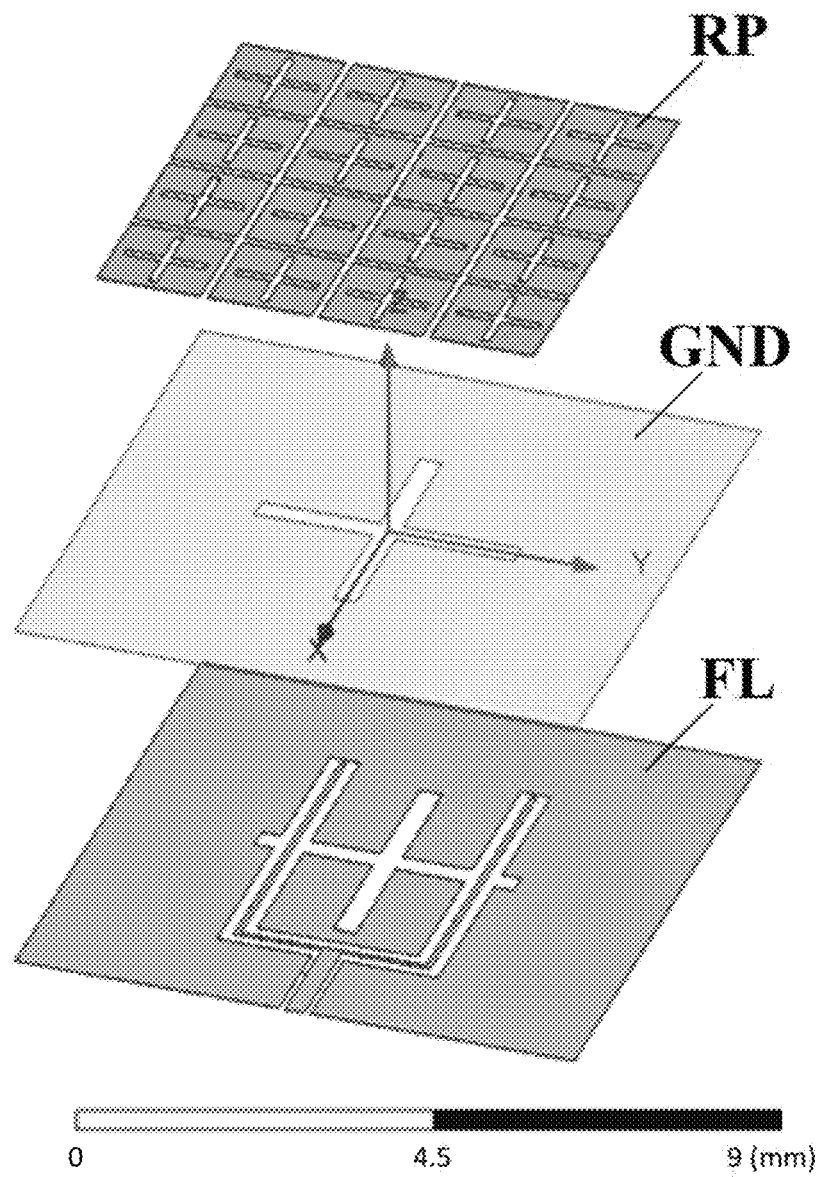
FIG. 54 is a perspective view of a radiating plate, a ground plate, and a feed line in the antenna depicted in FIG. 53.

FIG. 53 is a superimposed view of a radiating plate, a ground plate, and a feed line in an antenna in some embodiments according to the present disclosure. FIG. 54 is a perspective view of a radiating plate, a ground plate, and a feed line in the antenna depicted in FIG. 53. Referring to FIG. 53 and FIG. 54, the antenna in some embodiments includes a radiation patch RP having a rectangular shape with a cross-shaped slot, a ground plate GP with a cross-shaped slot, and a single-polarized feed line configuration.

Figure 55:
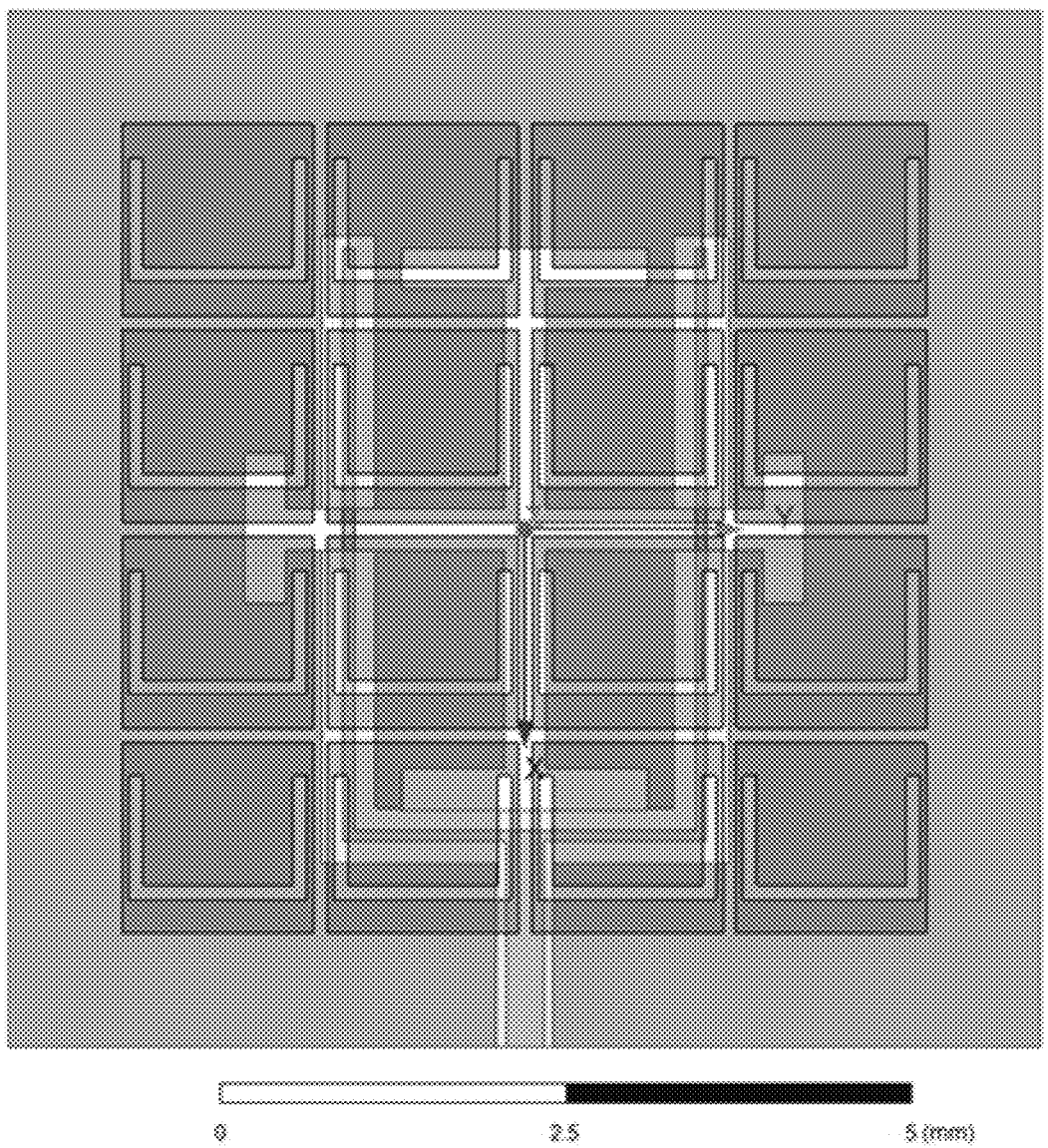
FIG. 55 is a superimposed view of a radiating plate, a ground plate, and a feed line in an antenna in some embodiments according to the present disclosure.
Figure 56:
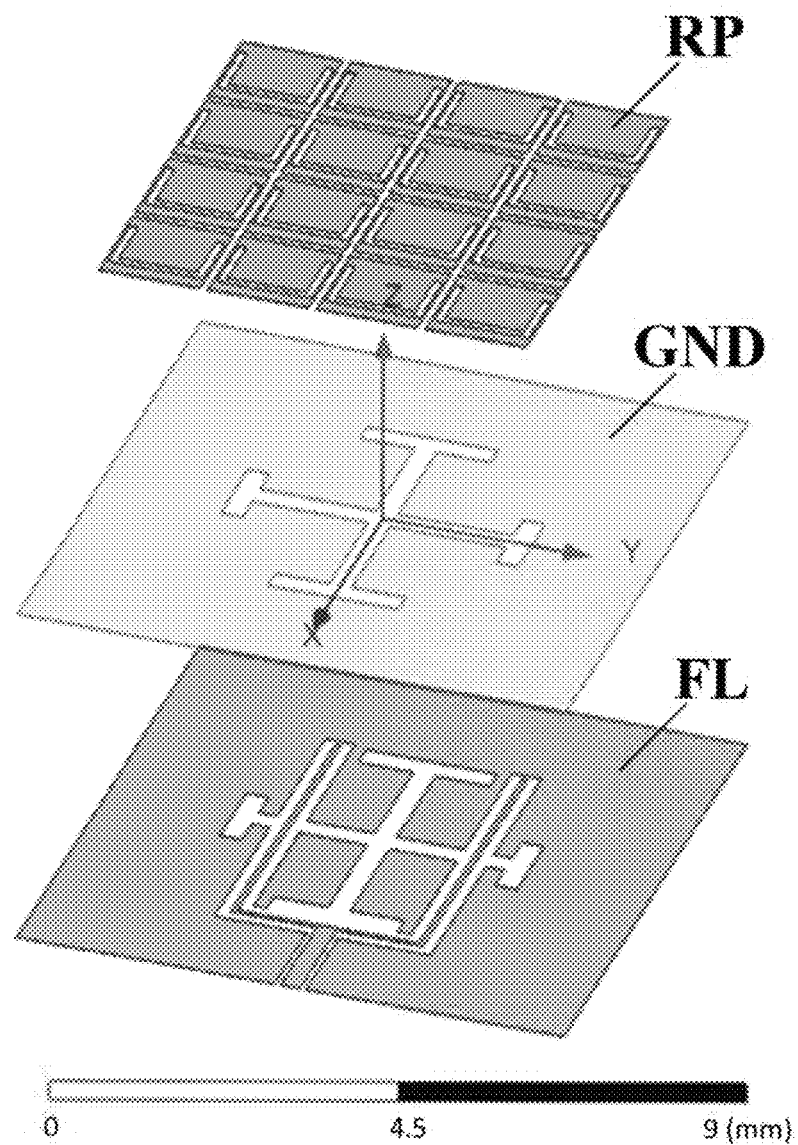
FIG. 56 is a perspective view of a radiating plate, a ground plate, and a feed line in the antenna depicted in FIG. 55.

FIG. 55 is a superimposed view of a radiating plate, a ground plate, and a feed line in an antenna in some embodiments according to the present disclosure. FIG. 56 is a perspective view of a radiating plate, a ground plate, and a feed line in the antenna depicted in FIG. 55. Referring to FIG. 55 and FIG. 56, the antenna in some embodiments includes a radiation patch RP having a rectangular shape with a bracket-shaped slot, a ground plate GP with a double-H cross-shaped slot, and a single-polarized feed line configuration.

Figure 57:
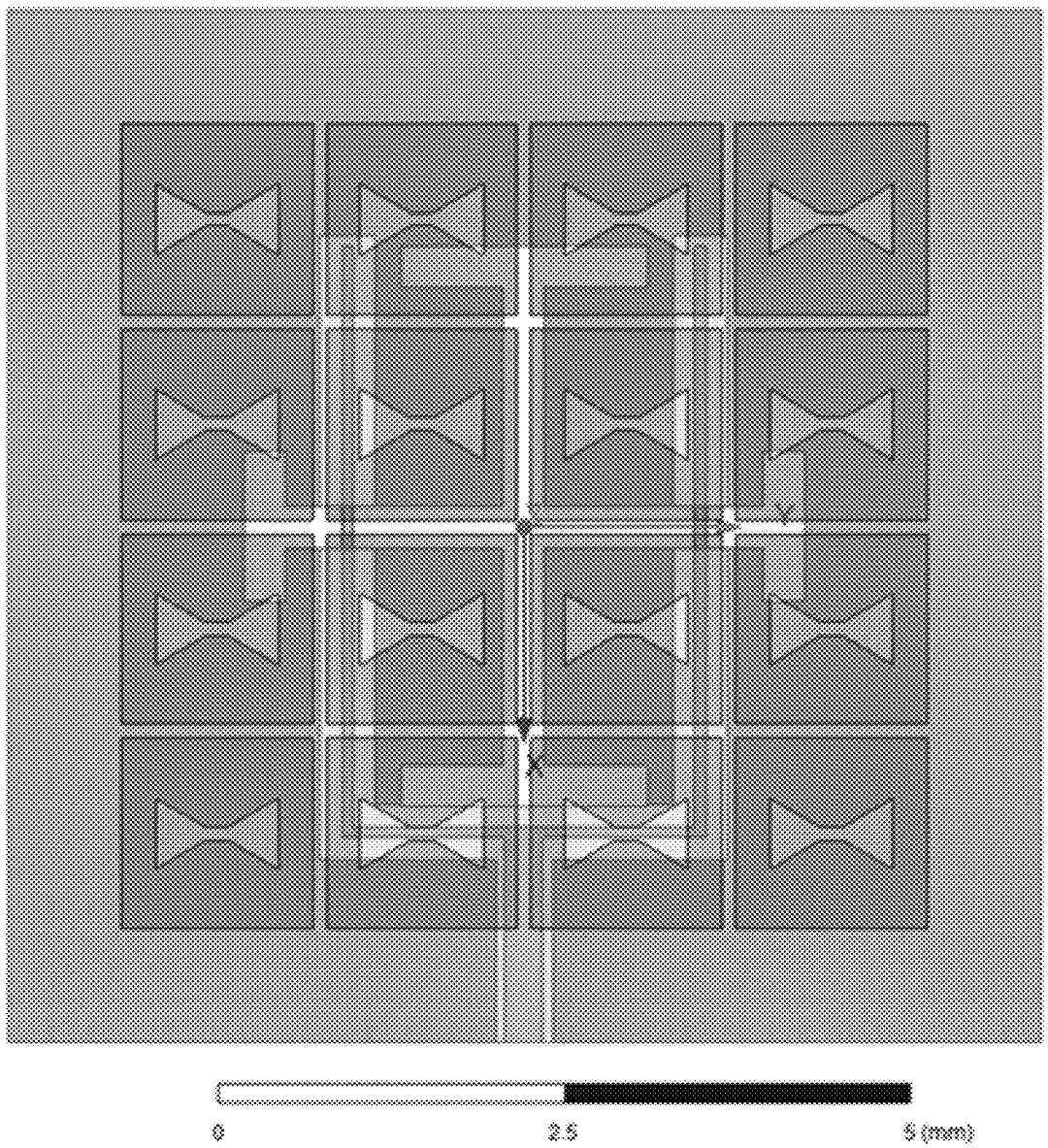
FIG. 57 is a superimposed view of a radiating plate, a ground plate, and a feed line in an antenna in some embodiments according to the present disclosure.
Figure 58:
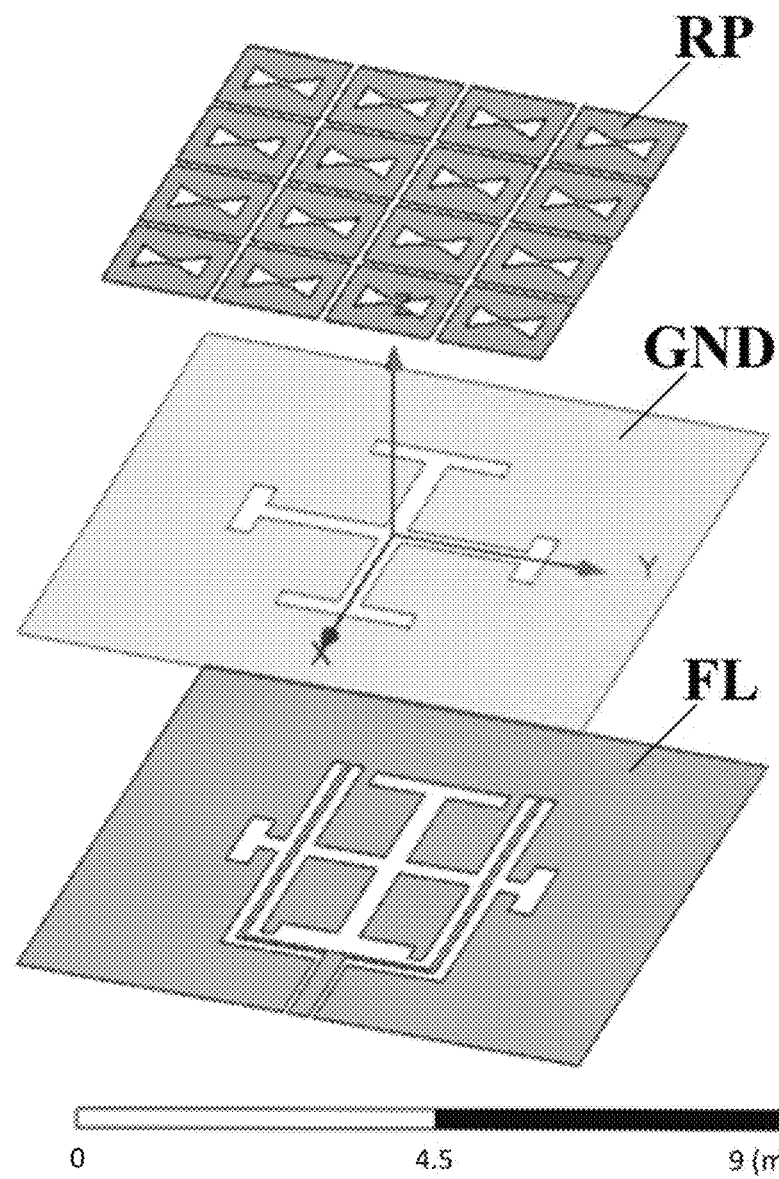
FIG. 58 is a perspective view of a radiating plate, a ground plate, and a feed line in the antenna depicted in FIG. 57.

FIG. 57 is a superimposed view of a radiating plate, a ground plate, and a feed line in an antenna in some embodiments according to the present disclosure. FIG. 58 is a perspective view of a radiating plate, a ground plate, and a feed line in the antenna depicted in FIG. 57. Referring to FIG. 57 and FIG. 58, the antenna in some embodiments includes a radiation patch RP having a rectangular shape with a butterfly tie-shaped slot, a ground plate GP with a double-H cross-shaped slot, and a single-polarized feed line configuration.

Figure 59:
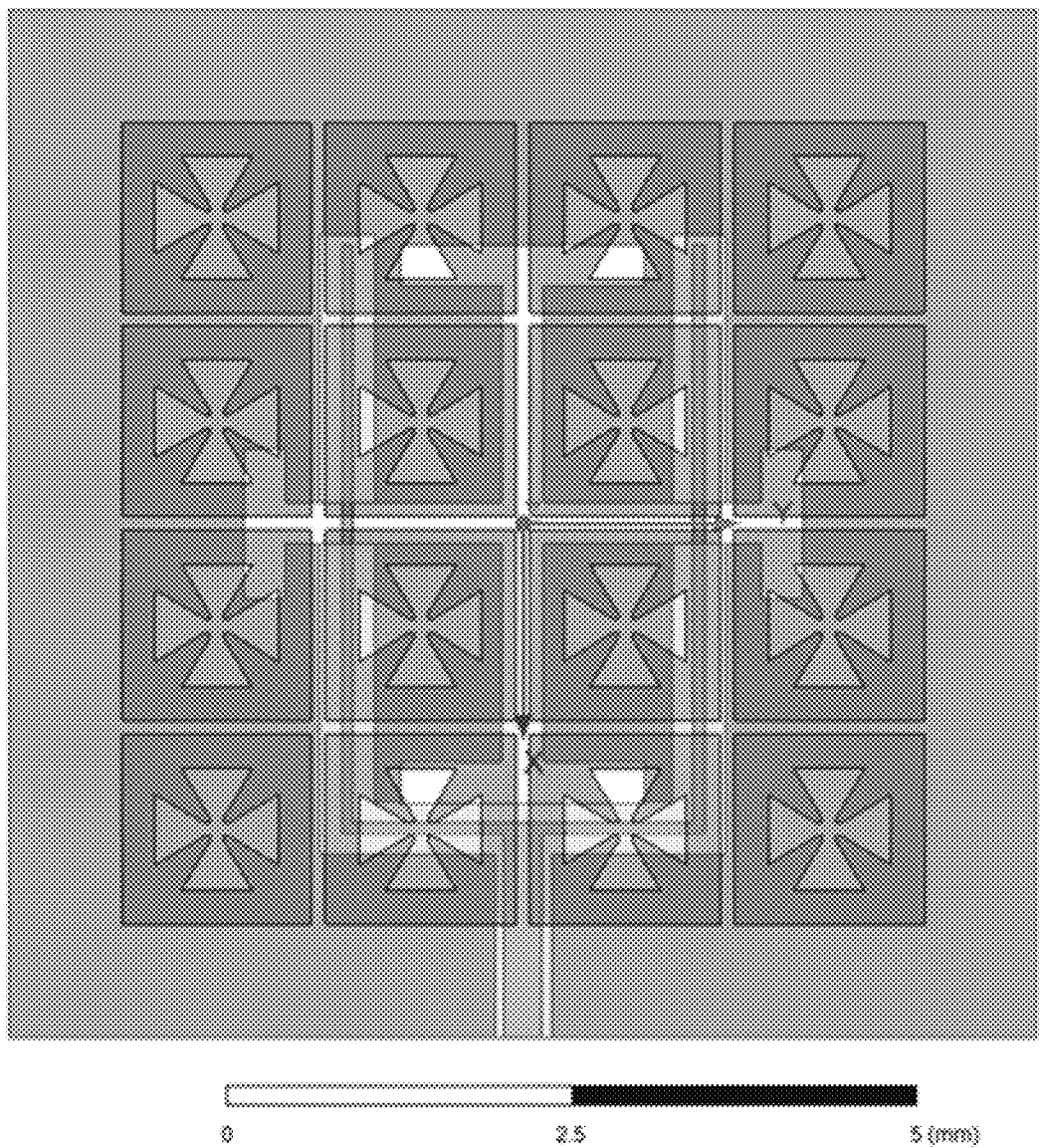
FIG. 59 is a superimposed view of a radiating plate, a ground plate, and a feed line in an antenna in some embodiments according to the present disclosure.
Figure 60:
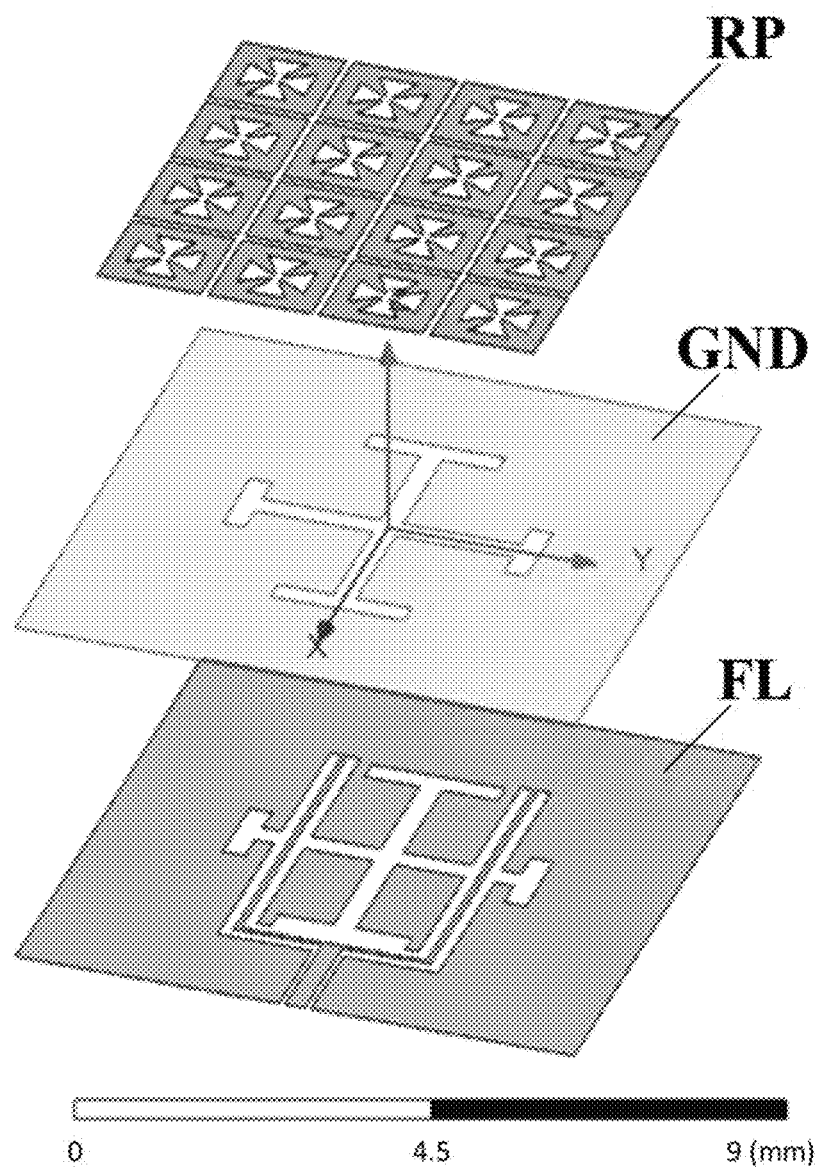
FIG. 60 is a perspective view of a radiating plate, a ground plate, and a feed line in the antenna depicted in FIG. 59.

FIG. 59 is a superimposed view of a radiating plate, a ground plate, and a feed line in an antenna in some embodiments according to the present disclosure. FIG. 60 is a perspective view of a radiating plate, a ground plate, and a feed line in the antenna depicted in FIG. 59. Referring to FIG. 59 and FIG. 60, the antenna in some embodiments includes a radiation patch RP having a rectangular shape with a Maltese cross-shaped slot, a ground plate GP with a double-H cross-shaped slot, and a single-polarized feed line configuration.

Figure 61:
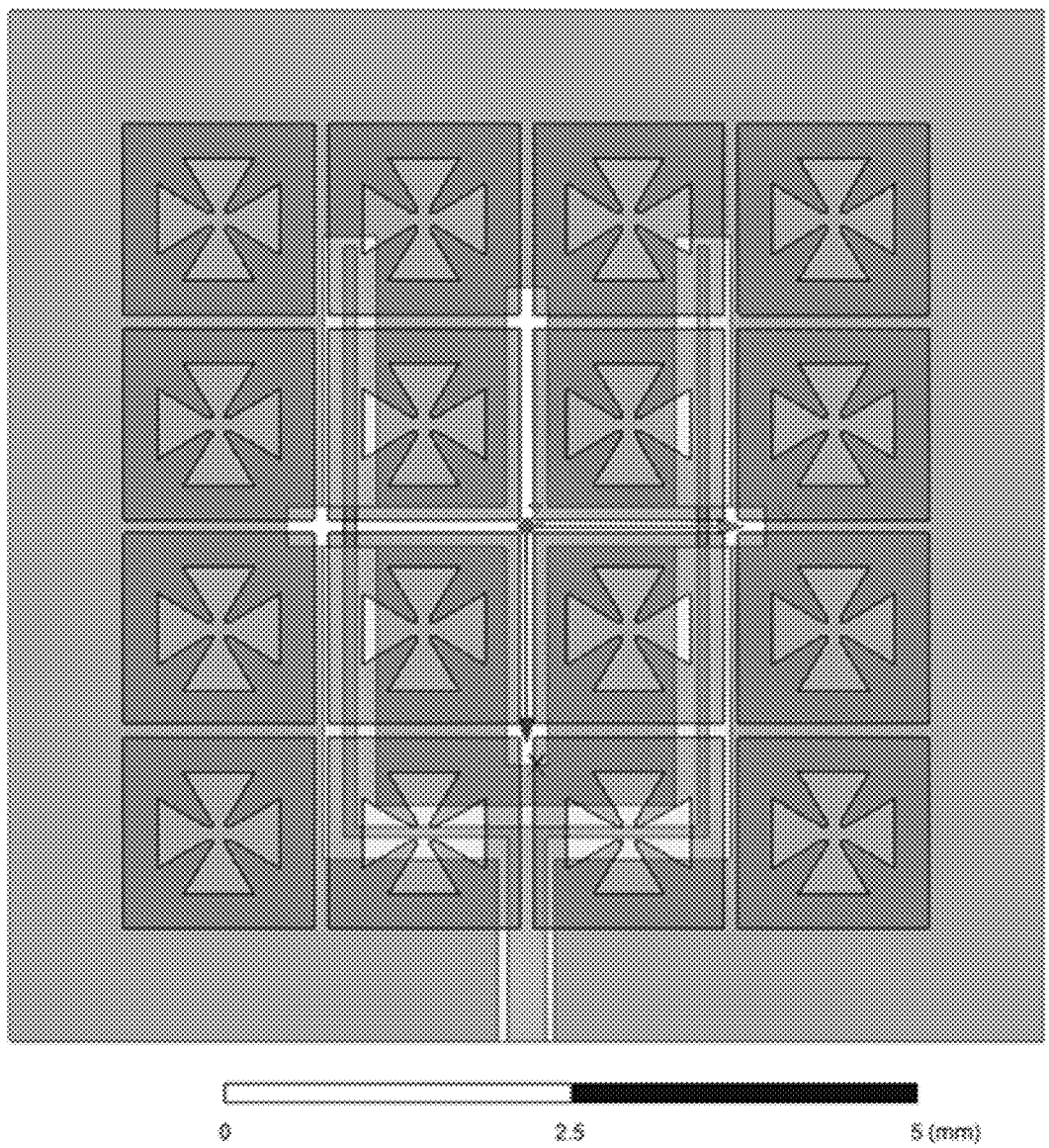
FIG. 61 is a superimposed view of a radiating plate, a ground plate, and a feed line in an antenna in some embodiments according to the present disclosure.
Figure 62:
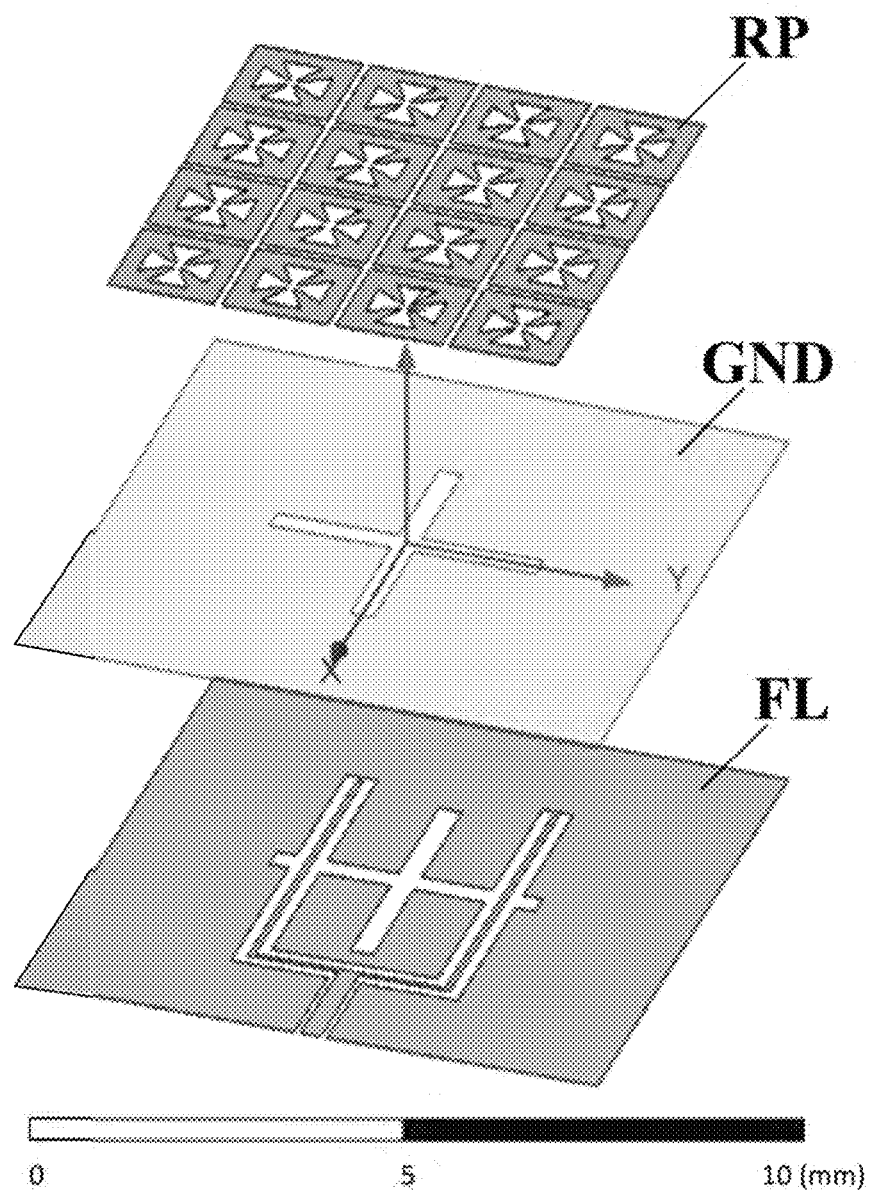
FIG. 62 is a perspective view of a radiating plate, a ground plate, and a feed line in the antenna depicted in FIG. 61.

FIG. 61 is a superimposed view of a radiating plate, a ground plate, and a feed line in an antenna in some embodiments according to the present disclosure. FIG. 62 is a perspective view of a radiating plate, a ground plate, and a feed line in the antenna depicted in FIG. 61. Referring to FIG. 61 and FIG. 62, the antenna in some embodiments includes a radiation patch RP having a rectangular shape with a Maltese cross-shaped slot, a ground plate GP with a cross-shaped slot, and a single-polarized feed line configuration.

Table 1 summarized performance of antenna depicted in FIG. 39 to FIG. 60.

TABLE 1

Performance of antenna according to the present disclosure

| Antenna | min S11 | Freq @min S11(GHz) | max Gain | Freq @max gain(GHz) |
|---|---|---|---|---|
| FIG. 39 | −20.6467 | 26.75 | 6.96477 | 26.75 |
| FIG. 45 | −10.72 | 28 | 6.525843 | 27.75 |
| FIG. 47 | −15.2797 | 24.5 | 4.263669 | 28.5 |
| FIG. 49 | −28.6851 | 26.25 | 6.985823 | 26.5 |
| FIG. 51 | −8.16221 | 28.75 | 6.063911 | 28.25 |
| FIG. 53 | −8.27938 | 28.75 | 6.022192 | 28.25 |
| FIG. 55 | −22.0705 | 24.25 | 5.014315 | 28.25 |
| FIG. 57 | −33.3233 | 26.25 | 6.962431 | 26.5 |
| FIG. 59 | −40.656 | 26.25 | 6.909223 | 26.5 |

As shown in Table 1, the antennas depicted in FIG. 39, FIG. 49, FIG. 57, and FIG. 59 exhibit the deepest resonances (minimum values) and highest gains. Although the antennas depicted in FIG. 51 and FIG. 53 experience impedance matching issues, the frequencies corresponding to the minimum S-parameter values and maximum pain values are relatively close (with a difference of 0.5 GHz). On the other hand, the antennas depicted in FIG. 47 and FIG. 55 perform less than ideally, with a discrepancy of nearly 4 GHz between the frequency of the minimum S-parameter value and the frequency of the maximum gain value. Additionally, their gains are lower, indicating a mismatch issue.

It is evident that the antenna depicted in FIG. 39, the antenna depicted in FIG. 49, the antenna depicted in FIG. 57, and the antenna depicted in FIG. 59 exhibit resonant depths reaching −20 dB. In terms of port reflection, these models demonstrate superior performance. However, the antenna depicted in FIG. 51 and the antenna depicted in FIG. 53 show poor resonance effects, with values hovering around −6 dB, indicating stronger reflections. The antenna depicted in FIG. 47 and the antenna depicted in FIG. 55 exhibit moderate resonance, but their radiation gains are comparatively lower, suggesting the presence of pseudo-resonances. Interestingly, the antenna depicted in FIG. 51 and the antenna depicted in FIG. 53, despite their suboptimal resonance, display relatively consistent radiation gains without significant declines.

Upon comparison, it becomes apparent that the choice of radiator shape, whether it is a rectangular radiating plate (the antenna depicted in FIG. 39), a radiation patch having a rectangular shape with a cross-shaped slot (the antenna depicted in FIG. 49), or a radiation patch having a rectangular shape with a butterfly tie-shaped slot (the antenna depicted in FIG. 57), a radiation patch having a rectangular shape with a Maltese cross-shaped slot (the antenna depicted in FIG. 59), yields favorable radiation effects in terms of S-parameters and radiation gains. When contrasting the antenna depicted in FIG. 39 and the antenna depicted in FIG. 49 with the antenna depicted in FIG. 51 and the antenna depicted in FIG. 53, which share the same radiating plate shape but differ in slot configurations, the slot design exerts a considerable impact on the S-parameters while maintaining negligible influence on the gains. Structural optimization between the slot and the feed line may achieve optimal performance in both S-parameters and gains.

Figure 63:
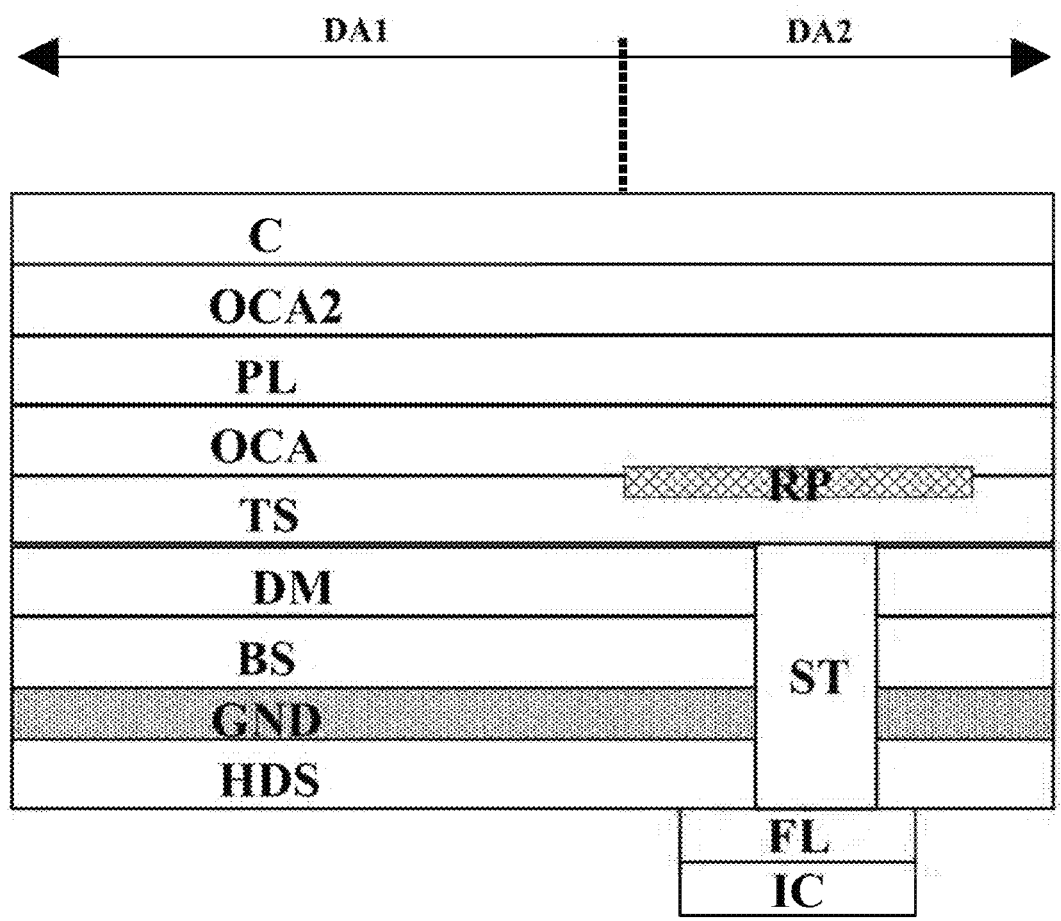
FIG. 63 is a cross-sectional view of a display apparatus in some embodiments according to the present disclosure.

FIG. 63 is a cross-sectional view of a display apparatus in some embodiments according to the present disclosure. Referring to FIG. 63, the display apparatus includes a heat dissipation structure HDS, a ground plate GND on the heat dissipation structure HDS, a base substrate BS on a side of the ground plate GND away from the heat dissipation structure HDS, a display module DM on a side of the base substrate BS away from the ground plate GND, a touch structure TS on a side of the display module DM away from the base substrate BS, a radiating plate RP of the antenna on a side of the touch structure TS away from the display module DM, an optically clear adhesive layer OCA on a side of the radiating plate RP and the touch structure TS away from the display module DM, a polarizer PL on a side of the optically clear adhesive layer OCA away from the touch structure TS, a second optically clear adhesive layer OCA2 on a side of the polarizer PL away from the optically clear adhesive layer OCA, and a cover C on a side of the second optically clear adhesive layer OCA2 away from the polarizer PL. Optionally, the display apparatus further includes a slot ST extending through at least one of the heat dissipation structure HDS and the ground plate GND. Optionally, the display apparatus further includes a feed line FL on a side of the slot ST away from the radiating plate RP. Optionally, the display apparatus further includes an integrated circuit IC on a side of the feed line FL away from the slot ST. Optionally, the ground plate GND is made of a metallic material.

Figure 64:
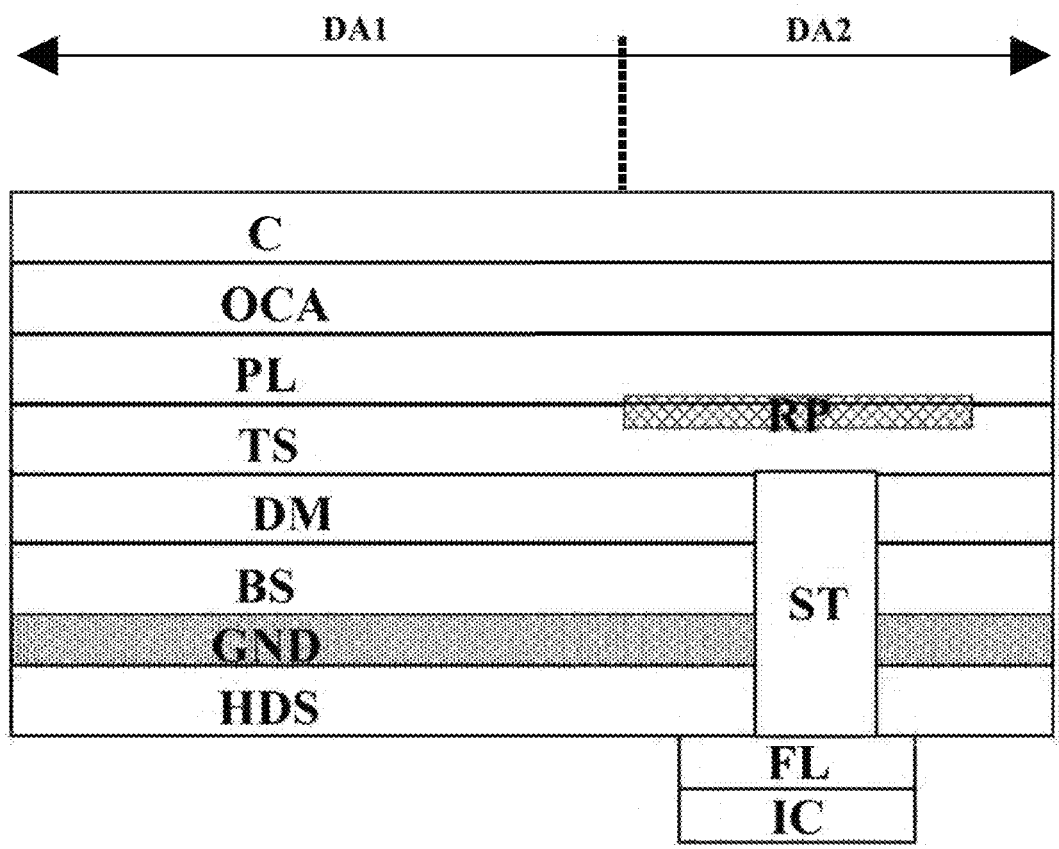
FIG. 64 is a cross-sectional view of a display apparatus in some embodiments according to the present disclosure.

FIG. 64 is a cross-sectional view of a display apparatus in some embodiments according to the present disclosure. Referring to FIG. 64, in some embodiments, the polarizer PL may be integrated into the display apparatus, thus only one adhesive layer is required to adhere the cover C. In some embodiments, the display apparatus includes a heat dissipation structure HDS, a ground plate GND on the heat dissipation structure HDS, a base substrate BS on a side of the ground plate GND away from the heat dissipation structure HDS, a display module DM on a side of the base substrate BS away from the ground plate GND, a touch structure TS on a side of the display module DM away from the base substrate BS, a radiating plate RP of the antenna on a side of the touch structure TS away from the display module DM, a polarizer PL on a side of the radiating plate RP and the touch structure TS away from the display module DM, an optically clear adhesive layer OCA on a side of the polarizer PL away from the touch structure TS, and a cover C on a side of the optically clear adhesive layer OCA away from the polarizer PL. Optionally, the display apparatus further includes a slot ST extending through at least one of the heat dissipation structure HDS and the ground plate GND. Optionally, the display apparatus further includes a feed line FL on a side of the slot ST away from the radiating plate RP. Optionally, the display apparatus further includes an integrated circuit IC on a side of the feed line FL away from the slot ST. Optionally, the ground plate GND is made of a metallic material.

Figure 65:
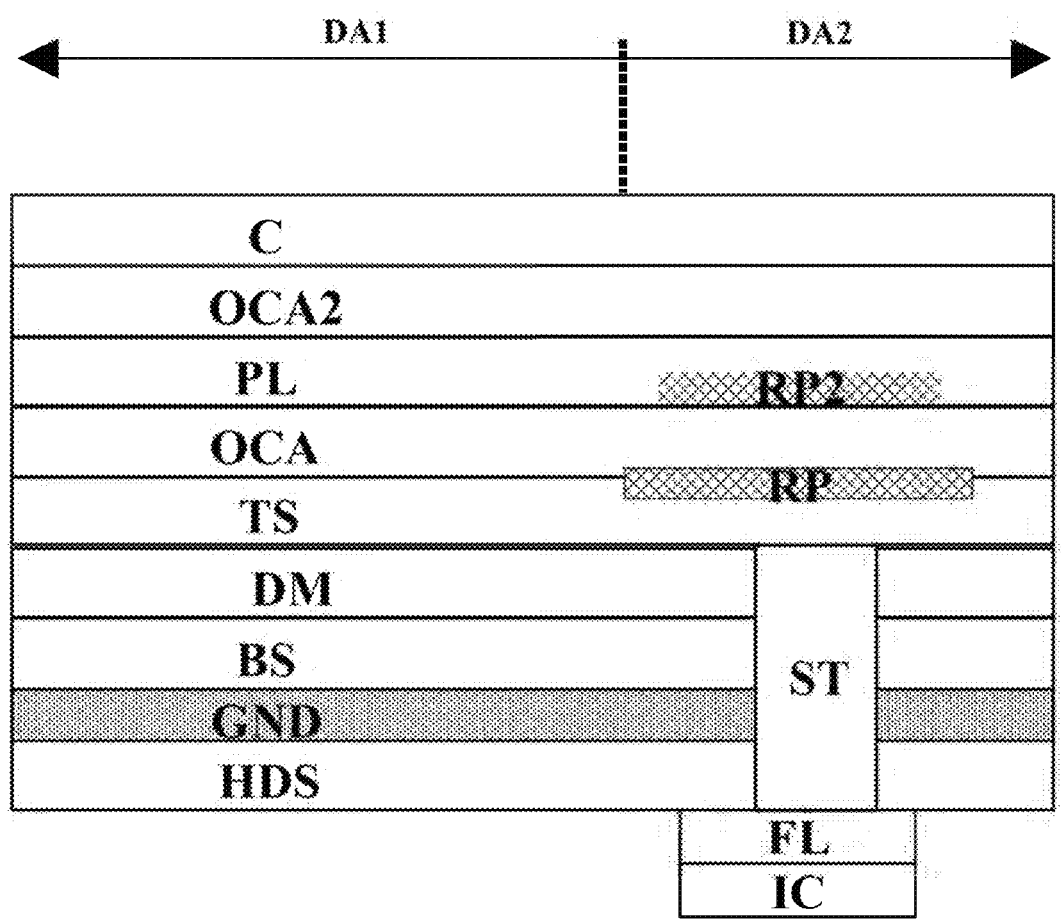
FIG. 65 is a cross-sectional view of a display apparatus in some embodiments according to the present disclosure.

FIG. 65 is a cross-sectional view of a display apparatus in some embodiments according to the present disclosure. Referring to FIG. 65, in some embodiments, the display apparatus may include two radiating plates. In some embodiments, the display apparatus includes a heat dissipation structure HDS, a ground plate GND on the heat dissipation structure HDS, a base substrate BS on a side of the ground plate GND away from the heat dissipation structure HDS, a display module DM on a side of the base substrate BS away from the ground plate GND, a touch structure TS on a side of the display module DM away from the base substrate BS, a radiating plate RP of the antenna on a side of the touch structure TS away from the display module DM, an optically clear adhesive layer OCA on a side of the radiating plate RP and the touch structure TS away from the display module DM, a second radiating plate RP2 on a side of the optically clear adhesive layer OCA away from the touch structure TS, a polarizer PL on a side of the optically clear adhesive layer OCA and the second radiating plate RP2 away from the touch structure TS, a second optically clear adhesive layer OCA2 on a side of the polarizer PL away from the optically clear adhesive layer OCA, and a cover C on a side of the second optically clear adhesive layer OCA2 away from the polarizer PL. Optionally, the display apparatus further includes a slot ST extending through at least one of the heat dissipation structure HDS and the ground plate GND. Optionally, the display apparatus further includes a feed line FL on a side of the slot ST away from the radiating plate RP. Optionally, the display apparatus further includes an integrated circuit IC on a side of the feed line FL away from the slot ST. Optionally, the ground plate GND is made of a metallic material.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising a display area and a peripheral area;
    wherein the display area comprises a first display sub-area and a second display sub-area;
    the second display sub-area has a subpixel distribution density lower than a subpixel distribution density of the first display sub-area;
    the display apparatus further comprises an antenna, a touch structure, and a display module;
    the antenna comprises a radiating plate, a feed line, a ground plate, and a slot extending through at least the ground plate; and
    the radiating plate, the feed line, the ground plate, and the slot are at least partially in the second display sub-area and outside the first display sub-area.

2. The display apparatus of claim 1, wherein a ratio of the subpixel distribution density in the second display sub-area to the subpixel distribution density in the first display sub-area is less than 1:1.5.

3. The display apparatus of claim 1, wherein a minimum repeating unit in the second display sub-area includes one pixel and one or more dummy pixels;
    the one pixel comprises one or more subpixels; and
    a respective dummy pixel of the one or more dummy pixels comprises one or more dummy subpixels.

4. The display apparatus of claim 3, wherein subpixels in the one pixel in the minimum repeating unit have a different arrangement from subpixels in a pixel in the first display sub-area.

5. The display apparatus of claim 3, wherein dummy subpixels in the respective dummy pixel in the minimum repeating unit have a different arrangement from subpixels in a pixel in the first display sub-area.

6. The display apparatus of claim 1, wherein the touch structure comprises an effective touch area and a peripheral touch area; and
    the radiating plate, the feed line, and the slot are at least partially in the peripheral touch area.

7. The display apparatus of claim 6, wherein the touch structure comprises a plurality of touch electrodes in the effective touch area; and
    an orthographic projection of the radiating plate on a base substrate is substantially non-overlapping with an orthographic projection of the plurality of touch electrodes on the base substrate.

8. The display apparatus of claim 1, further comprising a first power supply terminal and a second power supply terminal;
    wherein the first power supply terminal and the second power supply terminal are electrically isolated from each other;
    the first power supply terminal is configured to output a first power supply signal;
    the second power supply terminal is configured to output a second power supply signal; and
    the first power supply signal being different from the second power supply signal.

9. The display apparatus of claim 8, further comprising a first power supply signal line and a second power supply signal line;
    wherein the first power supply signal line is connected to the first power supply terminal, and is configured to transmit the first power supply signal to pixel driving circuits in the first display sub-area;
    the second power supply signal line is connected to the second power supply terminal, and is configured to transmit the second power supply signal to pixel driving circuits in the second display sub-area;
    the pixel driving circuits in the first display sub-area are configured to drive light emission in light emitting elements in the first display sub-area at least partially based on the first power supply signal; and
    the pixel driving circuits in the second display sub-area are configured to drive light emission in light emitting elements in the second display sub-area at least partially based on the second power supply signal.

10. The display apparatus of claim 1, comprises:
    a heat dissipation structure;
    the ground plate on the heat dissipation structure;
    a base substrate on a side of the ground plate away from the heat dissipation structure;
    the display module on a side of the base substrate away from the ground plate;
    the touch structure on a side of the display module away from the base substrate; and
    the radiating plate of the antenna on a side of the touch structure away from the display module.

11. The display apparatus of claim 1, wherein the radiating plate is a metal mesh radiating plate.

12. The display apparatus of claim 11, further comprising an auxiliary metal mesh substantially surrounding the radiating plate;
    wherein the radiating plate and the auxiliary metal mesh are spaced apart from each other by a transition area; and
    the auxiliary metal mesh comprises discontinuous line segments.

13. The display apparatus of claim 1, wherein the feed line comprises a main feed line and a metal plate at least partially in the second display sub-area and outside the first display sub-area.

14. The display apparatus of claim 13, wherein the main feed line comprises a horizontal-polarized feed line and a vertical-polarized feed line;
    the vertical-polarized feed line and the metal plate are in the same layer; and
    the horizontal-polarized feed line is in a layer on a side of the vertical-polarized feed line and the metal plate closer to the radiating plate.

15. The display apparatus of claim 13, wherein the main feed line comprises a horizontal-polarized feed line and a vertical-polarized feed line;
    the vertical-polarized feed line and the horizontal-polarized feed line are in a same layer; and the horizontal-polarized feed line comprises a bridge crossing over the vertical-polarized feed line.

16. The display apparatus of claim 1, wherein the slot has a double-H cross shape.

17. The display apparatus of claim 1, wherein the radiating plate has a rectangular shape with a butterfly tie-shaped slot, a rectangular shape with a Maltese cross-shaped slot, or a rectangular shape with a cross-shaped slot.

18. The display apparatus of claim 1, further comprising:
an optically clear adhesive layer on a side of the radiating plate and the touch structure away from the display module;
a second radiating plate on a side of the optically clear adhesive layer away from the touch structure;
a polarizer on a side of the optically clear adhesive layer and the second radiating plate away from the touch structure; and
a second optically clear adhesive layer on a side of the polarizer away from the optically clear adhesive layer.

19. The display apparatus of claim 1, wherein an orthographic projection of the radiating plate on a base substrate is non-overlapping with an orthographic projection of a subpixel in the second display sub-area on the base substrate.

20. The display apparatus of claim 19, wherein the orthographic projection of the radiating plate on the base substrate is at least partially overlapping with an orthographic projection of a dummy subpixel in the second display sub-area on the base substrate.

* * * * *